(12) United States Patent
Hiratsuka

(10) Patent No.: US 8,334,921 B2
(45) Date of Patent: Dec. 18, 2012

(54) IMAGE PROCESSING APPARATUS, IMAGE PROCESSING METHOD, AND PROGRAM

(75) Inventor: Yosuke Hiratsuka, Tokyo (JP)

(73) Assignee: Sony Corporation (JP)

( * ) Notice: Subject to any disclaimer, the term of this patent is extended or adjusted under 35 U.S.C. 154(b) by 279 days.

(21) Appl. No.: 12/799,306

(22) Filed: Apr. 22, 2010

(65) Prior Publication Data

US 2010/0277618 A1 Nov. 4, 2010

(30) Foreign Application Priority Data

May 1, 2009 (JP) ................................ P2009-111708

(51) Int. Cl.
*H04N 5/222* (2006.01)
*H04N 5/76* (2006.01)
*H04N 5/262* (2006.01)

(52) U.S. Cl. ........... 348/333.12; 348/333.05; 348/231.3; 348/239

(58) Field of Classification Search .................. 348/239, 348/333.12, 231.3, 333.05
See application file for complete search history.

(56) References Cited

U.S. PATENT DOCUMENTS

| 5,757,290 A | 5/1998 | Watanabe et al. | |
|---|---|---|---|
| 5,819,235 A | 10/1998 | Tamai et al. | |
| 6,035,282 A | 3/2000 | Tamai et al. | |
| 2003/0025810 A1* | 2/2003 | Pilu et al. | 348/239 |
| 2009/0278959 A1* | 11/2009 | Kato | 348/239 |
| 2011/0096202 A1* | 4/2011 | Lee | 348/239 |

FOREIGN PATENT DOCUMENTS

| JP | 05-303596 A | | 11/1993 |
|---|---|---|---|
| JP | 08-285619 A | | 11/1996 |
| JP | 09-138767 A | | 5/1997 |
| JP | 11-155124 A | | 6/1999 |
| JP | 11-155124 | * | 8/1999 |
| JP | 2003-169225 A | | 6/2003 |
| JP | 2004-120223 A | | 4/2004 |
| JP | 2004-134950 A | | 4/2004 |
| JP | 2005-250977 A | | 9/2005 |

* cited by examiner

*Primary Examiner* — Tuan Ho
*Assistant Examiner* — Shahbaz Nazrul
(74) *Attorney, Agent, or Firm* — Lerner, David, Littenberg, Krumholz & Mentlik, LLP

(57) ABSTRACT

An image processing apparatus includes an image-effect determination unit configured to determine, on the basis of an environmental information item at a time of capture of an image data item, the environmental information item being associated with the image data item, a dynamic image effect in which, when the image data item is displayed, a visual change is generated for the displayed image data item; and a display control unit configured to control, for display of the image data item, a display operation so that the dynamic image effect which has been determined by the image-effect determination unit is applied.

9 Claims, 29 Drawing Sheets

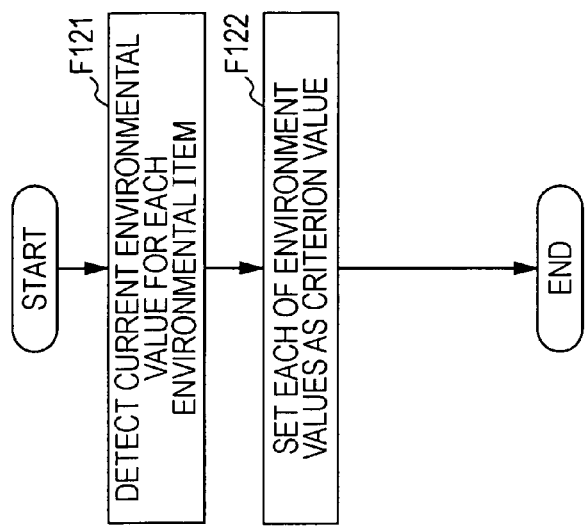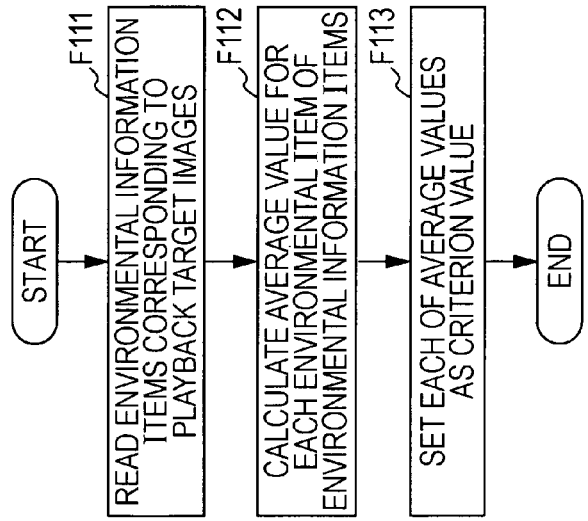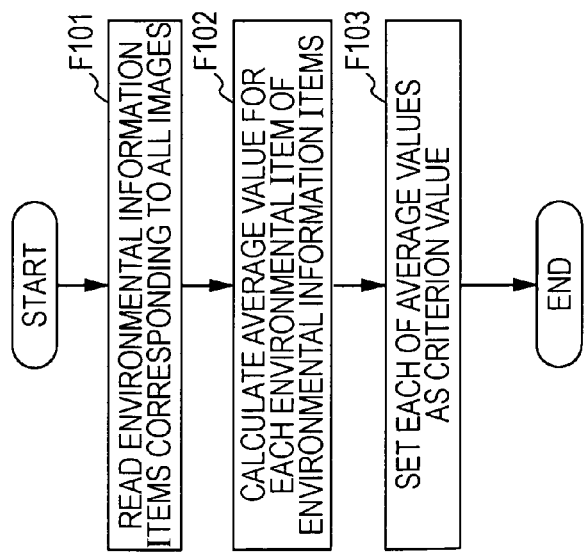

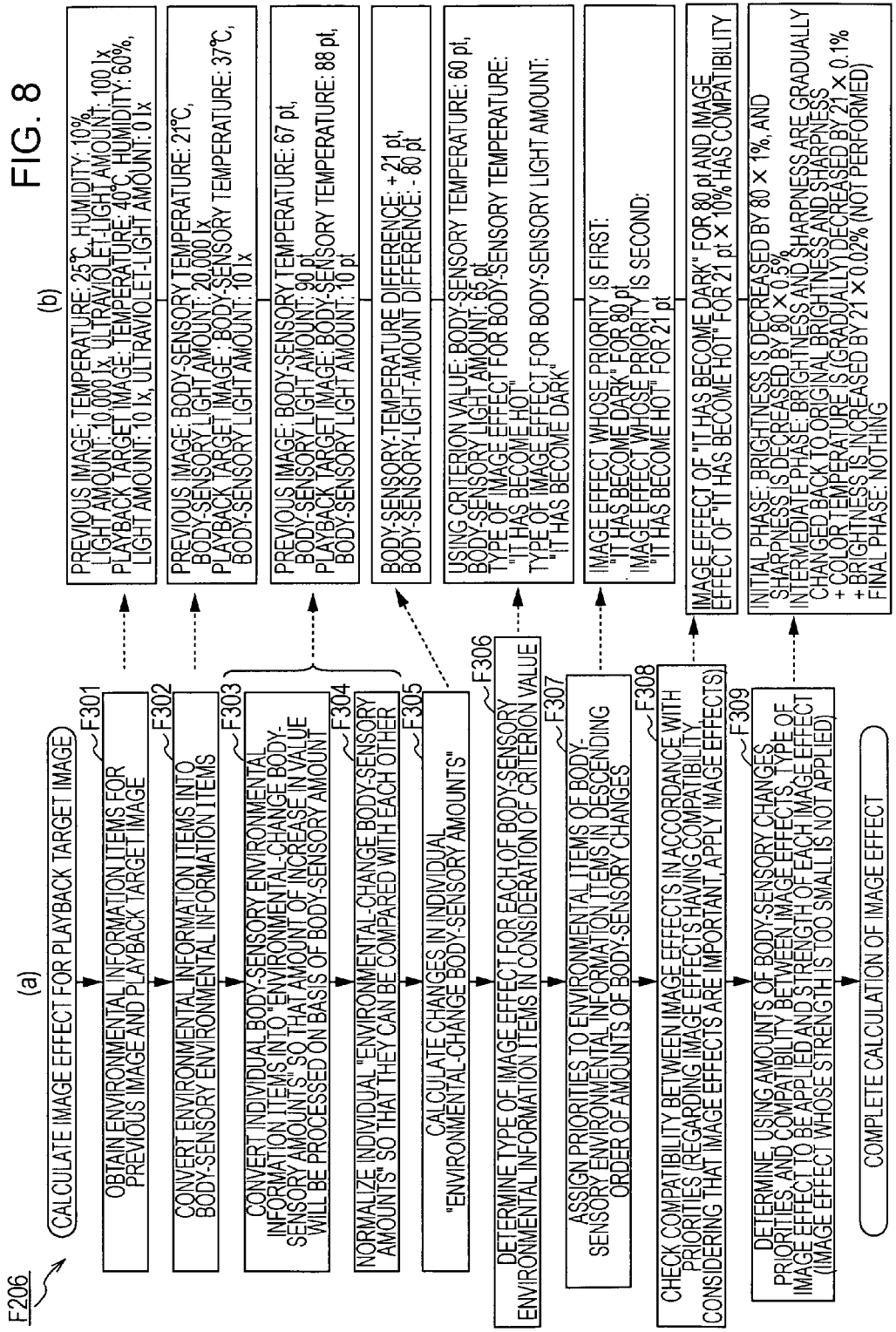

FIG. 9A
| BODY-SENSORY ENVIRONMENTAL INFORMATION ITEM | ENVIRONMENTAL INFORMATION ITEM | CALCULATION EQUATION |
|---|---|---|
| BODY-SENSORY TEMPERATURE [°C] = M | TEMPERATURE[°C] = t<br>HUMIDITY [%] = h | $M = t - \frac{1}{2.3} \times (t - 10) \times (0.8 - \frac{h}{100})$ |
| BODY-SENSORY LIGHT AMOUNT [lx] = N | LIGHT AMOUNT [lx] = $\alpha$<br>ULTRAVIOLET-LIGHT AMOUNT [lx] = $\beta$ | $N = \alpha + \beta \times 100$ |
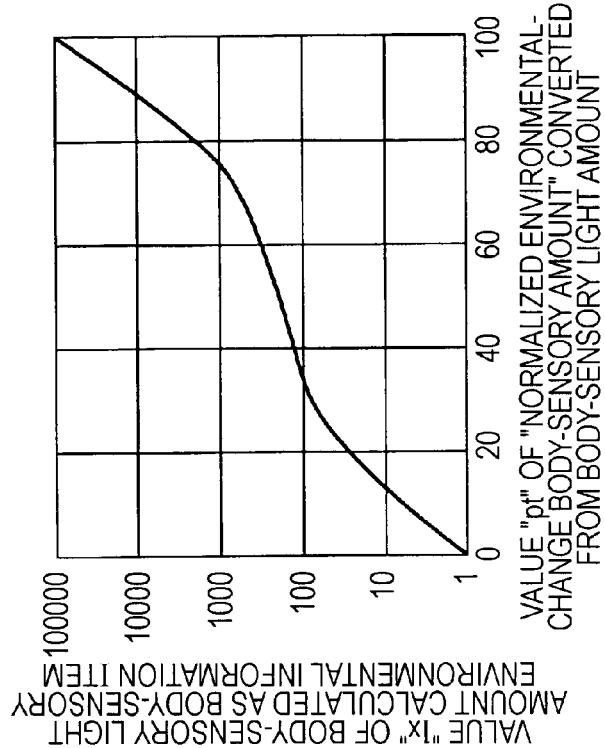
FIG. 9B
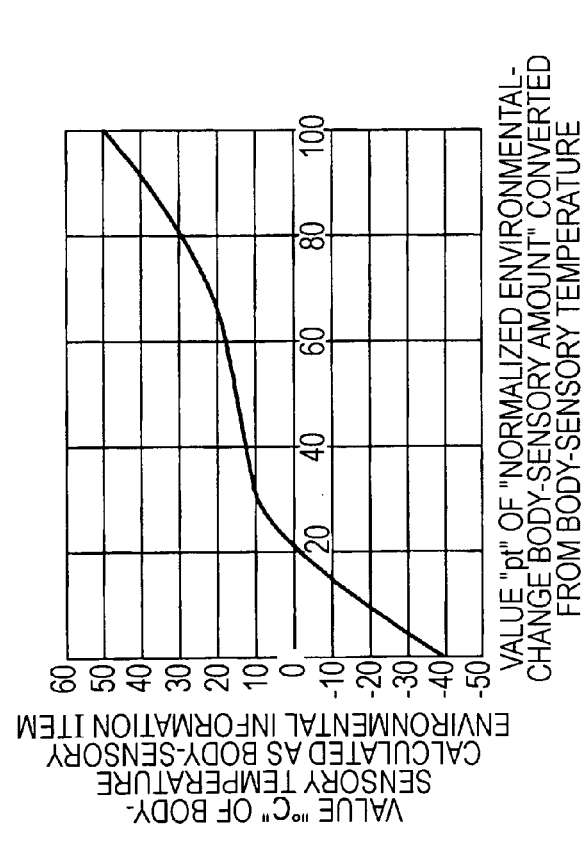
FIG. 9C

FIG. 10

| | CHANGE | RELATIONSHIP BETWEEN CHANGE AND CRITERION VALUE | MINIMUM POINT pt FOR APPLICATION | TYPE OF IMAGE EFFECT | DETAILS OF IMAGE EFFECT |
|---|---|---|---|---|---|
| BODY-SENSORY TEMPERATURE | INCREASE | IT BECOMES EQUAL TO OR HIGHER THAN CRITERION VALUE AFTER IT INCREASES | 20 pt | IT HAS BECOME HOT | INITIAL PHASE: NOTHING<br>INTERMEDIATE PHASE: COLOR TEMPERATURE IS (GRADUALLY) DECREASED BY α×1%<br>BRIGHTNESS IS (GRADUALLY) INCREASED BY α×0.2%<br>FINAL PHASE: NOTHING |
| BODY-SENSORY TEMPERATURE | INCREASE | IT BECOMES LOWER THAN CRITERION VALUE AFTER IT INCREASES | 20 pt | IT HAS BECOME LESS COLD | INITIAL PHASE: NOTHING<br>INTERMEDIATE PHASE: COLOR TEMPERATURE IS (GRADUALLY) DECREASED BY α×0.1%<br>FINAL PHASE: NOTHING |
| BODY-SENSORY TEMPERATURE | DECREASE | IT BECOMES EQUAL TO OR HIGHER THAN CRITERION VALUE AFTER IT DECREASES | 20 pt | IT HAS BECOME LESS HOT | INITIAL PHASE: NOTHING<br>INTERMEDIATE PHASE: COLOR TEMPERATURE IS (GRADUALLY) INCREASED BY α×0.1%<br>FINAL PHASE: NOTHING |
| BODY-SENSORY TEMPERATURE | DECREASE | IT BECOMES LOWER THAN CRITERION VALUE AFTER IT DECREASES | 20 pt | IT HAS BECOME COLD | INITIAL PHASE: NOTHING<br>INTERMEDIATE PHASE: COLOR TEMPERATURE IS (GRADUALLY) DECREASED BY α×0.2%<br>BRIGHTNESS IS (GRADUALLY) INCREASED BY α×0.1%<br>SHARPNESS IS (GRADUALLY) INCREASED BY α×0.2%<br>FINAL PHASE: NOTHING |
| BODY-SENSORY LIGHT AMOUNT | INCREASE | IT BECOMES EQUAL TO OR HIGHER THAN CRITERION VALUE AFTER IT INCREASES | 30 pt | IT HAS BECOME VERY BRIGHT | INITIAL PHASE: BRIGHTNESS IS (SHARPLY) INCREASED BY α×1%<br>INTERMEDIATE PHASE: NOTHING<br>FINAL PHASE: SHARPNESS, BRIGHTNESS, AND COLORFULNESS ARE INCREASED BY α×1%<br>FINAL PHASE: NOTHING |
| BODY-SENSORY LIGHT AMOUNT | INCREASE | IT BECOMES LOWER THAN CRITERION VALUE AFTER IT INCREASES | 30 pt | IT IS NO LONGER DARK | INITIAL PHASE: BRIGHTNESS IS (GRADUALLY) INCREASED BY α×0.2%<br>INTERMEDIATE PHASE: NOTHING<br>FINAL PHASE: NOTHING |
| BODY-SENSORY LIGHT AMOUNT | DECREASE | IT BECOMES EQUAL TO OR HIGHER THAN CRITERION VALUE AFTER IT DECREASES | 30 pt | IT IS NO LONGER VERY BRIGHT | INITIAL PHASE: BRIGHTNESS IS (GRADUALLY) DECREASED BY α×0.2%<br>INTERMEDIATE PHASE: NOTHING<br>FINAL PHASE: NOTHING |
| BODY-SENSORY LIGHT AMOUNT | DECREASE | IT BECOMES LOWER THAN CRITERION VALUE AFTER IT DECREASES | 30 pt | IT HAS BECOME DARK | INITIAL PHASE: BRIGHTNESS IS DECREASED BY α×1%, SHARPNESS IS DECREASED BY α×0.5%<br>INTERMEDIATE PHASE: BRIGHTNESS AND SHARPNESS ARE CHANGED BACK TO ORIGINAL BRIGHTNESS AND SHARPNESS<br>FINAL PHASE: ORIGINAL IMAGE |

FIG. 11

| | IT HAS BECOME HOT | IT HAS BECOME LESS COLD | IT HAS BECOME LESS HOT | IT HAS BECOME COLD | IT HAS BECOME VERY BRIGHT | IT IS NO LONGER DARK | IT IS NO LONGER VERY BRIGHT | IT HAS BECOME DARK |
|---|---|---|---|---|---|---|---|---|
| IT HAS BECOME HOT | ▨ | x | x | x | 50 % | 50 % | 10 % | 10 % |
| IT HAS BECOME LESS COLD | ▨ | ▨ | x | x | 50 % | NOTHING | NOTHING | 10 % |
| IT HAS BECOME LESS HOT | ▨ | ▨ | ▨ | x | 10 % | NOTHING | NOTHING | 50 % |
| IT HAS BECOME COLD | ▨ | ▨ | ▨ | ▨ | 10 % | 10 % | 50 % | 50 % |
| IT HAS BECOME VERY BRIGHT | ▨ | ▨ | ▨ | ▨ | ▨ | x | x | x |
| IT IS NO LONGER DARK | ▨ | ▨ | ▨ | ▨ | ▨ | ▨ | x | x |
| IT IS NO LONGER VERY BRIGHT | ▨ | ▨ | ▨ | ▨ | ▨ | ▨ | ▨ | x |
| IT HAS BECOME DARK | ▨ | ▨ | ▨ | ▨ | ▨ | ▨ | ▨ | ▨ | x: CASE THAT NOT EASILY OCCURS
NOTHING: CASE IN WHICH IMAGE EFFECTS HAVE NO COMPATIBILITY, DISCARD IMAGE EFFECT WHOSE PRIORITY IS LOW
1 TO 99 %: CASE IN WHICH IMAGE EFFECTS HAVE COMPARABILITY, REGARDING IMAGE EFFECT WHOSE PRIORITY IS LOW, APPLY IMAGE EFFECT WITH STRENGTH OBTAINED BY MULTIPLYING STRENGTH OF IMAGE EFFECT BY %

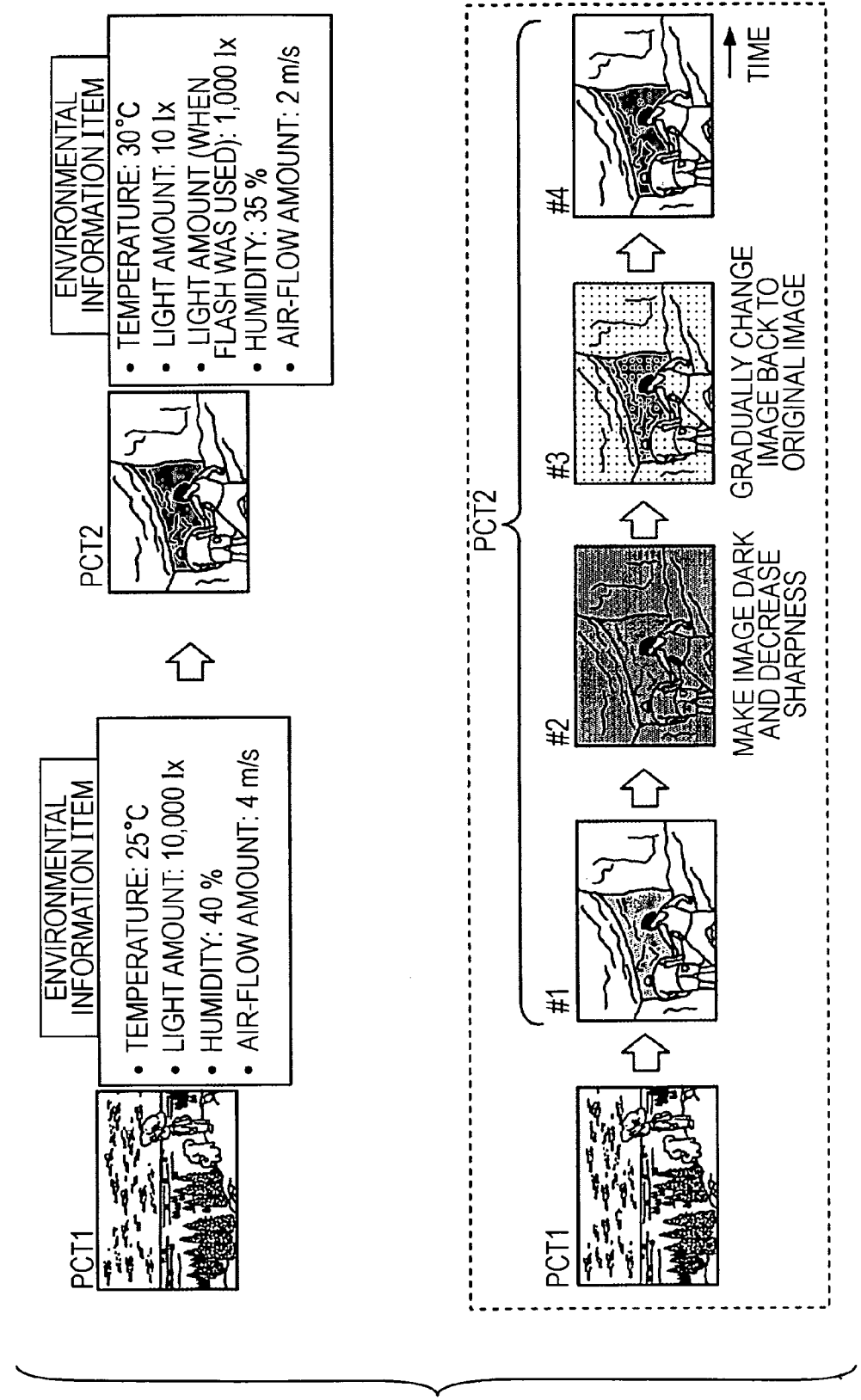

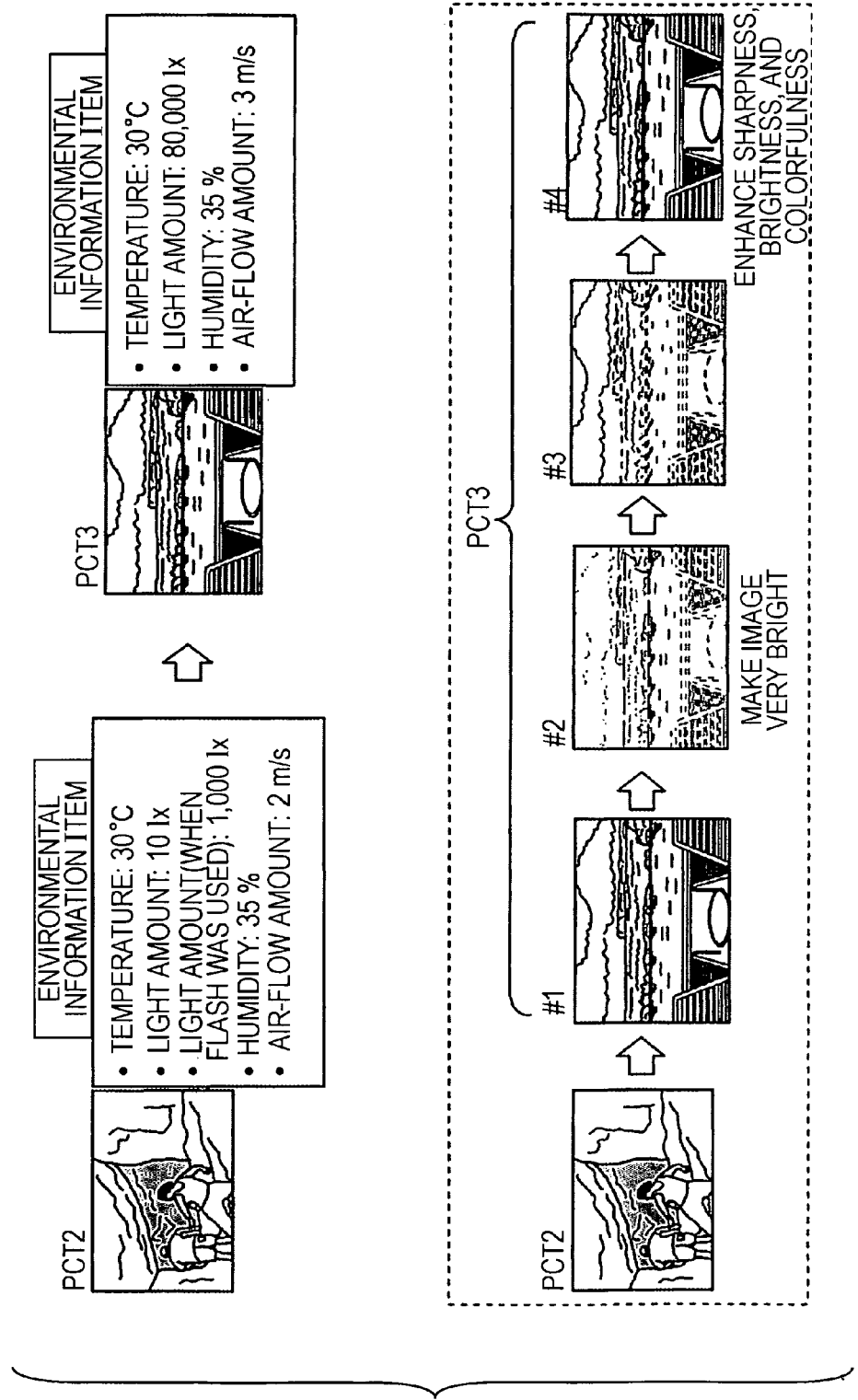

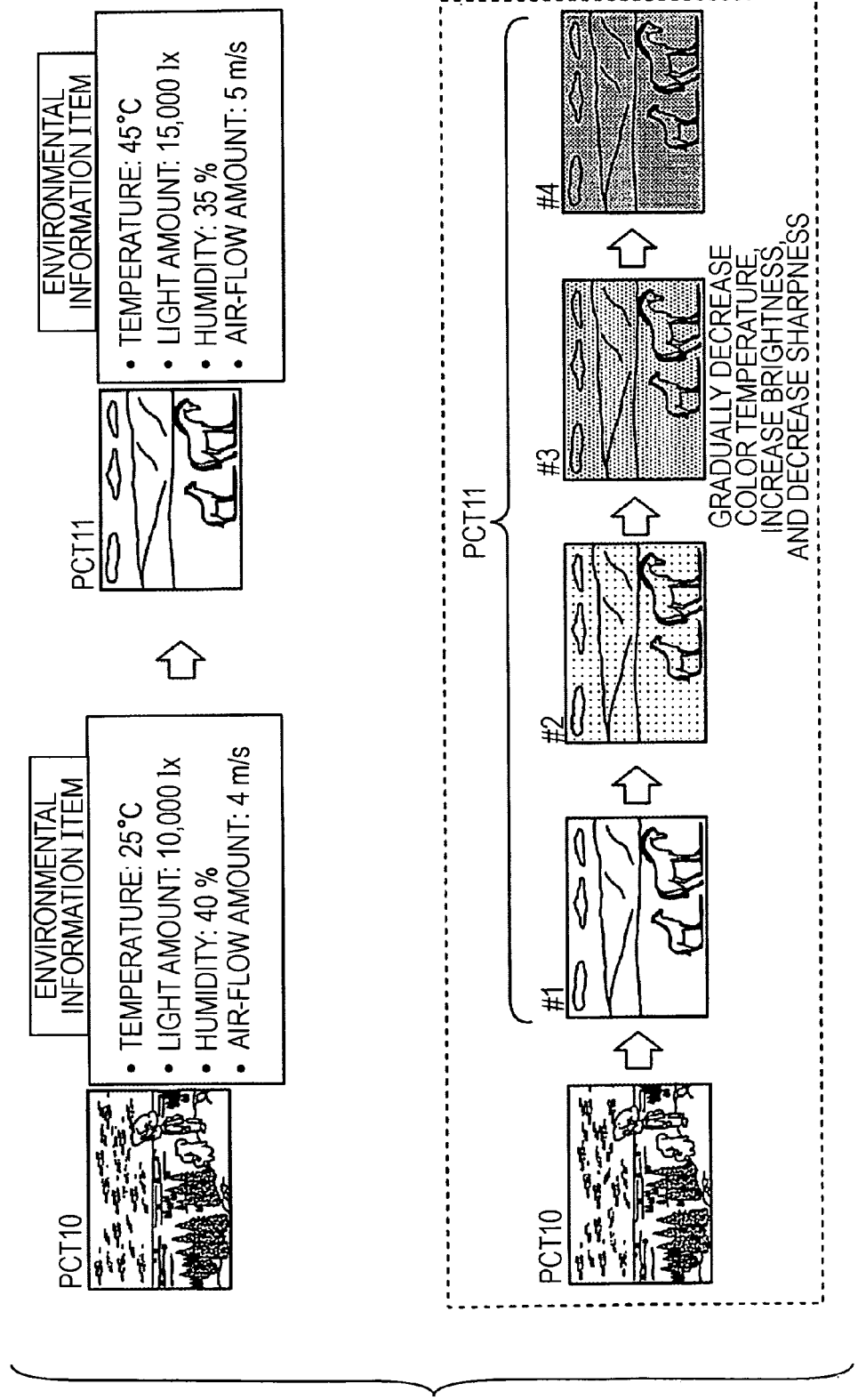

FIG. 25A

| | Slideshow Performance Setting | |
|---|---|---|
| Playback Targets | All ▼ | |
| Characteristics of Playback Images | All ▼ | |
| Criteria for Quality of Images to Be Played Back | No Image Shake Caused by Hand Motion ▼ | |
| | Cancel | Start Slideshow |

FIG. 25B

| SETTING NAME | DISPLAY NAME OF OPTION | DETAILS OF CONTENTS OF OPTION |
|---|---|---|
| PAYBACK TARGETS | ALL | DETERMINE ALL IMAGES AS PLAYBACK TARGET IMAGES |
| | SAME FOLDER | DETERMINE, AS PLAYBACK-TARGET-IMAGE GROUP, IMAGES INCLUDED IN SAME FOLDER IN WHICH CURRENTLY DISPLAYED IMAGE IS INCLUDED |
| | SAME DATE | DETERMINE, AS PLAYBACK-TARGET-IMAGE GROUP, IMAGES HAVING SAME DATE OF CURRENTLY DISPLAYED IMAGE |
| CHARACTERISTICS OF PLAYBACK IMAGES | ALL | NO LIMITATION IS IMPOSED ON CHARACTERISTICS |
| | BABY | PLAY BACK ONLY IMAGES INCLUDING BABY |
| | PERSON | PLAY BACK ONLY IMAGES INCLUDING PERSON |
| CRITERIA FOR QUALITY OF IMAGES TO BE PLAYED BACK | NO IMAGE SHAKE CAUSE BY HAND MOTION | NOT PLAY BACK IMAGES IN WHICH AMOUNT OF IMAGE SHAKE CAUSED BY HAND MOTION IS EQUAL TO OR HIGHER THAN PREDETERMINED AMOUNT |
| | ALL | NO LIMITATION IS IMPOSED ON QUALITY |
| | APPROPRIATE COMPOSITION | NOT PLAY BACK IMAGES HAVING INAPPROPRIATE COMPOSITIONS |
| | AUTO | AUTOMATIC DETERMINATION |

FIG. 26

| CASE | CHANGE IN BRIGHTNESS | CHANGE IN TEMPERATURE |
|---|---|---|
| CASE IN WHICH SELECTION ACROSS DIFFERENT FOLDERS IS PERFORMED | NO REFLECTION | NO REFLECTION |
| CASE IN WHICH IMAGE CAPTURE INTERVAL IS EQUAL TO OR LONGER THAN TWELVE HOURS | INCREASE "MINIMUM POINT pt FOR APPLICATION" BY +10 | INCREASE "MINIMUM POINT pt FOR APPLICATION" BY +10 |
| CASE IN WHICH IMAGE CAPTURE INTERVAL IS EQUAL TO OR LONGER THAN SEVEN DAYS | NO REFLECTION | NO REFLECTION |
| CHANGE BETWEEN BEING INDOORS AND BEING OUTDOORS | INCREASE "MINIMUM POINT pt FOR APPLICATION" BY +10 | INCREASE "MINIMUM POINT pt FOR APPLICATION" BY +10 |
| CHANGE BETWEEN BEING IN WATER AND BEING OUT OF WATER | NO REFLECTION | NO REFLECTION |

FIG. 27

| IMAGE CONTENTS | CHANGE IN BRIGHTNESS | CHANGE IN TEMPERATURE |
|---|---|---|
| MAIN SUBJECT IS FACE | INCREASE "MINIMUM POINT pt FOR APPLICATION" BY +10 | INCREASE "MINIMUM POINT pt FOR APPLICATION" BY +10 |
| MAIN SUBJECT IS PERSON | INCREASE "MINIMUM POINT pt FOR APPLICATION" BY +5 | INCREASE "MINIMUM POINT pt FOR APPLICATION" BY +5 |
| GROUP PHOTOGRAPH | NO REFLECTION | NO REFLECTION |
| MAIN SUBJECT IS LANDSCAPE | TYPICAL SETTINGS IN EFFECT TEMPLATE | TYPICAL SETTINGS IN EFFECT TEMPLATE |
| IMAGE SHAKE CAUSED BY HAND MOTION OCCURRED | NO REFLECTION | NO REFLECTION |
| INAPPROPRIATE COMPOSITION | NO REFLECTION | NO REFLECTION |

IMAGE PROCESSING APPARATUS, IMAGE PROCESSING METHOD, AND PROGRAM

CROSS-REFERENCE TO RELATED APPLICATION

The present application claims priority from Japanese Patent Application No. JP 2009-111708 filed in the Japanese Patent Office on May 1, 2009, the entire content of which is incorporated herein by reference.

BACKGROUND OF THE INVENTION

1. Field of the Invention

The present invention relates to an image processing apparatus, an image processing method, and a program, and, in particular, to a technology for providing an image effect in a case of display of a captured image.

2. Description of the Related Art

In Japanese Unexamined Patent Application Publication No. 2005-250977, a technology for reflecting, in an image such as a photograph, an emotion of a person who captured the image is disclosed. In this technology, an emotion reflection parameter is determined for an emotion of a person who captured an image, and image processing is performed in accordance with the emotion reflection parameter, thereby changing the tone and so forth of the image. Then, the image that has been subjected to the above-mentioned image processing is displayed. It is disclosed that display of an image in which an emotion at a time of image capture is expressed is performed in this manner.

SUMMARY OF THE INVENTION

It is desirable to make it more pleasurable, for example, to look at a photograph after a user took the photograph in a normal manner.

In other words, it is desirable that a person who is looking at a captured image perceive an ambience at a time of image capture.

An image processing apparatus according to an embodiment of the present invention includes the following elements: an image-effect determination unit configured to determine, on the basis of an environmental information item at a time of capture of an image data item, the environmental information item being associated with the image data item, a dynamic image effect in which, when the image data item is displayed, a visual change is generated for the displayed image data item; and a display control unit configured to control, for display of the image data item, a display operation so that the dynamic image effect which has been determined by the image-effect determination unit is applied.

Furthermore, the dynamic image effect may be an image effect in which a continuous visual change is generated for at least a time period that is one portion of a time period in which a still image is displayed.

Moreover, the display control unit may perform control so that the dynamic image effect is applied on a display screen by changing a display parameter while the still image is being displayed.

Additionally, the display control unit may perform control so that the dynamic image effect is applied on a display screen by performing an image synthesis process on the still image while the still image is being displayed.

Furthermore, the image-effect determination unit may determine a dynamic image effect for a playback-target image data item on the basis of an environmental-information difference that is obtained by comparing an environmental information item associated with the playback-target image data item which is to be played back and displayed with a predetermined environmental information item which is a comparative target.

The predetermined environmental information item that is a comparative target may be an environmental information item associated with an image data item that was a playback target at a point in time before the playback-target image data item is a playback target.

Moreover, when a plurality of image data items are sequentially played back and displayed, the predetermined environmental information item that is a comparative target may be an environmental information item associated with an image data item that was playback target immediately before the playback-target image data item is a playback target.

Additionally, the image processing apparatus according to the embodiment may further include a sequential-playback control unit configured to select, in accordance with a selection parameter, the plurality of image data items that are to be sequentially played back and displayed.

In addition, the predetermined environmental information item that is a comparative target may be an environmental information item associated with an image data item corresponding to a time information item indicating a time that is a time before a time indicated by a time information item corresponding to the playback-target image data item and that is closest to the time indicated by the time information item corresponding to the playback-target image data item.

Furthermore, the predetermined environmental information item that is a comparative target may be an environmental information item that is set as a fixed value.

Moreover, the image-effect determination unit may convert an environmental information item associated with a playback-target image data item that is to be played back and displayed into a body-sensory environmental information item, and may determine, using the body-sensory environmental information item, a dynamic image effect for the playback-target image data item.

Additionally, the image-effect determination unit may convert the environmental information item associated with the playback-target image data item to be played back and displayed and a predetermined environmental information item that is a comparative target into body-sensory environmental information items, and may determine, on the basis of a body-sensory-environmental-information difference that is obtained by comparing the body-sensory environmental information items with each other, a dynamic image effect for the playback-target image data item.

In addition, on the basis of the environmental information item at the time of capture of the image data item, the environmental information item being associated with the image data item, the image-effect determination unit may determine whether the dynamic image effect is to be applied or not applied or may determine a criterion for determining whether the dynamic image effect is to be applied or not applied.

Furthermore, on the basis of image contents of the image data item, the image-effect determination unit may determine whether the dynamic image effect is to be applied or not applied or determines a criterion for determining whether the dynamic image effect is to be applied or not applied.

Moreover, at least one of an information item concerning an ambient temperature at the time of capture of the image data item, an information item concerning an external-light amount at the time of capture of the image data item, an information item concerning the time of capture of the image data item, and an information item concerning a place at which the image data item was captured may be included in the environmental information item.

An image processing method according to an embodiment of the present invention includes the following steps: determining, on the basis of an environmental information item at a time of capture of an image data item, the environmental information item being associated with the image data item, a dynamic image effect in which, when the image data item is displayed, a visual change is generated for the displayed image data item; and controlling, for display of the image data item, a display operation so that the determined dynamic image effect is applied.

A program according to an embodiment of the present invention is a program causing an information processing apparatus to perform the image processing method.

In the embodiments of the present invention, using an environmental information item at a time of image capture, a dynamic image effect is provided for an image data item that is to be played back and displayed. With the dynamic image effect, an environment at the time of image capture, such as an environment (the degree of brightness/darkness, the degree of hotness/coldness, a time, a place, and so forth) that was experienced by a person who captured the image data item as an image, is expressed for a person who is looking at the image.

According to the embodiments of the present invention, a person who is looking at playback and display of a captured image data item can perceive an ambience at a time of image capture. Therefore, an original effect of a photograph or a video, such as "recollection of memory" or "conveying of impression", can be made to be more effective, and playback of an image such as a photograph can be made more pleasurable.

Furthermore, by providing a dynamic image effect for an image, an ambience can dynamically be conveyed to a person looking at the image.

BRIEF DESCRIPTION OF THE DRAWINGS

FIGS. 6A to 6C are flowcharts of criterion-value setting processes in the embodiment;

FIG. 8 includes a flowchart of an image-effect calculation process and examples of specific values in the embodiment;

FIGS. 9A to 9C are diagrams for explaining environmental information items and body-sensory environmental information items in the embodiment;

FIG. 10 is a diagram for explaining an effect template in the embodiment;

FIG. 11 is a diagram for explaining compatibilities between image effects and strengths of image effects whose priorities are low in the embodiment;

FIG. 12 is a diagram for explaining an example of a dynamic image effect in the embodiment;

FIG. 13 is a diagram for explaining an example of a dynamic image effect in the embodiment;

FIG. 14 is a diagram for explaining an example of a dynamic image effect in the embodiment;

FIGS. 25A and 25B are diagrams for explaining slideshow-performance setting in the embodiment;

FIG. 26 is a diagram for explaining an influence of a relationship between two continuous images to an image effect in the embodiment;

FIG. 27 is a diagram for explaining an influence of image contents to an image effect in the embodiment;

DESCRIPTION OF THE PREFERRED EMBODIMENTS

Hereinafter, embodiments of the present invention will be described in the order of section headings as follows:
1. Application of Present Invention Image Processing Apparatus According to Embodiment
2. Configuration of Image Capture Apparatus as Embodiment
3. Process at Time of Image Capture and Examples of Environmental Information Item
4. Slideshow Playback in Which Dynamic Image Effect Is Provided
5. Examples of Image Effects
6. Slideshow Selection Playback
7. Setting of Image Effect Using One Image
8. Various Types of Modification Examples and Application Examples
9. Information Processing Apparatus/Program 1. Application of Present Invention—Image Processing Apparatus According to Embodiment An image processing apparatus according to an embodiment determines, using an environmental information item at a time of capture of an image data item that is determined as a playback target image, an image effect for a case in which the image data item is displayed. The image processing apparatus performs playback and display of the image data item for which the image effect is provided. Accordingly, the image processing apparatus performs display in which, together with an image, an ambience at a time of image capture is recreated.

The above-mentioned operation of the image processing apparatus is realized in various types of apparatuses or systems.

Various examples in which the present invention is applied are illustrated in FIGS. 1A to 1D.

Figure 1A:
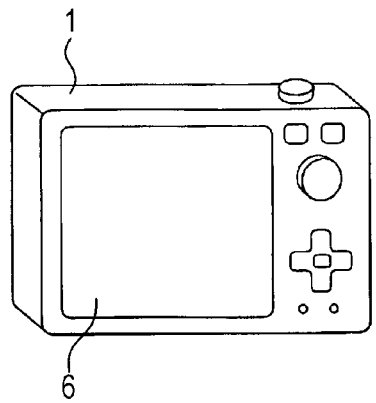
FIGS. 1A to 1D are diagrams for explaining examples of an apparatus to which an embodiment of the present invention can be applied.

FIG. 1A illustrates an image capture apparatus 1 serving as a digital still camera. The image capture apparatus 1 has a function for serving as the image processing apparatus according to the embodiment. Accordingly, when the image capture apparatus 1 performs playback and display of a captured image data item on the display panel 6, the image capture apparatus 1 can perform display for which an image effect determined on the basis of an environmental information item is provided.

In other words, the image capture apparatus 1 performs an image capture process, thereby storing a captured image data item in an internal memory or a recording medium such as a memory card. In this case, the image capture apparatus 1 also obtains an environmental information item at a time of image capture, and also stores the environmental information item in a state in which the environmental information item is associated with the captured image data item.

Then, when the image capture apparatus 1 performs playback of the image data item, the image capture apparatus 1 also reads the environmental information item corresponding to the image data item, and determines an image effect on the basis of the environmental information item. When the image capture apparatus 1 performs playback and display of the image data item, the image capture apparatus 1 provides the determined image effect, and performs display of the image data item on the display panel 6.

Accordingly, when a user performs playback of a captured image using the single image capture apparatus 1, the user can look at display of the image in which an ambience at a time of image capture is recreated.

Figure 1B:
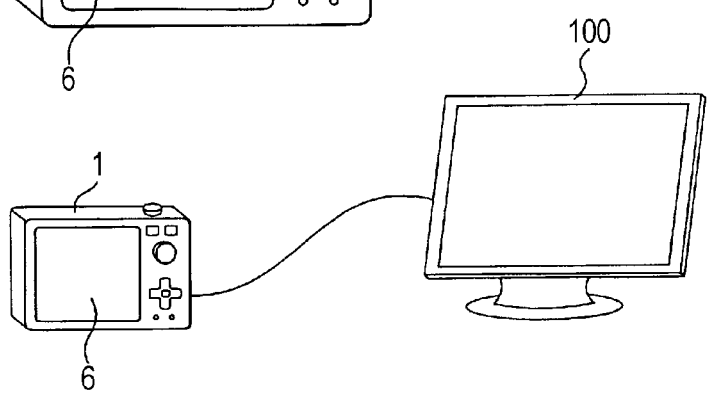

FIG. 1B illustrates an example in which the image capture apparatus 1 is connected to an external monitor apparatus 100 and in which playback of an image is performed. The monitor apparatus 100 may be a monitor apparatus dedicated to the image capture apparatus 1. Alternatively, a television image-receiving apparatus or a monitor for a personal computer is supposed as the monitor apparatus 100.

The image capture apparatus 1 has the function for serving as the above-described image processing apparatus at a time of display of an image captured by the image capture apparatus 1 on the monitor apparatus 100 connected to the image capture apparatus 1. Accordingly, when the image is played back, the user can look at, on the monitor apparatus 100, display for which an image effect determined on the basis of an environmental information item is provided.

Figure 1C:
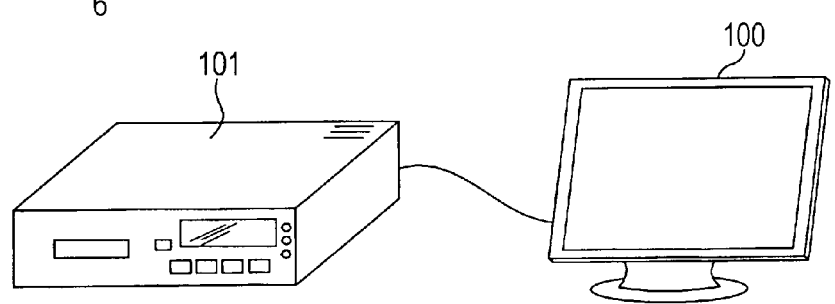

FIG. 1C illustrates an image playback apparatus 101 and the monitor apparatus 100. The image playback apparatus 101 is considered as an apparatus capable of playing back an image data item, such as a video player or a still-image playback apparatus.

The image playback apparatus 101 plays back an image data item recorded in a portable recording medium attached to the image playback apparatus 101, an image data item recorded on an internal memory or a recording medium such as a hard disk drive (HDD), or the like. The image playback apparatus 101 outputs a playback image signal corresponding to the image data item to the monitor apparatus 100.

An image data item captured by the image capture apparatus 1 or the like is recorded in a memory card. The memory card or the like can be attached to the image playback apparatus 101. Alternatively, an image data item can be transferred from the image capture apparatus 1, and can be recorded on the internal HDD or the like of the image playback apparatus 101. In this case, together with the image data item, an environmental information item is also recorded on the recording medium.

When the image playback apparatus 101 performs playback of the image data item obtained from the recording medium, the image playback apparatus 101 also reads the environmental information item corresponding to the image data item, and determines an image effect on the basis of the environmental information item. Then, the image playback apparatus 101 generates a playback image signal for which the image effect is provided, and outputs the playback image signal to the monitor apparatus 100. Accordingly, when the user plays back, using the image playback apparatus 101, a captured image, the user can look at display of the image in which an ambience at a time of image capture is recreated.

Note that, when a system in which the monitor apparatus 100 is used as illustrated in FIG. 1B or 1C is supposed, the monitor apparatus 100 may have the function for serving as the image processing apparatus.

In other words, the monitor apparatus 100 receives an image data item and an environmental information item that have been transferred from another apparatus (such as a digital still camera, a video player, or the like). Then, an image effect to be used at a time of playback of the image data item is determined on the basis of the environmental information item in the monitor apparatus 100, and playback and display for which the image effect is provided is performed.

Figure 1D:
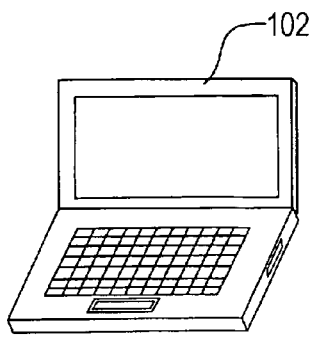

FIG. 1D illustrates a personal computer 102. For example, an image data item captured by the image capture apparatus 1 and an environmental information item are stored in a memory card. The memory card or the like is attached to the personal computer 102. Alternatively, an image data item and an environmental information item are transferred from the image capture apparatus 1, and recorded as data files on an internal HDD or the like. In the personal computer 102, when playback of the image data item is performed using predetermined application software, the application software also reads the environmental information item corresponding to the image data item, and determines an image effect on the basis of the environmental information item. Then, the application software generates a playback image signal for which the image effect is provided, and displays and outputs the playback image signal on a monitor display.

The above-described apparatuses are only examples. Regarding the embodiment of the present invention, various examples of realization of the embodiment, such as the above-described apparatuses, are supposed. For example, the embodiment of the present embodiment can be realized in apparatuses such as various types of apparatuses such as audio visual (AV) apparatuses, mobile phones, and personal digital assistants (PDAs).

Figure 2:
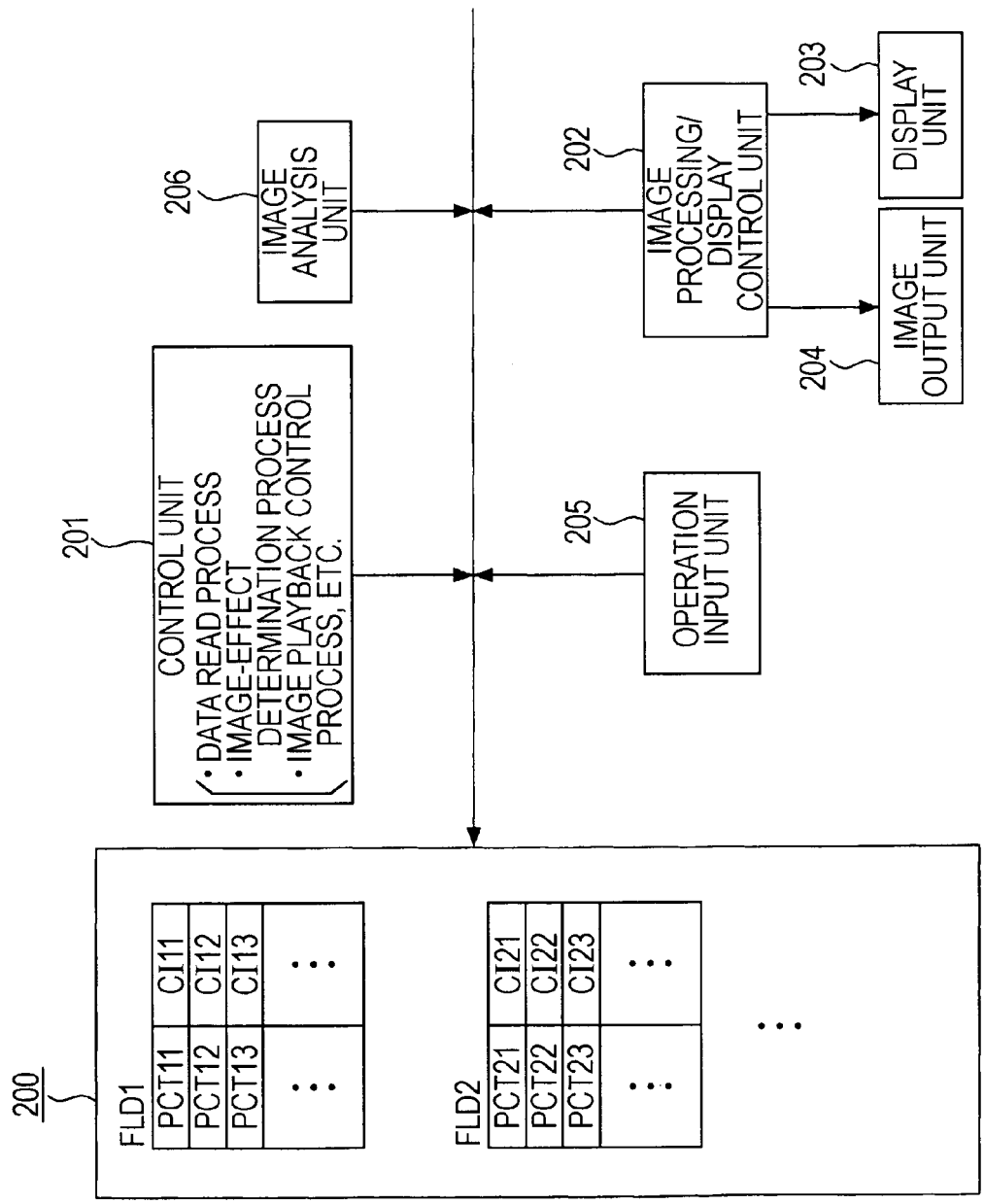
FIG. 2 is a block diagram of a configuration of an image processing apparatus according to an embodiment.

In a case in which the present embodiment is realized in each of the various types of apparatuses or systems in which the various types of apparatuses are used, an example of a configuration that is provided in the apparatus or the system is illustrated in FIG. 2.

In FIG. 2, an image storage unit 200, a control unit 201, an image processing/display control unit 202, a display unit 203, an image output unit 204, an operation input unit 205, and an image analysis unit 206 are illustrated.

The image storage unit 200 is a unit in which image data items obtained using an image capture operation and environmental information items are stored in a state in which the image data items and the environmental information items are associated with each other.

The image storage unit 200 is configured as a portable recording medium, such as a memory card or an optical disc, and a playback unit for the portable recording medium, configured as an HDD, or configured as an internal memory (such as a random-access memory (RAM) or a flash memory). Furthermore, the image storage unit 200 may be configured as a connected external device, or as an external device capable of performing communication via a network or the like.

In the image storage unit 200, for example, a plurality of image data items are stored in each folder. For example, image data items PCT11, PCT12, are included in a folder FLD1. Furthermore, image data items PCT21, PCT22, included in a folder FLD2.

In each of the folders, not only image data items PCT, but also environmental information items CI at times of capture of the image data items PCT are stored in a state in which the image data items PCT and the environmental information items CI are associated with each other. For example, the environmental information items CI (CI11, CI12,) are stored respectively in correspondence with the image data items PCT (PCT11, PCI12,).

Note that the above-described management form for managing folders is one example. Any management form may be used as a management form (including a folder configuration, a directory structure, and so forth) for managing the image data items PCT and the environmental information items CI. In the present embodiment, it is only necessary that the management form be a management form at least in which the image data items PCT and the environmental information items CI are stored in a state in which the image data items PCT and the environmental information items CI are associated with each other.

The control unit 201 includes at least one central processing unit (CPU), a control circuit, hardware that is utilized for control and that can be reconfigured.

The control unit 201 performs a data read process, an image-effect determination process, an image playback control process, and so forth.

The data read process is a process of reading the image data items PCT, which are to be played back, and the environmental information items CI from the image storage unit 200.

The image-effect determination process is a process of determining an image effect for a case of display of each of the image data items PCT determined as a playback target image using a corresponding one of the environmental information items CI at a time of capture of the image data item PCT.

The image playback control process is a process of controlling a playback operation for playback such as slideshow playback or playback that is performed in accordance with a user operation.

The image processing/display control unit 202 performs a process of providing an image effect for an image data item that is to be played back and displayed and a process of displaying and outputting the image data item. The image processing/display control unit 202 performs, as an image effect, for example, a process of changing display parameters, such as changing the brightness, changing the color balance, and changing the contrast, when an image is displayed, or an image synthesis process using a character image, a conceptual image, or the like.

The image processing/display control unit 202 performs, in accordance with a type of image effect or an amount of image effect that has been determined by control unit 201, the process on an image data item that is to be played back, thereby generating a display image signal.

Then, the generated display image signal is displayed and output on the display unit 203. Alternatively, the generated display image signal is output to an external monitor device from the image output unit 204, and displayed.

Accordingly, when playback of the image data item PCT is performed, a type of image effect or an amount of image effect is determined on the basis of the environmental information item CI, and display for which an image effect is provided in accordance with the type of image effect or the amount of image effect is performed.

The operation input unit 205 is a unit with which the user performs various types of operations for providing inputs. For example, operation elements, such as keys or a dial, are provided on the operation input unit 205. The operation input unit 205 is configured as, for example, a unit that receives an operation signal of a remote controller.

An operation information item that is provided by the operation input unit 205 is detected by the control unit 201. The control unit 201 performs control of performing a process in accordance with an operation. For example, the control unit 201 performs, in accordance with the operation information item, the image playback control process, a playback-target-image selection process, or the like.

The image analysis unit 206 determines image contents by analyzing an image data item. For example, the image analysis unit 206 determines whether an image is a landscape image or an image including a person. On the basis of a result of analysis, the control unit 201 can, for example, select a playback target image, or can use the result of analysis as one element for determination of an image effect.

For example, the image capture apparatus 1, the image playback apparatus 101, the personal computer 102, which are illustrated in FIGS. 1A to 1D, have the above-described configuration, whereby the operation of the image processing apparatus according to the present embodiment can be realized in each of the apparatuses.

2. Configuration of Image Capture Apparatus as Embodiment

Hereinafter, an example in which the present invention is applied to, for example, the image capture apparatus 1 serving as a digital still camera will be described as a more specific embodiment. The configuration and the operation of the image processing apparatus will be described in detail using the example.

A configuration of the image capture apparatus 1 according to an embodiment will be described with reference to FIG. 3.

Figure 3:
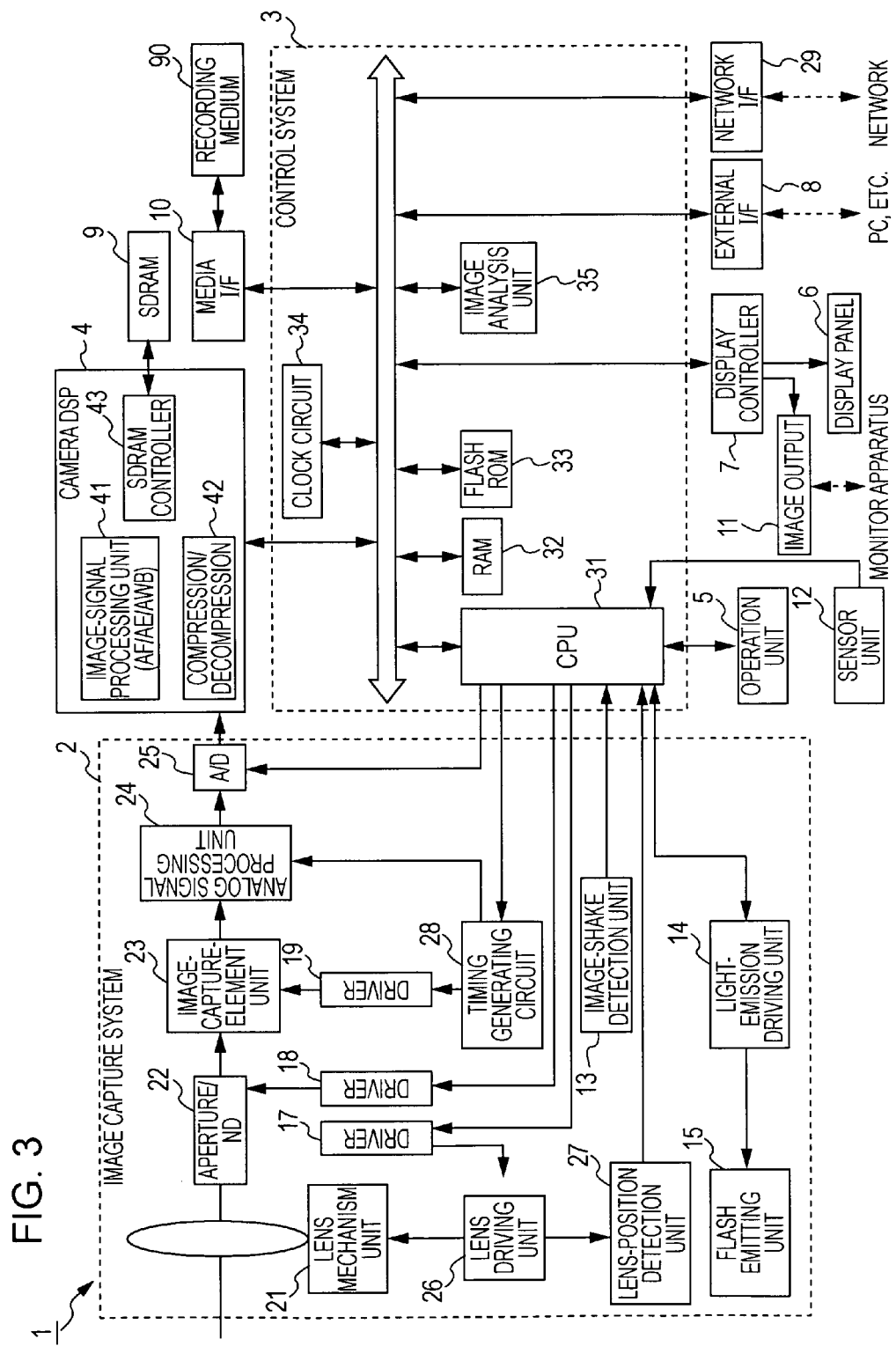
FIG. 3 is a block diagram of an image capture apparatus corresponding to the image processing apparatus according to the embodiment.

As illustrated in FIG. 3, the image capture apparatus 1 includes, an image capture system 2, a control system 3, a camera digital signal processor (DSP) 4, an operation unit 5, a display panel 6, a display controller 7, and an image output unit 11. Furthermore, the image capture apparatus 1 includes an external interface 8, a sensor unit 12, a network interface 29, a synchronous dynamic random access memory (SDRAM) 9, and a media interface 10.

The image capture system 2 is provided as a system that performs an image capture operation. The image capture system 2 includes a lens mechanism unit 21, an aperture/neutral density (ND)-filter mechanism 22, an image-capture-element unit 23, an analog signal processing unit 24, and an analog-to-digital (A/D) converter unit 25. Furthermore, the image capture system 2 includes a lens driving unit 26, a lens-position detection unit 27, a timing generating circuit 28, an image-shake detection unit 13, a light-emission driving unit 14, a flash emitting unit 15, a lens driver 17, an aperture/ND driver 18, and an image-capture-element driver 19.

Incident light from a subject is directed to the image-capture-element unit 23 via the lens mechanism unit 21 and the aperture/ND-filter mechanism 22.

The lens mechanism unit 21 includes a group of optical lenses including as a cover lens, a focus lens, a zoom lens, and so forth.

The lens driving unit 26 is provided as a transfer mechanism that transfers the focus lens or the zoom lens in a direction of an optical axis. Drive power is applied to the lens driving unit 26 by the lens driver 17, and the lens driving unit 26 transfers the focus lens or the zoom lens. A CPU 31, which is described below, controls the lens driver 17, thereby causing the lens driving unit 26 to perform focus control or a zoom operation.

The aperture/ND-filter mechanism 22 includes an aperture mechanism, and an ND filter mechanism that attenuates (adjusts) the amount of the incident light by being inserted in a lens optical system. The aperture/ND-filter mechanism 22 performs adjustment of a light amount.

The aperture/ND driver 18 performs adjustment of the amount of the incident light by opening/closing the aperture mechanism. Furthermore, the aperture/ND driver 18 performs adjustment of the amount of the incident light by inputting/outputting an ND filter on the optical axis for the incident light. The CPU 31 controls the aperture/ND driver 18 to drive the aperture mechanism and the ND filter, whereby the CPU 31 can control the amount of the incident light (control adjustment of exposure).

Light flux from the subject passes through the lens mechanism unit 21 and the aperture/ND-filter mechanism 22. A subject image is formed on the image-capture-element unit 23.

The image-capture-element unit 23 performs photoelectric conversion on the formed subject image, and outputs a captured image signal corresponding to the subject image.

The image-capture-element unit 23 has a rectangular image capture region in which a plurality of pixels are provided. The image-capture-element unit 23 sequentially outputs, in units of pixels, to the analog signal processing unit 24, the captured image signals that are analog signals corresponding to charge accumulated in the individual pixels. As the image-capture-element unit 23, for example, a charge coupled device (CCD) sensor array, a complementary metal oxide semiconductor (CMOS) sensor array may be used.

The analog signal processing unit 24 has a correlated double sampling (CDS) circuit, an automatic gain control (AGC) circuit, and so forth therein. The analog signal processing unit 24 performs predetermined analog processing on the captured image signals that have been input from the image-capture-element unit 23.

The A/D converter unit 25 converts the analog signals, which have been processed by the analog signal processing unit 24, into digital signals, and outputs the digital signals to the camera DSP 4.

The timing generating circuit 28 is controlled by the CPU 31, and controls timings of individual operations of the image-capture-element unit 23, the analog signal processing unit 24, and the A/D converter unit 25.

In other words, in order to control a timing of the image capture operation of the image-capture-element unit 23, the timing generating circuit 28 supplies, via the image-capture-element driver 19, to the image-capture-element unit 23, a timing signal for exposure/reading of charge, a timing signal for an electronic-shutter function, a synchronization signal that is determined in accordance with a transfer clock and a frame rate, and so forth. Furthermore, in order to perform a process in the analog signal processing unit 24 in synchronization with transfer of the captured image signals that is performed by the image-capture-element unit 23, the timing generating circuit 28 also supplies the above-described individual timing signals to the analog signal processing unit 24.

The CPU 31 controls the individual timing signals that are generated by the timing generating circuit 28, whereby the CPU 31 can modify the frame rate for image capture, and can perform electronic shutter control (variable control of an exposure time for a frame). Furthermore, the CPU 31 supplies, for example, a gain control signal via the timing generating circuit 28 to the analog signal processing unit 24, whereby the CPU 31 performs variable control of a gain for the captured image signals.

The image-shake detection unit 13 detects an amount of image shake caused by hand motion or an amount of the movement of the image capture apparatus 1. The image-shake detection unit 13 is configured using, for example, an acceleration sensor or a vibration sensor, and supplies a detection information item as an amount of image shake to the CPU 31.

The flash emitting unit 15 is driven by the light-emission driving unit 14 to emit light. The CPU 31 provides, at a predetermined timing that is determined in accordance with a user operation or the like, an instruction for emission of flash to the light-emission driving unit 14, whereby the CPU 31 can cause the flash emitting unit 15 to emit light.

The camera DSP 4 performs various types of digital signal processing on the captured image signals that have been input from the A/D converter unit 25 of the image capture system 2.

In the camera DSP 4, for example, as illustrated in FIG. 3, functions of performing processes that are functions of the image-signal processing unit 41, the compression/decompression processing unit 42, the SDRAM controller 43, and so forth are realized by internal hardware and software.

The image-signal processing unit 41 performs processes for the captured image signals that have been input. The image-signal processing unit 41 performs, for example, a process for automatic focus (AF) and a process for automatic iris (automatic exposure (AE)) as computation processes for control of driving the image capture system 2 using the captured image signals. Additionally, the image-signal processing unit 41 performs an automatic white balance (AWB) process or the like as a process on the captured image signals that have been input.

For example, as the process for automatic focus, the image-signal processing unit 41 detects a contrast of the captured image signals that have been input, and informs the CPU 31 of a detection information item. Various types of control schemes are common as automatic-focus control schemes. However, in a scheme that is referred to as so-called contrast AF, the image-signal processing unit 41 detects a contrast of the captured image signals at each point in time while forcibly controlling the focus lens. The image-signal processing unit 41 determines a position of the focus lens in an optimum contrast state. In other words, prior to the image capture operation, the CPU 31 checks a contrast detection value that is detected by the image-signal processing unit 41 while performing control of moving the focus lens. The CPU 31 performs control of determining, as an optimum focus position, the position of the focus lens in the optimum contrast state.

Furthermore, a detection scheme that is referred to as so-called wobbling AF can be performed as focus control while image capture is being performed. During image capture, the CPU 31 checks the contrast detection value that is detected by the image-signal processing unit 41 while constantly moving the position of the focus lens in such a manner that the focus lens is slightly changed back and forth. As a matter of course, the optimum focus position of the focus lens varies depending on the state of the subject. However, by detecting contrast while the position of the focus lens is being slightly changed back and forth, change along a format control direction that occurs in accordance with change in the state of the subject can be determined. Accordingly, automatic focus can be performed so that the automatic focus will follow the state of the subject.

Note that, a transfer-position address is assigned to each transfer position in the transfer mechanism that is the lens driving unit 26. The position of a lens is determined using the transfer-position address.

The lens-position detection unit 27 can calculate, by determining an address as the present position of the focus lens, a distance to the subject that is in an in-focus state, and can supply the calculated distance as a distance information item to the CPU 31. In this manner, the CPU 31 can determine a distance to the main subject that is in the in-focus state.

As the process for automatic iris performed by the image-signal processing unit 41 of the camera DSP 4, for example, calculation of a subject brightness is performed. For example, an average brightness of the captured image signals that have been input is calculated, and the average brightness is supplied as an subject-brightness information item, i.e., an information item concerning an amount of exposure, to the CPU 31. As schemes for calculating an average brightness, various schemes, such as a scheme in which an average value of brightness signal values of all of the pixels is calculated from a captured image data item of one frame and a scheme in which an average value of brightness signal values that are obtained by assigning a weight to the central portion of an image, are considered.

The CPU 31 can perform automatic-exposure control on the basis of the information item concerning an amount of exposure. In other words, the CPU 31 can perform adjustment of exposure using the electronic shutter control that is performed in the aperture mechanism, the ND filter, or the image-capture-element unit 23, and the variable control of a gain that is performed for the analog signal processing unit 24.

The image-signal processing unit 41 of the camera DSP 4 performs the processes of generating signals that are used for an automatic focus operation and an automatic iris operation. Further, the image-signal processing unit 41 performs, as processes on the captured image signals, the automatic white balance process, a γ correction process, an edge enhancement process, and a process of correcting image shake caused by hand motion, so forth.

The compression/decompression processing unit 42 of the camera DSP 4 performs a compression process on the captured image signals, and performs a decompression process on a compressed image data item. The compression/decompression processing unit 42 performs the compression process/decompression process using, for example, a scheme such as joint photographic experts group (JPEG) or moving picture experts group (MPEG).

The SDRAM controller 43 writes/reads data items into/from the SDRAM 9. The SDRAM 9 is used, for example, to temporarily save the captured image signals that have been input from the image capture system 2 and to save data items and reserve a work area in the course of a process that is performed by the image-signal processing unit 41 or the compression/decompression processing unit 42.

The SDRAM controller 43 writes/reads the above-mentioned data items into/from the SDRAM 9.

The control system 3 includes the CPU 31, an RAM 32, a flash read-only memory (ROM) 33, a clock circuit 34, and an image analysis unit 35. The individual units of the control system 3, the camera DSP 4, the individual units of the image capture system 2, the display controller 7, the external interface 8, and the media interface 10 can communicate image data items and control information items with one another using a system bus.

The CPU 31 performs overall control of the image capture apparatus 1. In other words, in accordance with a program that is held in an internal ROM or the like and in accordance with a user operation that is performed using the operation unit 5, the CPU 31 performs various types of computation processes and sending/receiving of control signals and so forth to/from the individual units, thereby causing the individual units to perform necessary operations.

More particularly, for an image to be displayed on the display panel 6 or a display image signal to be output to an external monitor apparatus, the CPU 31 has a function of performing processes that is a function of the control unit 201 described with reference to FIG. 2. The CPU 31 performs necessary computation processes and control processes.

In other words, as the data read process, the CPU 31 performs a process of reading an image data item that is to be played back and an environmental information item from the recording medium 90, the flash ROM 33, or the like.

Furthermore, as the image-effect determination process, the CPU 31 performs a process of determining, when display of an image data item determined as a playback target image is performed, an image effect using an environmental information item at a time of capture of the image data item.

Moreover, as the image playback control process, the CPU 31 performs a process of controlling the playback operation for playback such as slideshow playback or playback that is performed in accordance with a user operation.

The RAM 32 temporarily saves the captured image signals (an image data item of each frame) that have been processed by the camera DSP 4, and stores information items associated with various processes that are performed by the CPU 31.

The flash ROM 33 is used to save image data items that were obtained as captured images (captured as still images or moving images by the user). Further, the flash ROM is used to store an information item because it is necessary to save the information item in a non-volatile manner. In some cases, the flash ROM 33 stores a software program for controlling the image capture apparatus 1, data items concerning settings of a camera, and so forth.

The clock circuit 34 performs time counting to determine a current-time information item (year, month, day, hour, minute, and second).

The image analysis unit 35 corresponds to the image analysis unit 206 that is described with reference to FIG. 2. The image analysis unit 35, for example, performs image analysis on an image data item that is to be displayed and output by playback control performed by the CPU 31, and performs various types of image recognition.

For example, the image analysis unit 35 performs a process of recognizing a person and a process of recognizing a face included in a subject image. Furthermore, the image analysis unit 35 determines whether or not an image is an image in which the main subject is a landscape. Moreover, in some cases, the image analysis unit 35 detects various types of information items that can be recognized using image analysis for an image data item determined as a playback target image. Examples of the various types of information items include an information item concerning a state of external light at a time of image capture, a weather information item (a sunny weather/a cloudy weather) at a time of image capture, a position information item (being indoors/being outdoors/being in water/and so forth), and so forth.

The operation unit 5 includes a unit that generates signals in accordance with various operation elements that are operated by the user and operations using the various operation elements. Information items concerning operations that are performed by the user using the various operation elements are transmitted from the operation unit 5 to the CPU 31.

As the operation elements, for example, a shutter operation key, a dial for mode selection, a wide-angle/telephoto operation key, a cross key or a cursor key that is used for menu-item selection, image selection, and so forth are provided.

Note that the operation unit 5 may be configured so that the user can not only operate the operation elements, but also can perform a touch-panel operation. For example, a touch sensor may be disposed on the display panel 6, and an operation of providing an input may be a touch operation performed by the user on a screen display.

The operation unit 5 corresponds to the operation input unit 205 illustrated in FIG. 2.

The display controller 7 causes, in accordance with control that is performed by the CPU 31, the display panel 6 to perform a necessary display operation. Furthermore, the display controller 7 performs a process of outputting the display image signal from the image output unit 11 to an external device.

The display controller 7, the display panel 6, and the image output unit 11 correspond to the image processing/display control unit 202, the display unit 203, and the image output unit 204, which are illustrated in FIG. 2, respectively.

The display panel 6 is provided, for example, as a liquid crystal panel or an organic electroluminescence (EL) panel on a housing of the image capture apparatus 1 as illustrated in FIG. 1A.

The image output unit 11 is provided as an analog-image-signal output terminal, a digital-image-signal output terminal, or the like.

The display controller 7 performs, in accordance with control performed by the CPU 31, a process of providing an image effect for an image data item that is to be played back and displayed and a process of displaying and outputting the image data item. As the process of providing an image effect, the display controller 7 performs the process of changing display parameters, such as changing the brightness, changing the color balance, and changing the contrast, when an image is displayed, the image synthesis process using a character image, a conceptual image, or the like.

The display controller 7 performs, in accordance with a type of image effect or an amount of image effect that has been determined by the CPU 31, the processes on an image data item that is to be played back, thereby generating the display image signal.

Then, the generated display image signal is displayed and output on the display panel 6. Alternatively, the generated display image signal is output to an external monitor device (for example, the monitor apparatus 100 illustrated in FIG. 1B) from the image output unit 11, and displayed.

Accordingly, when playback of an image data item is performed, a type of image effect or an amount of image effect is determined on the basis of an environmental information item, and display for which an image effect is provided in accordance with the type of image effect or the amount of image effect is performed.

Furthermore, in addition to the operation of playing back and displaying an image that has been read from the recording medium 90 or the flash ROM 33, the display controller 7 also performs an operation of displaying an operation menus, an operation of displaying various icons, a process of displaying a time, and so forth as display operations performed on the display panel 6 or an external monitor apparatus.

The media interface 10 writes/reads, in accordance with control performed by the CPU 31, a data item into/from the recording medium 90, such as a memory card (a card-shaped removable memory) set inside the image capture apparatus 1. For example, the media interface 10 performs an operation of recording a still-image data item or a moving-image data item as a result of image capture on the recording medium 90. Furthermore, the media interface 10 performs an operation of reading an image data item from the recording medium 90 when the image capture apparatus 1 is in a playback mode.

Note that, herein, although the recording medium 90 is implemented as a portable memory card by way of example, the recording medium 90 may be any other recording medium for recording an image data item as a still image or a moving image that is to be saved as a result of image capture. For example, a portable disc medium such as an optical disc may be used, or an HDD may be mounted and used for recording.

The recording medium 90 or the above-described flash ROM 33 corresponds to the image storage unit 200 illustrated in FIG. 2. In other words, on the recording medium 90 or the above-described flash ROM 33, the image data items PCT and the environmental information items CI are stored, for example, in each folder FLD.

The external interface 8 sends/receives various data items to/from an external apparatus via a predetermined cable in accordance with a signal standard such as universal serial bus (USB) standard. As a matter of course, the external interface 8 may be an external interface conforming to a standard other than the USB standard, such as the Institute of Electrical and Electronics Engineers (IEEE) 1394 standard.

Furthermore, the external interface 8 is not limited to an interface using a wired transmission scheme. The external interface 8 may be configured as an interface using a wireless transmission scheme, such as infrared transmission or near field communication.

The image capture apparatus 1 can send/receive data items to/from various types of devices, which include a personal computer and so forth, via the external interface 8. For example, the image capture apparatus 1 can transfer s captured image data item PCT and an environmental information item CI to an external device.

The network interface 29 performs a communication process for accessing an external server apparatus, a website, or the like via a network such as the Internet. The CPU 31 can also obtain, using network communication that is performed via the network interface 29, environmental information items (such as a weather, a temperature, an attribute of a place at the current position) from a predetermined server apparatus or the like.

The sensor unit 12 indicates, in a collective manner, various types of sensors that can be mounted in the image capture apparatus 1. In this example, the sensor unit is particularly considered as a sensor that detects an environmental information item at a time of image capture.

For example, it is supposed that a temperature sensor, a humidity sensor, a light-amount sensor, an ultraviolet-light-amount sensor, an air-flow-amount sensor, an air-flow-velocity sensor, an air-flow-direction sensor, a velocity sensor, an acceleration sensor, an air-pressure sensor, a water-pressure sensor, an altitude sensor, a sound-volume sensor, and so forth are mounted in the sensor unit 12.

Furthermore, provision of a global positioning system (GPS) receiving unit that receives a radio wave from a GPS satellite and that outputs an information item concerning the latitude and longitude of the current position, or the like as a position sensor in the sensor unit 12 can also be considered.

3. Process at Time of Image Capture and Examples of Environmental Information Item It is described above with reference to FIG. 2 that the image data items PCT and the environmental information items CI are stored in the image storage unit 200. Regarding the image capture apparatus 1 illustrated in FIG. 3, the image data items PCT and the environmental information items CI are recorded on the recording medium 90 or the flash ROM 33 at a time of image picture. Here, a process of recording the image data items PCT and the environmental information items CI at a time of image capture, will be described.

Figure 4:
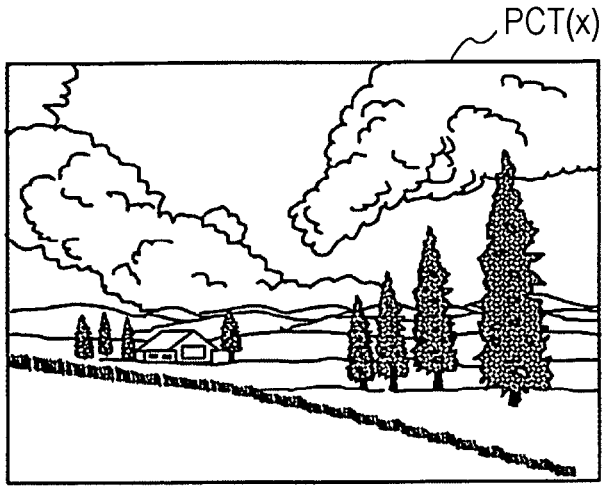
FIG. 4 is a diagram for explaining an image data item and an environmental information item in the embodiment.

FIG. 4 is a diagram illustrating an example of an image data item PCT (x) and an environmental information item CI (x) corresponding thereto. The image data item PCT (x) is considered as an image captured by the user, for example, using the image capture apparatus 1. The environmental information item CI (x) is associated with the image data item (x).

Here, the contents of the environmental information item CI (x) are as follows:

a temperature of 25° C.; a light amount of 10,000 lx; an ultraviolet-light amount of 100 lx; a humidity of 40%; and an air-flow amount of 4 m/s.

The contents of the environmental information item CI (x) are environmental values that were obtained at a time of capture of the image data item PCT (x). In other words, the contents of the environmental information item CI (x) are values indicating an ambience (the degree of hotness/coldness, the degree of brightness/darkness, and so forth) that was perceived by the user who captured the image data item PCT (x) at the time of image capture.

At a time of image capture, the image capture apparatus 1 records an image data item PCT. In addition, the image capture apparatus 1 obtains various types of environmental values from the sensor unit 12, the image analysis unit 35, the image-signal processing unit 41, the network interface 29, and the clock circuit 34, and generates an environmental information item CI.

Figure 5:
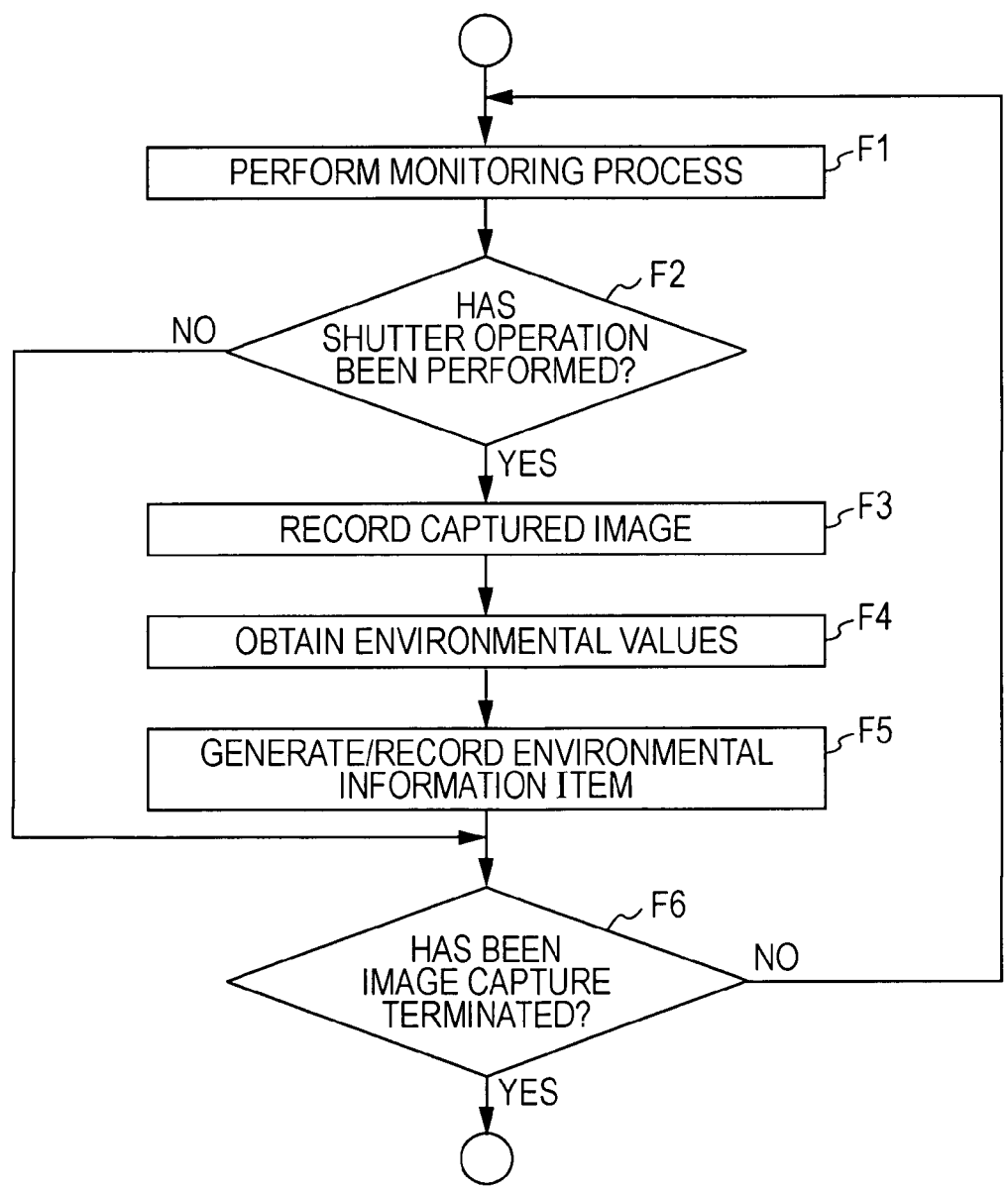
FIG. 5 is a flowchart of a process at a time of image capture that is performed in the image capture apparatus in the embodiment.

A process at a time of image capture that is performed in the image capture apparatus 1 is illustrated in FIG. 5.

For example, when the image capture apparatus 1 is powered on, the image capture apparatus 1 starts a monitoring process in step F1. Note that there is also a case in which the image capture apparatus 1 enters a playback operation mode when the image capture apparatus 1 is powered on, such as a case in which the user performs a playback instruction operation from a power-off state. The playback operation mode is used to play back a captured image, which is described below. A process in the playback operation mode is omitted in FIG. 5.

When the user continuously captures a still image or the like using the image capture apparatus 1, first the monitoring process is performed as an process for performing image capture with the image capture system 2.

The monitoring process is a process for causing the display panel 6 to display a subject image (a through image).

In other words, in the monitoring process, the CPU 31 causes each of the image capture system 2 and the camera DSP 4 to perform a process that is necessary at a time of image capture. Then, the CPU 31 loads a captured image data item of each frame that is supplied from the camera DSP 4 for example, into the RAM 32. Then, the CPU 31 passes the captured image data item of each frame to the display controller 7, and causes the display panel 6 to perform monitoring display.

With the monitoring process, the user selects a subject or waits for at a time at which the shutter release is pressed while looking at monitoring display on the display panel 6.

In a time period in which the user is not performing a shutter operation, in a case in which image capture has not been terminated (for example, in which the image capture apparatus 1 has not been powered off), the monitoring process is continued in an order of steps F2, F6, and F1.

When the CPU 31 detects that the shutter operation has been performed by the user while the monitoring process is being performed, the CPU 31 proceeds to step F3, and performs a captured-image recording process.

In other words, the CPU 31 performs a process of saving, as a still-image data item, an image data item of one frame that was captured at a time at which the shutter operation was performed. The CPU 31 transfers the image data item that was captured at the time at which the shutter operation was performed to the media interface 10, and causes the recording medium 90 to record the captured image data item as an image data item PCT.

Note that, a process of recording the captured image data item in the flash ROM 33 instead of the recording medium 90 may be performed as a recording process that is performed in accordance with the shutter operation. Furthermore, a process scheme, such as a scheme in which the captured image data item is typically recorded on the recording medium 90 and in which the captured image data item is recorded in the flash ROM 33 when the recording medium 90 is not attached, may be used.

Furthermore, in this case, the CPU 31 obtains environmental values at the point in time in step F4. The CPU 31 obtains various types of environmental values, for example, from the sensor unit 12, the image analysis unit 35, the image-signal processing unit 41, the network interface 29, and the clock circuit 34.

Then, in step F5, the CPU 31 generates an environmental information item CI. In the example illustrated in FIG. 4, for example, the CPU 31 obtains a temperature, a light amount, an ultraviolet-light amount, a humidity, an air-flow amount as individual environmental values from the temperature sensor, the light-amount sensor, the ultraviolet-light-amount sensor, the humidity sensor, and the air-flow-amount sensor included in the sensor unit 12. The CPU 31 generates an environmental information item CI such as the environmental information item CI (x) illustrated in FIG. 4.

Next, the CPU 31 causes the recording medium 90 (or the flash ROM 33) to record the generated environmental information item CI in a state in which the environmental information item CI is associated with the image data item PCT.

The CPU 31 performs the processes illustrated in FIG. 5 at a time of image capture, thereby recording the captured image data item PCT and the environmental information item CI in a state in which the image data item PCT and the environmental information item CI correspond to each other on the recording medium 90 or the flash ROM 33.

The image data item PCT recorded on the recording medium 90 or the like can be played back on the display panel 6 using an operation of the image capture apparatus 1 in the playback mode without being subjected to any process on the image data item PCT. In such a case, the CPU 31 performs, using the environmental information item CI corresponding to the image data item PCT to be played back, control of providing an image effect (the example illustrated in FIG. 1A).

Furthermore, the CPU 31 can output the playback image signal for which an image effect is provided from the image output unit 11 to the external monitor apparatus 100 or the like, and can cause the monitor apparatus 100 or the like to perform display in a manner similar to that in the example of illustrated in FIG. 1A (the example illustrated in FIG. 1B).

Additionally, in a case in which the recording medium 90 is a portable recording medium such as a memory card, the recording medium 90 is attached to the image playback apparatus 101, the personal computer 102, or the like, and the recorded image data item PCT can be played back. In this case, the image playback apparatus 101 or the personal computer 102 includes units serving as the control unit 201 and the image processing/display control unit 202 that are illustrated in FIG. 2. Accordingly, when playback and display of an image is performed, an image effect that is determined on the basis of the environmental information item CI can be provided (the examples illustrated in FIGS. 1C and 1D).

Moreover, the image capture apparatus 1 can transfer the image data item PCT and the environmental information item CI, which have been recorded on the recording medium 90 or the flash ROM 33, using the external interface 8 to the image playback apparatus 101 or the personal computer 102. Also in this case, when playback and display of an image is performed by the image playback apparatus 101 or the personal computer 102, an image effect that is determined on the basis of the environmental information item CI can be provided (the examples illustrated in FIGS. 1C and 1D).

Here, examples of the contents of the environmental information item CI and a path for obtaining the environmental information item CI that are supposed in the embodiment will be described. An environmental information item is an information item indicating a state of a place at which image capture is performed, and the state of a place is perceived by the user (a cameraman) at a time of image capture. The environmental information item includes various types of information items indicating an ambience at a place at which image capture is performed. Below examples can be considered.

Light Amount
(External-Light-Amount Value at Time of Image Capture)

A light-amount value of ambient light whose brightness is perceived by the user at a time of image capture is used. The light-amount value can be obtained using the light-amount sensor provided in the sensor unit 12. Furthermore, because exposure control is performed at a time of image capture, the image-signal processing unit 41 calculates a brightness level from the captured image signals. An external-light amount can also be estimated and calculated from the brightness level that has been calculated from the captured image signals. Moreover, the light-amount value can also be calculated from, for example, an exposure value (EV), an international organization for standardization (ISO) film speed, an aperture value, a shutter speed, and the characteristics of a lens. Additionally, correction of the calculated light-amount value with reference to a position information item (a region, being outdoors/indoors, and so forth) and a weather information item (a light intensity and a weather of the region) can also be considered.

Ultraviolet-Light Amount
(External-Light-Amount Value at Time of Image Capture)

An ultraviolet-light amount at a time of image capture at a place at which the image capture is performed is used. The ultraviolet-light amount influences the degree of brightness perceived by the user.

An ultraviolet-light-amount value can be obtained by the light-amount sensor having a wavelength filter that is provided in the sensor unit 12. Furthermore, calculation of the ultraviolet-light amount with reference to the brightness level that is calculated from the captured image signals, a position information item, a weather information item, and so forth can also be considered.

Temperature and Humidity

An information item concerning a temperature and an information item concerning a humidity at a time of image capture at a place at which the image capture is performed are used. The information item concerning a temperature and the information item concerning a humidity are considered as indicators indicating the degree of hotness/coldness, the degree of comfort/discomfort, and so forth that are perceived by the user.

The information item concerning a temperature and the information item concerning a humidity can be obtained by the temperature sensor and the humidity sensor that are provided in the sensor unit 12, respectively. Furthermore, obtaining of, in accordance with a position and a date and time at which the image capture was performed, via the Internet or the like, the information item concerning a temperature and the information item concerning a humidity at a time of the image capture can also be considered.

Air-flow Amount, Air-flow Velocity, and Air-flow Direction

An information item concerning an air-flow condition at a time of image capture at a place at which the image capture is performed is used, and considered as one element of an environment that the user perceives.

Information items concerning an air-flow amount, an air-flow velocity, and an air-flow direction can be obtained by the air-flow-amount sensor and so forth that are provided in the sensor unit 12. Furthermore, obtaining of, in accordance with a position and a date and time at which image capture was performed, via the Internet or the like, the information item concerning an air-flow condition at a time of image capture at a place at which the image capture was performed can also be considered.

Date and Time
(Time of Day, Time Frame, Time of Season, so Forth)

Examples of an information item concerning a date and time (a time information item) at a time of image capture include an information item concerning a time frame, such as the morning hours, the afternoon hours, the evening hours, the night hours, or the predawn hours, and information items concerning a year, a month, a day of week, a season, a holiday or weekday, and so forth. The information item concerning a date and time is considered as an element for recreating an ambience that the user perceived at a time of image capture.

The information item concerning a date and time can be obtained using time counting performed by the clock circuit 34. It is preferable that a time of day is modified in consideration of a time difference in accordance with a place at which image capture was performed.

Position
(Latitude and Longitude, being Indoors/Outdoors, being in the Sea/Out of the Sea, being in the Water, Altitude, and so Forth)

An information item concerning a latitude and longitude is used as a position information item. A specific place, a town, a facility, a region, a nation, or the like can be grasped in accordance with the information item concerning a latitude and longitude together with a map information item. The information item concerning a latitude and longitude is useful as an environmental information item concerning a place at which image capture was performed. Furthermore, an information item concerning being indoors/outdoors, being in the sea/out of the sea, being in the water, an altitude, or and so forth is an information item for recreating an ambience that the user directly perceived at a time of image capture, and is useful as an environmental information item.

The information item concerning a latitude and longitude can be obtained by a GPS reviver that is provided in the sensor unit 12. Furthermore, whether a place is located indoors or outdoors or whether a place is located out of the sea can be determined depending on the accuracy of the information item concerning a latitude and longitude and a map information item.

An altitude can be obtained by an altitude sensor that is provided in the sensor unit 12, or be calculated using the information item concerning a latitude and longitude together with a map information item if an aircraft or the like is considered.

Furthermore, whether image capture was performed indoors/outdoors, in the sea/out of the sea, or in the water can be estimated using analysis of image contents of an image data item PCT with the image analysis unit 35.

Audio
(Volume of Sound, Information Item Concerning Sound, and so Forth)

A volume of an ambient sound at a place at which image capture is performed, a volume of a voice, a volume of a natural sound, or the like is considered as an element for recreating an ambience, such as noisiness, liveliness, or stillness.

The volume of a sound can be obtained by the sound-volume sensor that is provided in the sensor unit 12. Furthermore, a sound-volume analysis unit may be provided. The sound-volume analysis unit can determine whether a sound is a voice or a natural sound, or the like, and can measure the volume of the sound.

Velocity and Acceleration
(On Side of Image Capture Apparatus/on Side of Subject)

A velocity of movement of the image capture apparatus 1 or a cameraman, or a velocity of a subject is also considered as an element for recreating an ambience at a time of image capture. For example, whether a case of image capture is a case in which image capture is performed in a car, a case in which an image of a subject having a high velocity is captured, or the like can be determined.

An information item concerning a velocity of movement of the image capture apparatus 1 or a cameraman can be obtained by the velocity sensor, the acceleration sensor, an angular-velocity sensor, or the like that is provided in the sensor unit 12. Furthermore, a velocity of a subject (a relative velocity to the image capture apparatus 1) can be estimated and calculated using analysis that is performed by the image analysis unit 35, such as comparison between positions of a moving subject in images of two continuous frames.

Note that an amount of image shake caused by hand motion can also be used as an information item concerning a movement of the image capture apparatus 1. Addition of an amount of image shake caused by hand motion, which is obtained by the image-shake detection unit 13, to an environmental information item CI can also be considered.

Air Pressure and Water Pressure

An air pressure or a water pressure at a time of image capture is also considered as an element for recreating an ambience at the time of image capture.

Values of an air pressure or a water pressure can be obtained by the air-pressure sensor and the water-pressure sensor, respectively, that are provided in the sensor unit 12. Furthermore, an altitude at a place at which image capture is performed can be calculated using a position information item and a map information item, and an air pressure can also be estimated.

Direction Along which Image Capture is Performed

A direction (east, west, south, or north) in which a subject is located at a time of image capture is also considered as an element for recreating an ambience at the time of image capture for a captured image.

An information item concerning a direction along which image capture is performed can be obtained, for example, by a direction sensor that is provided in the sensor unit 12.

Weather

A weather information item is also considered as an element for recreating an ambience at a time of image capture. Examples of the weather information item include an information item concerning a sunny weather, an amount of sunlight, an information item concerning a cloudy weather, an information item concerning a rainy weather, an amount of rain, a time that elapsed after rain stopped, an information item concerning a snowy weather, an information item concerning a foggy weather, an information item concerning a thunder weather, an information item concerning sleet, and information item concerning hail, an information item concerning a tornado, an information item concerning a typhoon, an information item concerning smog, and so forth.

The weather information item concerning a weather at a place at which image capture was performed can be obtained using an information item concerning a position and a date and time at which image capture was performed, for example, via the Internet or the like. Furthermore, whether it is raining, snowing, sleeting, hazing, or the like can be determined using analysis that is performed by the image analysis unit 35.

For example, as described above, various contents of the environmental information item CI can be supposed. As a matter of course, contents other than the above-described contents can also be considered, and can be included in the environmental information item CI.

Then, the individual information items can be obtained using detection performed by the sensor unit 12, using determination of image contents that is performed by the image analysis unit 35, using detection of the brightness and so forth that is performed by the image-signal processing unit 41, obtaining of information items with the network interface via a network, using determination in consideration of other information items (a position information item and so forth), or the like.

4. Slideshow Playback in which Dynamic Image Effect is Provided

Next, a specific example of a process of providing an image effect at a time of playback of image data items PCT that are associated with environmental information items CI. For example, an example of the process of providing an image effect in a case in which the image capture apparatus 1 performs playback and display on the display panel 6 or the monitor apparatus 100 will be described.

When the user performs an operation of instructing the image capture apparatus 1 to perform the playback operation, the CPU 31 performs a process in the playback operation mode.

In this case, the CPU 31 performs, in accordance with the operation performed by the user, a process of playing back an image that is recorded on the recording medium 90 or the flash ROM 33. The CPU 31 reads, in accordance with the operation performed by the user, an image that is recorded on the recording medium 90 or the flash ROM 33. The CPU 31 provides an instruction to the display controller 7, thereby controlling the display controller 7 to cause the display panel 6 to display a thumbnail image or one playback target image. In this case, the CPU 31 performs control so that not only the image data items PCT will be simply played back and displayed, but also display for which a dynamic image effect determined on the basis of the environmental information items CI is provided will be performed.

The dynamic image effect is an effect for reminding, when playback is performed, the user of an environment at a time of image capture, and is an image effect in which a continuous visual change is generated while a still image is being displayed. For example, an environment at a time of image capture is expressed using, for example, a type of image effect, a strength of the image effect, a time-series expression of the image effect, and a combination of the type of image effect, the strength of the image effect, the time-series expression of the image effect.

Hereinafter, an example of the process of providing an image effect in a case in which slideshow playback is performed will be described. The slideshow playback is considered as an operation of sequentially playing back a plurality of image data items PCT that are included in, for example, each folder specified by the user. It is supposed that the image data items PCT that are determined as playback target images are recorded on the recording medium 90.

Furthermore, various contents can be considered as the contents of the environmental information items CI as described above. However, herein, in the below description, it is supposed that the contents of the environmental information items CI include, for example, temperature, humidity, light amount, and ultraviolet-light amount.

First, a criterion-value setting process will be described with reference to FIGS. 6A to 6C.

A criterion value is a value that is used to determine a dynamic image effect to be provided at a time of playback. Examples of the criterion-value setting process are illustrated in FIGS. 6A, 6B, and 6C.

In the example illustrated in FIG. 6A, in step F101, the CPU 31 reads environmental information items corresponding to all images that are stored. For example, the CPU 31 reads all of the environmental information items CI corresponding to all of the image data items PCT that are stored on the recording medium 90 at the point in time.

Then, in step F102, the CPU 31 calculates an average value for each of environmental items of the environmental information items CI. In a case in which the contents of the environmental information items CI are temperature, humidity, light amount, and ultraviolet-light amount, average values for the individual environmental items that are temperature, humidity, light amount, and ultraviolet-light amount (an average temperature, an average humidity, an average light amount, and an average ultraviolet-light amount) are calculated.

In step F103, the CPU 31 sets each of the calculated average values (the average temperature, the average humidity, the average light amount, and the average ultraviolet-light amount) as a criterion value for a corresponding one of the environmental items.

FIG. 6B illustrates another example of the criterion-value setting process. In this example, in step F111, the CPU 31 reads environmental information items corresponding to all images that are determined as playback target images. For example, when the user specifies a certain folder FDL1 and provides an instruction for playback, the slideshow playback is considered as an operation of sequentially playing back all of the image data items PCT included in the folder FLD1. Furthermore, when the user specifies a plurality of folders, e.g., folders FLD1 and FLD2, and provides an instruction for playback, the slideshow playback is considered as an operation of sequentially playing back all of the image data items PCT included in the folders FLD1 and FLD2. Moreover, when the user specifies a portion of the folder FLD1, the CPU 31 sequentially plays back the image data items PCT included in the portion of the folder FLD. In step F111, the CPU 31 reads, in a playback range that is specified by the user, all of the environmental information items CI corresponding to all of the image data items PCT that are determined as playback target images.

In step F112, the CPU 31 calculates average values for the individual environmental items (the average temperature, the average humidity, the average light amount, and the average ultraviolet-light amount) of the environmental information items CI that have been read. Then, in step F113, the CPU 31 sets each of the calculated average values (the average temperature, the average humidity, the average light amount, and the average ultraviolet-light amount) as a criterion value for a corresponding one of the environmental items.

In other words, the difference between FIG. 6B and FIG. 6A is that a range that is used to calculate the average values for setting the criterion values is limited to a range including only playback target images that are determined in the slideshow playback this time.

FIG. 6C illustrates further another example of the criterion-value setting process. In this example, in step F121, the CPU 31 detects current environmental values. The word "current" means the current point in time when the user attempts to perform the slideshow playback. The CPU 31 detects a current temperature, a current humidity, a current light amount, and a current ultraviolet-light amount as the current environments values for the individual environmental items of the environmental information items CI, for example, from the sensor unit 12. Then, in step F122, the CPU 31 sets each of the detected environmental values (the temperature, the humidity, the light amount, and the ultraviolet-light amount) as a criterion value for a corresponding one of the environmental items.

For example, one of the above-described criterion-value setting processes is performed prior to the slideshow playback. Note that performance of the criterion-value setting process illustrated in FIG. 6A is not necessarily necessary at a time of the slideshow playback. The criterion-value setting process illustrated in FIG. 6A may be performed at a point in time when the recording medium 90 is attached, at a point in time when new image data items PCT and environmental information items CI are recorded on the recording medium 90 because image capture has been performed, or the like.

Figure 7:
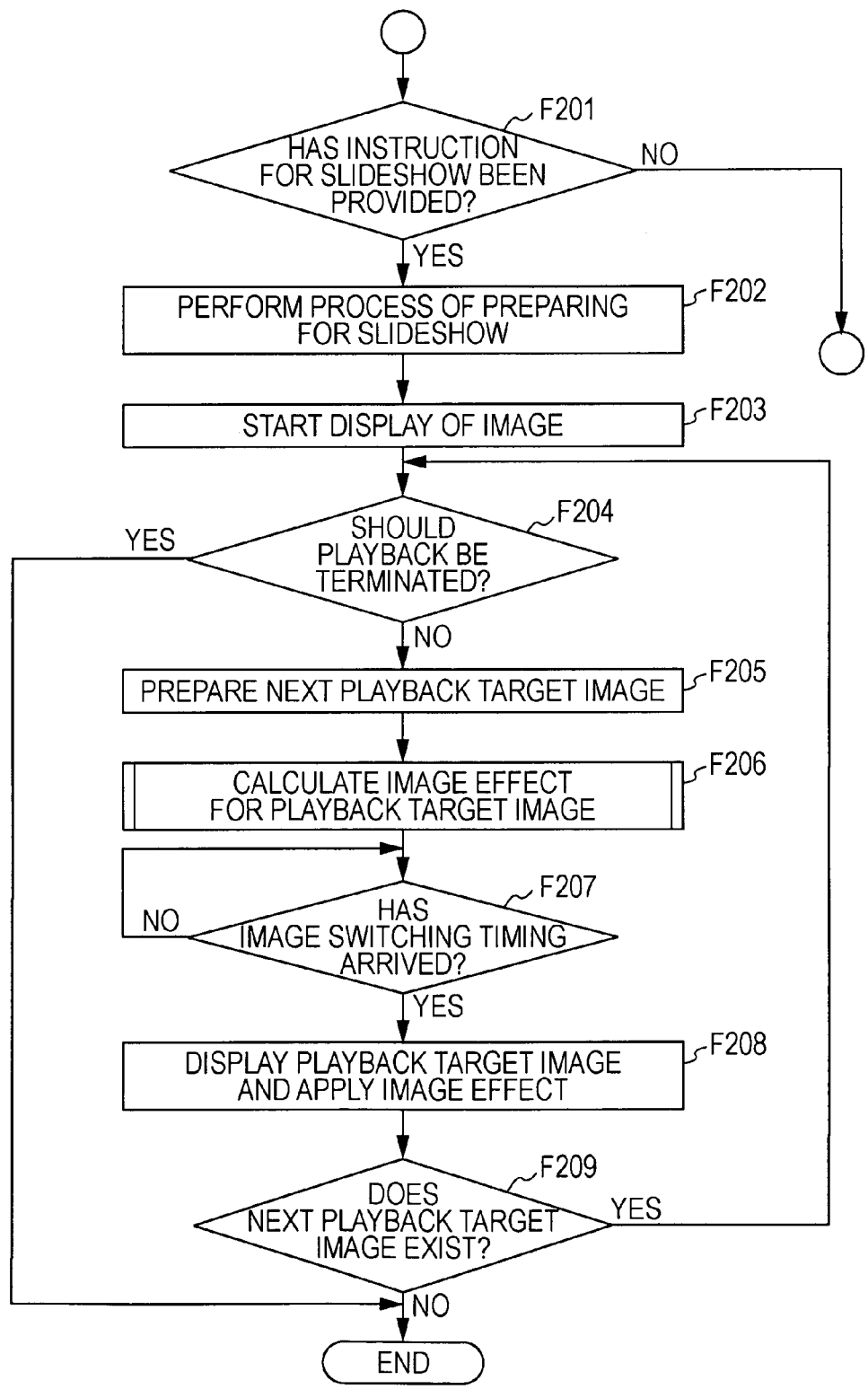
FIG. 7 is a flowchart of a slideshow playback process in the embodiment.

A process that is performed by the CPU 31 in a case in which the user specifies the playback range (for example, a folder) and performs an operation of providing an instruction for the slideshow playback is illustrated in FIG. 7.

The CPU 31 proceeds from step F201 to F202 in accordance with the operation of providing an instruction for the slideshow playback. Then, the CPU 31 performs a process of preparing for the slideshow playback. For example, the CPU 31 determines, in accordance with an input that is provided by the user, the playback range in which the slideshow playback is performed. Furthermore, the CPU 31 sets a playback time for one image, a playback order, and so forth.

Moreover, in a case in which the CPU 31 performs the criterion-value setting process illustrated in FIG. 6B or FIG. 6C, it can be considered that the CPU 31 performs the criterion-value setting process in step F202.

Additionally, the CPU 31 reads the image data item PCT that is to be first displayed and the environmental information item CI corresponding to the image data item PCT from the recording medium 90, and loads the image data item PCT and the environmental information item CI into the RAM 32.

When the CPU 31 completes preparation for playback, the CPU 31 proceeds to step F203, and the CPU 31 starts playback of the first image data item PCT in the specified playback range. In other words, the CPU 31 transfers, to the display controller 7, the first image data item PCT that has been read from the recording medium 90. The CPU 31 causes the display controller 7 to perform display the first image data item PCT on the display panel 6 (or on the monitor apparatus 100).

Note that, in an example illustrated in FIG. 7, a dynamic image effect is provided on the basis of the difference between environmental information items corresponding to two continuous images that are to be sequentially played back. Accordingly, the first image is displayed in a normal manner (display for which no image effect is particularly provided is performed). However, an example may be considered, in which a dynamic image effect is also provided for the first image.

In step F204, regarding determination of whether playback should be terminated, when the user performs an operation for terminating playback while playback of a series of images is being performed as the slideshow playback, the CPU 31 determines that playback should be terminated.

When the operation for terminating playback has not been detected, the CPU 31 process to step F205, and performs a process of preparing the next playback target image.

When slideshow starts in step F203 and playback and display of the first image data item PCT is being performed, in step F205, the CPU 31 performs a process of preparing the image data item PCT that is to be second played back and displayed. In this case, the CPU 31 determines the image data item PCT that is to be second played back and displayed, reads the image data item PCT and the environmental information item CI corresponding to the image data item PCT from the recording medium 90, and loads the image data item PCT and the environmental information item CI into, for example, the RAM 32.

Next, in step F206, the CPU 31 performs calculation of a dynamic image effect for the image data item PCT that has been loaded into the RAM 32 and that has been determined as a playback target image. In other words, the CPU 31 determines whether or not a dynamic image effect is to be provided when the image data item PCT is displayed. Furthermore, in a case in which a dynamic image effect is to be provided, the CPU 31 determines a type of dynamic image effect, an amount of the dynamic image effect, and how to apply the dynamic image effect. A type of dynamic image effect, an amount of the dynamic image effect, and how to apply the dynamic image effect are determined on the basis of comparison between the environmental information item CI corresponding to the image data item PCT and the environmental information item CI corresponding to the previous image data item PCT (i.e., an image data item that is currently displayed as a still image).

An example of an image-effect calculation process will be described below with reference to FIG. 8, FIGS. 9A to 9c, and FIGS. 10 and 11.

After that, in step F207, the CPU 31 waits for an image switching timing of the slideshow playback. For example, when the playback display time for one image in the slideshow playback is six seconds, the CPU 31 waits until six seconds elapse after display of the currently displayed image starts. When the image switching timing arrives, the CPU 31 proceeds to step F208. The CPU 31 transfers the image data item PCT that is determined as the next playback target image to the display controller 7, and causes the display controller 7 to perform display of the image data item PCT on the display panel 6. In this case, the CPU 31 provides an instruction for the type of dynamic image effect, the amount of the dynamic image effect, and how to apply the dynamic image effect, which have been determined in step F206. When the image data item PCT is displayed, the CPU 31 causes the display controller 7 to apply the dynamic image effect.

In accordance with the instruction provided by the CPU 31, the display controller 7 displays the transferred image data item PCT as a still image on the display panel 6. In addition, the display controller 7 provides the dynamic image effect in which the image is visually and dynamically changed. For example, the display controller 7 changes the display parameters while the still image is being displayed, or performs the image synthesis process on the still image, thereby applying the dynamic image effect on a display screen.

In step F209, the CPU 31 determines whether or not the next playback target image exists. In a case in which playback of all of the image data items PCT that are considered as a series of images is completed as the slideshow playback and in which the next playback target image does not exist, the CPU 31 proceeds from step F209 to the end of the flowchart to terminate the process. In a case in which the slideshow playback has not been completed and in which the next playback target image exists, the CPU 31 returns to step F204. In step F205, the CPU 31 performs the process of preparing the next playback target image. Note that, in a case in which the slideshow playback is repeatedly performed, in order to play back the first image data item PCT after playback of all of the images has been completed, the CPU 31 returns from step F209 to step F204 even while display of the last image is being performed.

In the above-described course of the slideshow playback, in step F206, the CPU 31 determines a dynamic image effect, and, in step F208, the CPU 31 controls the display controller 7 to perform display of an image for which the dynamic image effect is provided.

Hereinafter, an example of the image-effect calculation process in step F206 will be described in detail.

Part (a) of FIG. 8 illustrates an example of the image-effect calculation process for a playback target image.

Part (b) of FIG. 8 illustrates examples of specific values that are calculated in each step illustrated in part (a) of FIG. 8.

In the example illustrated in parts (a) and (b) of FIG. 8, an environmental value for each of the environmental items of an environmental information item CI for the next playback target image and an environmental value for each of the environmental items of an environmental information item CI for the previous playback target image (an image that is being displayed, hereinafter, referred to as a "previous image"), are converted into body-sensory environmental information items, and an image effect is determined on the basis of the difference between the body-sensory environmental information items.

First, in step F301, the CPU 31 obtains the environmental information item CI for the previous image and the environmental information item CI for the playback target image. For example, the CPU 31 obtains the environmental information item CI for the previous image and the environmental information item CI for the playback target image that have been loaded from the recording medium 90 into the RAM 32 in step F205 (F202) illustrated in FIG. 7.

For example, as illustrated in part (b) of FIG. 8, for the previous image, the CPU 31 obtains the following environmental values for the individual environmental items: a temperature of 25° C.; a humidity of 10%; a light amount of 10,000 lx; and an ultraviolet-light amount of 100 lx. In addition, for the playback target image, the CPU 31 obtains the following environmental values for the individual environmental items: a temperature of 40° C.; a humidity of 60%; a light amount of 10 lx; and an ultraviolet-light amount of 0 lx.

Next, in step F302, the CPU 31 converts the obtained environmental values included in the environmental information items CI into body-sensory environmental information items. For example, the CPU 31 calculates a body-sensory temperature and a body-sensory light amount as body-sensory environmental information items. Calculation equations for calculating a body-sensory environmental information item are illustrated in FIG. 9A.

A body-sensory temperature M can be calculated with the following equation using a temperature t and a humidity h.

$$M=(1/2.3) \times (t-10) \times (0.8-(h/100))$$

Furthermore, a body-sensory light amount N can be calculated with the following equation using a light amount α and an ultraviolet-light amount β.

$$N=\alpha+\beta \times 100$$

Using the above-mentioned calculation equations, for example, as illustrated in part (b) of FIG. 8, body-sensory environmental information items for the previous image are calculated as follows:

a body-sensory temperature of 21° C.; and a body-sensory light amount of 20,000 lx.

Body-sensory environmental information items for the playback target image are calculated as follows:

a body-sensory temperature of 37° C.; and a body-sensory light amount of 10 lx.

In step F303, the CPU 31 converts each of the body-sensory environmental information items into an environmental-change body-sensory amount so that an amount of increase in a value will be processed on the basis of a body-sensory amount. Then, in step F304, the CPU 31 normalizes the environmental-change body-sensory amounts so that the environmental-change body-sensory amounts can be compared with each other.

For example, FIG. 9B illustrates a relationship that is obtained by converting a body-sensory temperature into an environmental-change body-sensory amount and by normalizing the environmental-change body-sensory amount using a point value pt. FIG. 9C illustrates a relationship that is obtained by converting a body-sensory light amount into an environmental-change body-sensory amount and by normalizing the environmental-change body-sensory amount using the point value pt.

Conversion of a body-sensory temperature into an environmental-change body-sensory amount is considered as a process of reflecting the sense of temperature of a person, with which the person perceives a change in temperature. For example, in a case in which the temperature changes from 20° C. to 10° C. by 10° C., the person perceives the change in the temperature with a high sensibility in accordance with the sense of temperature so that the person says "it has become cold". Also in a case in which the temperature changes from −10° C. to −20° C., a change in the temperature is the same change of 10° C. However, for the both of the cases, the person does not necessarily perceive the change in the temperature with a high sensibility in accordance with the sense of temperature so that the person says "it is very cold". A person has a sense of brightness which is similar to that of temperature.

In the present embodiment, because the senses of the user at a time of image capture are reflected in a dynamic image effect, it is preferable to also reflect the above-mentioned difference between ways of perception.

For this reason, curves illustrated in FIGS. 9B and 9C are set. With the curves, the sense of temperature and the sense of brightness of a person are reflected as environmental-change body-sensory amounts, and the environmental-change body-sensory amounts are normalized using the point value pt.

For example, as illustrated in part (b) of FIG. 8, the body-sensory temperature of 21° C. for the previous image is converted into 67 pt using the curve illustrated in FIG. 9B. Similarly, The body-sensory temperature of 37° C. for the playback target image is converted into 88 pt using the curve illustrated in FIG. 9B.

Furthermore, the body-sensory light amount of 20,000 lx for the previous image is converted into 90 pt using the curve illustrated in FIG. 9C. Similarly, the body-sensory light amount of 10 lx for the playback target image is converted into 10 pt using the curve illustrated in FIG. 9C.

Next, in step F305, the CPU 31 calculates a body-sensory-temperature difference and a body-sensory-light-amount difference as changes in the individual normalized environmental-change body-sensory amounts (hereinafter, referred to as "amounts of body-sensory changes"), i.e., the differences between the environmental-change body-sensory amounts for the previous image and the environmental-change body-sensory amounts for the playback target image.

A body-sensory-temperature difference of +21 pt is calculated using an equation 88 pt−67 pt=+21 pt.

A body-sensory-light-amount difference of −80 pt is calculated using an equation 10 pt−90 pt=−80 pt.

In step F306, the CPU 31 determines a type of image effect for each of the body-sensory environmental information items in consideration of a corresponding one of the criterion values. The criterion values are values that are set in one of the criterion-value setting processes illustrated in FIGS. 6A to 6C as described above.

For example, an effect template illustrated in FIG. 10 is used to determine an image effect. The effect template is set in advance, and stored in, for example, the flash ROM 33. Accordingly, the CPU 31 can utilize the effect template when necessary.

The effect template illustrated in FIG. 10 is provided as an example of an effect template having contents regarding body-sensory temperatures and body-sensory light amounts. The effect template includes the following items: "Change"; "Relationship between Change and Criterion Value"; "Minimum Point pt for Application"; "Type of Image Effect", and "Details of Image Effect".

The item "Change" is a setting indicating a condition for determining whether a case of a change in body-sensory temperature or body-sensory light amount is a case of an increase or a case of a decrease.

The item "Relationship between Change and Criterion Value" is a setting indicating a condition for determining whether the above-determined case is a case in which the body-sensory temperature or body-sensory light amount is equal to or higher than the corresponding criterion value after the body-sensory temperature or body-sensory light amount has changed or a case in which the body-sensory temperature or body-sensory light amount is lower than the criterion value.

The item "Minimum Point pt for Application" is a setting indicating a condition for determining that no image effect will be provided in a case in which the absolute value of an amount of a body-sensory change that is calculated using the absolute value of the change is lower than the minimum point. In this example, the minimum point pt for application for the body-sensory temperature is set to 20 pt, and the minimum point pt for application for the body-sensory light amount is set to 30 pt.

The item "Type of Image Effect" is a setting indicating an ambience that is desired to be expressed as a dynamic image effect.

The item "Details of Image Effect" indicates the contents of a dynamic image effect (a type of image effect, an amount of the image effect, a time-series expression of the image effect, and so forth) for expressing an ambience that is set in the item "Type of Image Effect".

Regarding the item "Details of Image Effect", a time period in which a still image is displayed in the slideshow playback is divided into three time periods. An initial phase, an intermediate phase, and a final phase are examples of the three time periods. For example, when the playback display time for one image is six seconds as described above, a time period of two seconds is defined as each of the initial phase, the intermediate phase, and the final phase.

For example, the details of an image effect of "it has become hot" that are set are as follows: no image effect is provided in the initial phase; the color temperature is gradually decreased and the brightness (image brightness) is gradually increased in the intermediate phase; and no image effect is provided in the final phase.

Regarding the body-sensory temperature, whether a case of a change from the body-sensory temperature for the previous image to the body-sensory temperature for the playback target image is a case of an increase or a case of a decrease is determined using a condition that is set in the item "Change". In other words, whether the body-sensory-temperature difference calculated in step F305 is a positive value or a negative value is determined.

When it is determined that the case is a case of an increase, whether the case is a case in which the body-sensory temperature has become equal to or higher than the corresponding criterion value because of the increase or a case in which the body-sensory temperature is still lower than the criterion value even after the increase is determined.

When it is determined that the case is a case of a decrease, whether the case is a case in which the body-sensory temperature is still equal to or higher than the criterion value even after the decrease or a case in which the body-sensory temperature has become lower than the criterion value because of the decrease.

Furthermore, according to the item "Minimum Point pt for Application", for example, it is determined that an image effect will be provided in a case in which the absolute value of the body-sensory-temperature difference is, for example, equal to or higher than 20 pt.

For example, a case in which the body-sensory-temperature difference is +21 pt as in an example illustrated in part (b) of FIG. 8 is determined as a case of an "increase" in the body-sensory temperature. Furthermore, because the body-sensory-temperature difference is equal to or higher than the minimum point pt for application (20 pt), it is determined that a dynamic image effect will be applied.

Regarding comparison between a temperature and the criterion value, the temperature (of 40° C.) for the playback target image, which is included in the environmental information item CI for the playback target image, or the body-sensory temperature (of 37° C.), which has been calculated in step F302, is compared with the criterion value.

For example, supposing that a temperature used as the criterion value is set to 23° C., the temperature for the playback target image or the body-sensory temperature in this case has become equal to or higher than the criterion value after the increase. Accordingly, it is determined that the type of image effect is "it has become hot". Thus, the contents of the dynamic image effect are specifically determined as set in the item "Details of Image Effect".

Regarding the body-sensory light amount, whether a case of a change from the body-sensory light amount for the previous image to the body-sensory light amount for the playback target image is a case of an increase or a case of a decrease is determined using a condition of the item "Change". In other words, whether the body-sensory-light-amount difference calculated in step F305 is a positive value or a negative value is determined.

When it is determined that the case is a case of an increase, whether the case is a case in which the body-sensory light amount has become equal to or higher than the corresponding criterion value because of the increase or a case in which the body-sensory light amount is still lower than the criterion value even after the increase is determined.

When it is determined that the case is a case of a decrease, whether the case is a case in which the body-sensory light amount is still equal to or higher than the criterion value even after the decrease or a case in which the body-sensory light amount has become lower than the criterion value because of the decrease.

Furthermore, according to the item "Minimum Point pt for Application", for example, it is determined that an image effect will be provided in a case in which the absolute value of the body-sensory-light-amount difference is, for example, equal to or higher than 20 pt.

For example, a case in which the body-sensory-light-amount difference is −80 pt as in an example illustrated in part (b) of FIG. 8 is determined as a case of a "decrease" in the body-sensory light amount. Furthermore, because the body-sensory-light-amount difference is equal to or higher than the minimum point pt for application (30 pt), it is determined that a dynamic image effect will be provided.

Regarding comparison between a light amount and the criterion value, the light amount (of 10 lx) for the playback target image, which is included in the environmental information item CI for the playback target image, or the body-sensory light amount (10 lx), which has been calculated in step F302, is compared with the criterion value.

For example, supposing that a light amount used as the criterion value is set to 1,000 lx, the light amount for the playback target image or the body-sensory light amount in this case has become lower than the criterion value after the decease. Accordingly, it is determined that the type of image effect is "it has become dark". Thus, the contents of the dynamic image effect are specifically determined as set in the item "Details of Image Effect".

The CPU 31 determines the contents of the image effects associated with the body-sensory temperature and the body-sensory light amount, for example, using the effect template as described above.

Next, in step F307, the CPU 31 assigns priorities to the environmental items of the environmental information items in descending order of the amounts of body-sensory changes. In this case, priorities are assigned to the body-sensory temperature and the body-sensory light amount.

In the example illustrated in FIG. 8B, the body-sensory-temperature difference as an amount of a body-sensory change is 21 pt, and the body-sensory-light-amount difference as an amount of a body-sensory change is 80 pt. Accordingly, it is determined that a first priority is assigned to the body-sensory light amount, and that a second priority is assigned to the body-sensory temperature. In other words, the first priority is assigned to the image effect of "it has become dark", and the second priority is assigned to the image effect of "it has become hot".

In step F308, the CPU 31 checks a compatibility between the image effects in accordance with the priorities. A process of determining how to apply a plurality of types of image effects, such as how to simultaneously apply image effects in accordance with a compatibility or whether an image effect whose priority is low is not applied, is performed.

In FIG. 11, an example of the contents of settings of compatibilities between image effects and strengths of image effects whose priorities are low is illustrated.

In FIG. 11, the image effect of "it has become hot", the image effect of "it has become less cold", the image effect of "it has become less hot", the image effect of "it has become cold", . . . , and the image effect of "it has become dark" are listed in each of vertical and horizontal directions, and the relationships between the image effects in the vertical direction and the image effects in the horizontal direction are illustrated.

"x" indicates a case that not easily occurs as a combination of image effects whose priorities are first and second, such as the image effect of "it has become hot" and the image effect of "it has become cold".

"Nothing" indicates a case in which image effects whose priorities are first and second have no compatibility. A case in which image effects have no compatibility can be considered as a case in which simultaneous application of the image effects in a specific manner is not necessary. For example, in this case, when image effects whose priorities are first and second are the image effect of "it has become less hot" and the image effect of "it is no longer dark", respectively, the image effect whose priority is second is not considered.

Each of values that are in the range of from "1%" to "99%" indicates a case in which image effects have a compatibility and in which the value is used as the strength of the image effect whose priority is low (the amount of decrease in the amount of the image effect). For example, when image effects whose priorities are first and second are the image effect of "it has become cold" and the image effect of "it has become dark", respectively, regarding the amount of the image effect of "it has become dark" whose priority is second, 50% of the amount of the image effect that is set in the item "Details of Image Effect" of the effect template illustrated in FIG. 10 is applied.

In the example illustrated in FIG. 8B, the first priority is assigned to the image effect of "it has become dark", and the second priority is assigned to the image effect of "it has become hot". In this case, according to the relationships illustrated in FIG. 11, regarding the image effect whose priority is second, "10%" of the amount of the image effect is applied. In other words, regarding the image effect of "it has become hot", 10% of the amount of the image effect that is set in the item "Details of Image Effect" of the effect template is applied.

Finally, in step F309, the CPU 31 determines the type of image effect to be applied and the strength of each image effect in accordance with the amounts of body-sensory changes and the compatibility between the image effects to which priorities have been assigned.

In the example illustrated in FIG. 8B, the type of image effect and the amounts of image effects are specifically determined using the image effect of "it has become dark" whose priority is first and the image effect of "it has become hot" whose priority is second.

For example, in the initial phase, the brightness is decreased by 80 pt×1%, and the sharpness is decreased by 80 pt×0.5%. According to the effect template illustrated in FIG. 10, regarding the image effect of "it has become hot", no image effect is set for the initial phase. Accordingly, regarding the image effect of "it has become dark", only an image effect that is set for the initial phase is applied.

In the intermediate phase, regarding the image effect "it has become dark", an image effect is set, in which the brightness and the sharpness are gradually changed back to the original brightness and the original sharpness, respectively. Accordingly, the image effect is applied without being subjected to any process. In contrast, regarding the image effect "it has become hot", an image effect is set, in which the color temperature is gradually decreased and the brightness is gradually increased. However, the amount of the image effect whose priority is second is multiplied by "10%". Accordingly, the color temperature is gradually decreased by 21 pt×0.1%. The brightness is increased by 21 pt×0.02%. However, because an increase of 0.02% is significantly small as an amount of an image effect, the image effect is not applied.

In the final phase, no image effect is set for both of the image effect of "it has become dark" and the image effect of "it has become hot". No image effect is applied.

In step F206 illustrated in FIG. 7, the CPU 31 specifically determines a type of image effect, an amount of the image effect, and a time-series expression of the image effect for the playback target image as illustrated in FIG. 8A given above.

In step F208, the CPU 31 provides, to the display controller 7, an instruction for applying the determined image effect. When the display controller 7 causes the display panel 6 to display the playback target image, the display controller 7, for example, changes the display parameters (the brightness, the color temperature, the sharpness, the contrast, and so forth) or performs the image synthesis process, thereby controlling display for which the image effect specified in the instruction is provided.

With the above-described process, a person who is looking at slideshow of captured image data items can perceives changes in ambience at times of image capture. More particularly, an image effect is determined on the basis of comparison between an environmental information item CI for the playback target image and an environmental information item CI for the previous image. In this manner, changes in ambience at times of capture of individual images and changes that a person who captured the images experienced can appropriately be expressed in the images that are sequentially played back as a slideshow. Therefore, an original effect of a photograph or a video, such as "recollection of memory" or "conveying of impression", can be made to be more effective, and playback of an image such as a photograph can be made more pleasurable.

Note that the above-described process is described as a process performed in the slideshow playback. The above-described process can be applied not only to the slideshow playback, but also similarly to a case in which individual image data items included in a folder are sequentially played back in accordance with an operation of advancing the page on the display screen which is typically performed by the user.

Furthermore, in the image-effect determination process, a body-sensory environmental information item is determined using the contents of an environmental information item CI, and a type of image effect, an amount of the image effect, and so forth are determined on the basis of the body-sensory environmental information item. However, an image effect may be determined using values (a temperature, a light amount, and so forth) for the individual environmental items of the environmental information item CI without performing any process on the environmental information item CI, instead of using the body-sensory environmental information item.

5. Examples of Image Effects

Practical examples of image effects will be described.

FIGS. 12 to 15 are examples of cases in which image effects are determined using the processes that are described above with reference to FIG. 8, FIGS. 9A and 9B, and FIGS. 10 and 11.

For example, FIG. 12 illustrates a case in which an image data item PCT1 is being currently displayed in the course of the slideshow playback and in which an image data item PCT2 will be displayed as the next playback target image. An example of an environmental information item corresponding to each of the image data items PCT1 and PCT2 is illustrated. Regarding light amount, a light amount for the image data item PCT1 is 10,000 lx, and a light amount for the image data item PCT2 is 10 lx.

As a situation in which the user was placed at a time of image capture, a case is indicated, in which the user captured the image data item PCT1 at a certain place outside, and in which, when the user entered a dark place such as a cave after that, the user performed the next image capture to capture the image data item PCT2.

Change in a displayed image on the display screen caused by providing a dynamic image effect is illustrated in a broken-line area at the bottom of the FIG. 12. The broken-line area indicates an example of a case in which provision of the image effect of "it has become dark" is determined using the image-effect calculation process that is performed using the environmental information item corresponding to the image data item PCT1 and the environmental information item corresponding to the image data item PCT 2 and that is illustrated in FIG. 8.

With the image effect, an ambience that the user experienced at a time of image capture is recreated. In other words, after the user is outside where it is bright, the user enters a cave, so that the user perceives that it is very dark in the cave. The degree of darkness that the user perceives in this case, i.e., a situation in which the user is placed when the user moves into a dark place, is expressed using the dynamic image effect. More specifically, a situation is expressed, in which the user can see a landscape before the user enters a dark place, in which the user is not able to see the inside of the dark place because of darkness when the user enters the dark place, and in which the user becomes able to see the inside of the dark place because the pupils of the user gradually becomes accustomed to the darkness after a while.

As illustrated in the broken-line area, the display switched from a display of the image data item PCT1 to a display of the image data item PCT2 (#1) at the image switching timing of the slideshow playback. Immediately after that, in the display of the image data item PCT2, the brightness and the sharpness are decreased, whereby the display screen becomes dark (#2). In this manner, a phenomenon in which a person becomes temporarily unable to see the surroundings because of darkness when the person enters a dark place is expressed using the dynamic image effect in which the brightness is decreased. Furthermore, because the person is unable to clearly see an object in the dark place, the sharpness is also decreased.

After that, the brightness and the sharpness are gradually changed back to the original brightness and the original sharpness, respectively (#3). A phenomenon in which the eyes of the person gradually become accustomed to the darkness and in which the person gradually becomes able to see the surroundings is expressed using the dynamic image effect. Finally, the display of the image data item PCT2 is changed back to the normal display of the image data item PCT2 (#4). In this manner, a phenomenon in which the eyes of the person become accustomed to the darkness and in which the user becomes able to observe the surroundings is expressed.

FIG. 13 illustrates a state in which the display is next changed from the display of the image data item PCT2 to a display of an image data item PCT3. A light amount for the image data item PCT2 that is determined as the previous image is 10 lx, and the light amount for the image data item PCT2 that is determined as the playback target image is 80,000 lx. A case is illustrated, in which a dynamic image effect of "it has become very bright" is applied. As a situation in which the user was placed at a time of image picture, a case is indicated, in which the user moved from the cave to a bright place.

Change in a displayed image illustrated in a broken-line area indicates an example of applying dynamic image effects for recreating the following two situations: a situation in which, when the user moves into a very bright place, the user feels that the user can see a landscape for a brief moment, in which the user becomes temporarily unable to see the landscape because of very bright light, and in which the user becomes able to see the landscape because the pupils of the user gradually become accustomed to the very blight light; and a situation in which the user can clearly and vividly see edges in a bright place.

As illustrated in the broken-line area, the display is switched from the display of the image data item PCT2 to the display of the image data item PCT3 (#1) at the image switching timing of the slideshow playback.

Immediately after that, an image effect in which the brightness for the entire display is increased so as to be set to a very high value is applied (#2). In this manner, a phenomenon in which, when a person has moved into a bright place, the person becomes temporarily blinded and sees an object with difficulty is expressed using the dynamic image effect.

A phenomenon in which, after the blindness, the eyes of the person become accustomed to the very blight light, and in which the person gradually becomes able to see the surroundings is expressed using a dynamic image effect in which the brightness is gradually changed back to the original brightness (#3). Then, finally, the sharpness, the brightness, and the colorfulness are set to appropriate values, thereby expressing a phenomenon in which a person can clearly and vividly see an object in a bright place (#4).

Next, FIG. 14 illustrates an example of a process that is performed in a case of display of an image that was captured when the user moved into a hot place.

Regarding an image data item PCT10 determined as the previous image, a "temperature" included in an environmental information item is 25° C. It is indicated that the image was captured under an environment in which the temperature was 25° C. On the other hand, regarding an image data item PCT11 determined as the next playback target image, a "temperature" included in an environmental information item is 45° C. It is indicated that the image was captured under an environment in which the temperature was 45° C.

Change in a displayed image illustrated in a broken-line area illustrated in FIG. 14 in this case indicates an example of recreating the following situation: when the user has moved into a hot place, the user recognizes a state of being in the hot place with his/her sense of sight; and, after that, the user gradually perceives a change in temperature via the skin of the user.

First, the display is switched from a display of the image data item PCT10 to a display of the image data item PCT11 (#1).

In order to express a state of being hot, for example, the color temperature is decreased, the brightness is increased, and the sharpness is decreased.

When the user has moved into a hot place, depending on a temperature, the user gradually feels hot after a while without immediately thinking that "it is hot" in most cases. For this reason, first, the amounts of changes in the color temperature, the brightness, and the sharpness are decreased (#2). Then, in order to express a phenomenon in which the user gradually feels hot as the user gradually recognizes the state of being in the hot place, the color temperature is gradually decreased, the brightness is increased, and the sharpness is decreased (#3). After that, finally, in order to further clearly express the state of being in the hot place, the amounts of changes in the parameters including the color temperature and so forth are maximized (#4).

Figure 15:
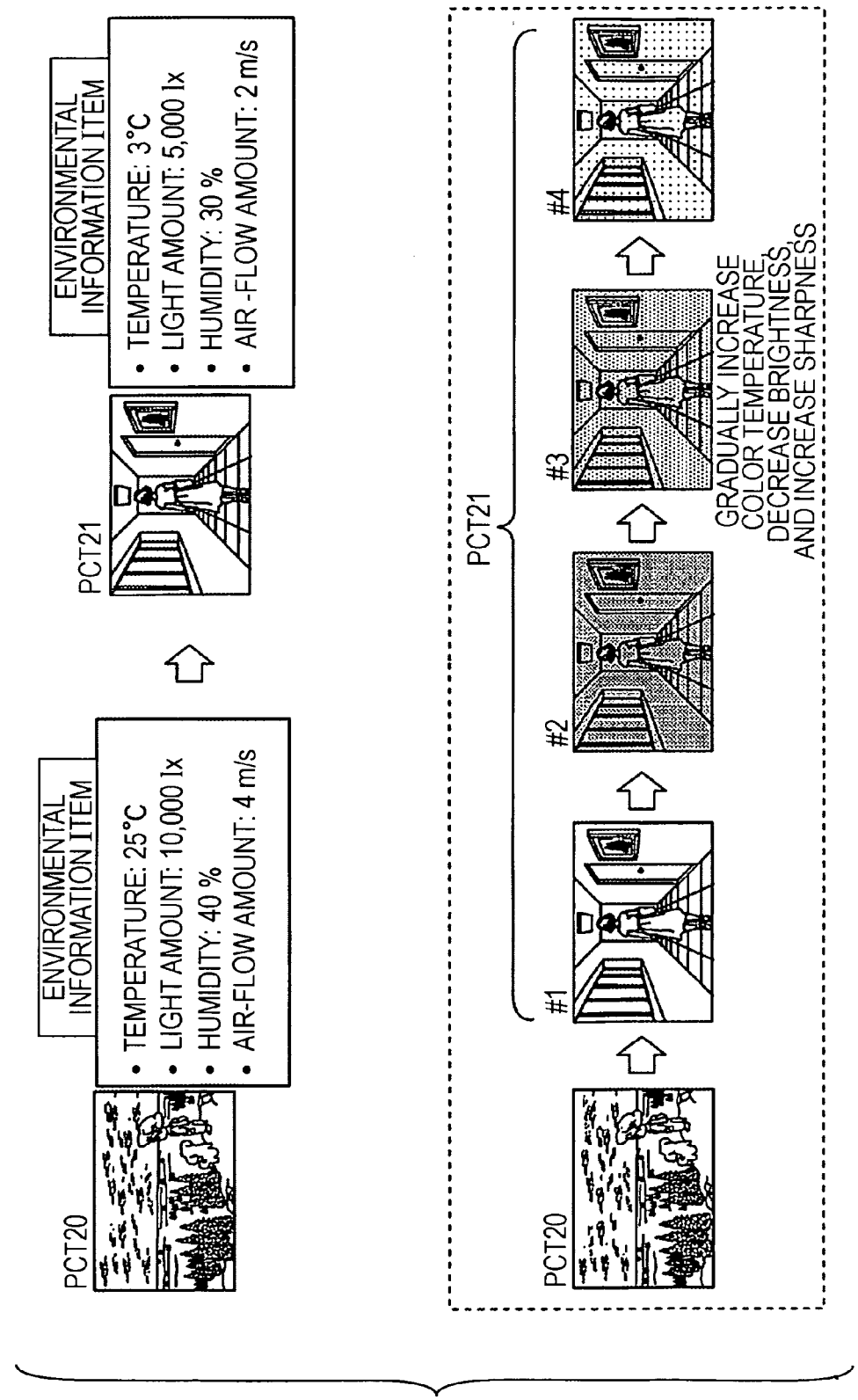
FIG. 15 is a diagram for explaining an example of a dynamic image effect in the embodiment.

FIG. 15 illustrates an example of a process that is performed in a case of display of an image that was captured when the user moved into a cold place.

Regarding an image data item PCT20 that is determined as the previous image, a "temperature" included in an environmental information item is 25° C. It is indicated that the image was captured under an environment in which the temperature was 25° C. On the other hand, regarding an image data item PCT21 that is determined as the next playback target image, a "temperature" included in an environmental information item is 3° C. It is indicated that the image was captured under an environment in which the temperature was 3° C.

Change in a displayed image illustrated in a broken-line area illustrated in FIG. 15 in this case indicates an example of recreating the following situation: when the user has moved into a cold place, the user recognizes a state of being in the cold place with his/her sense of sight; and, after that, the user gradually perceives a change in temperature via the skin of the user.

First, the display is switched from a display of the image data item PCT20 to a display of the image data item PCT21 (#1).

In order to express a state of being cold, for example, the color temperature is increased, the brightness is decreased, and the sharpness is increased.

When the user has moved into a cold place, depending on a temperature, the user gradually feels cold after a while without immediately thinking that "it is cold" in most cases. For this reason, first, the amounts of changes in the color temperature, the brightness, and the sharpness are decreased (#2). Then, in order to express a phenomenon in which the user gradually feels cold as the user gradually recognizes the state of being in the cold place, the color temperature is gradually increased, the brightness is decreased, and the sharpness is increased (#3). After that, finally, in order to further clearly express the state of being in the cold place, the amounts of changes in the parameters including the color temperature and so forth are maximized (#4).

The display controller 7 dynamically changes the display parameters including the brightness (brightness change (tone)), the color temperature, the sharpness (edge enhancement and blurring) and so forth in a direction of a time axis, for example, in accordance with the image effects that are determined using the effect template illustrated in FIG. 10, whereby displays of the image data items illustrated in FIGS. 12 to 15 given above are realized.

Furthermore, application of, for example, the following effects to the image data items PCT as image effects using the display parameters can be considered: color-balance change; image special effects (fluctuation, motion, transformation, and so forth); contrast change; and colorfulness change. Moreover, application of, for example, the following effects can also be considered: gamma-value change; resolution change; overlapping of images with each other (displacing and overlapping of the same transparent images with each other); noise addition; color-gradation change; and light-source enhancement (extension of a white portion or the like).

Note that, in the dynamic image effects, visual and dynamic changes are provided on the display screen without changing the image data items.

From a point of view in which a displayed image is changed without changing an image data item, an example of a scheme in which the display parameters including the brightness, the color temperature, the sharpness, and so forth are dynamically changed is described. However, another scheme for changing a displayed image without changing an image data item can also be considered as a scheme other than the scheme in which the display parameters are changed. For example, a scheme in which the brightness of a backlight source of the display panel is dynamically changed corresponds to the above-mentioned scheme.

Additionally, more various examples can be considered as examples of image effects for recreating an ambience at a time of image capture. For example, schemes, such as a scheme in which an image data item that is to be displayed is modified and a scheme in which a displayed image is added, can also be considered. Other examples of image effects will be described with reference to FIGS. 16 to 19 and FIGS. 20A and 20B.

Figure 16:
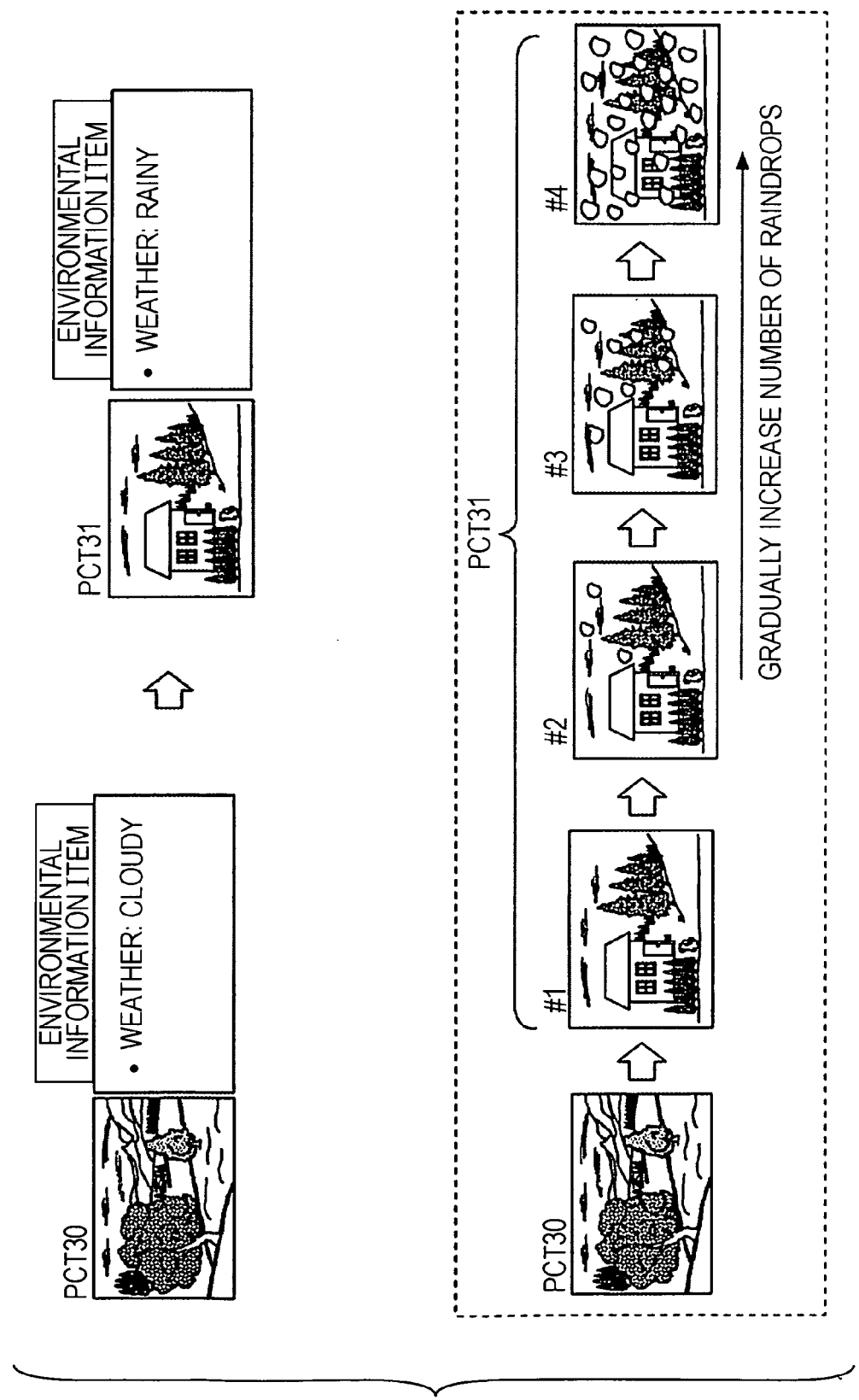
FIG. 16 is a diagram for explaining an example of a dynamic image effect in the embodiment.

FIG. 16 illustrates an example of providing a dynamic image effect using image synthesis. In other words, the example is an example of changing, using the image synthesis process, an image data item that is a display target.

For example, regarding an image data item PCT30 determined as the previous image, a "weather" included in an environmental information item is a cloudy weather. Regarding an image data item PCT31 prepared as the next playback target image, a "weather" included in an environmental information item is a rainy weather.

Change in a displayed image illustrated in a broken-line area illustrated in FIG. 16 in this case indicates an example of recreating, using image synthesis, a situation in which it started raining at a time of capture of the image data item PCT31.

First, the display is switched from a display of the image data item PCT30 to a display of the image data item PCT31 (#1).

In order to express a fact that it starts raining, a scheme is employed, in which an image of raindrops is combined with the image data item PCT31. In other words, after the display has been switched to the display of the image data item PCT31, the amount of the combined image of raindrops is increased, thereby gradually increasing the number of raindrops on the display (#1→#2→#3→#4).

With the above-described dynamic image effect, a situation at a time of image capture can be expressed.

In addition to image synthesis using an image of raindrops, examples of various types of image synthesis can be considered in accordance with weather. For example, when an environmental information item indicates that the weather changes from being cloudy to being sunny, an image indicating a state of being illuminated by sunlight (an image of sunlight) is combined. An image of a rainbow is combined with an image indicating a state in which it has stopped raining.

Figure 17:
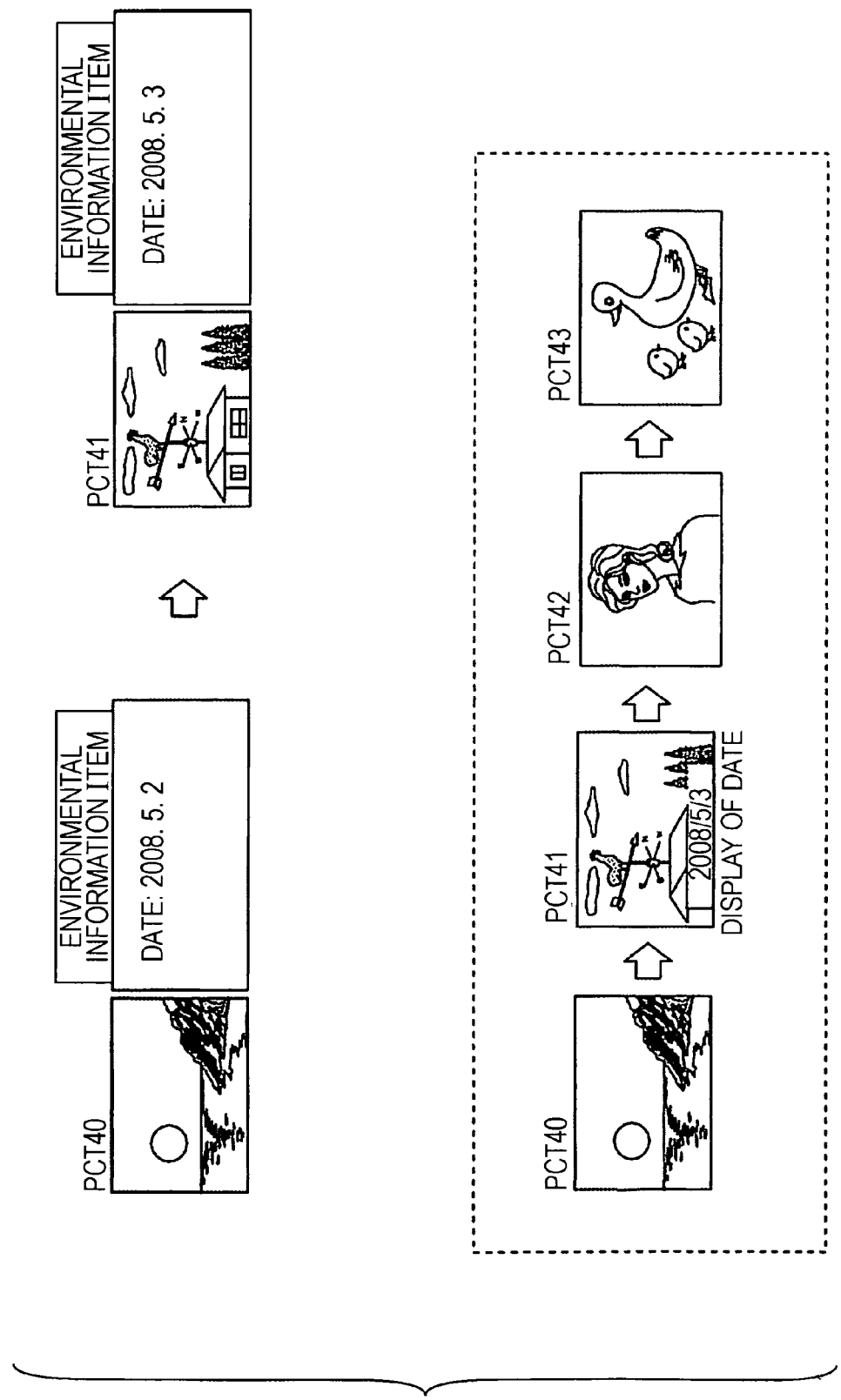
FIG. 17 is a diagram for explaining an example of a dynamic image effect in the embodiment.

FIG. 17 illustrates an example of adding a display of a date as a static image effect using image synthesis.

For example, regarding an image data item PCT40 determined as the previous image, a "date" included in an environmental information item is 2008. 5. 2. Regarding an image data item PCT41 prepared as the next playback target image, a "date" included in an environmental information item is 2008. 5. 3.

A state in which the image data items PCT40, PCT41, PCT42, and PCT43 are sequentially played back in this order in the slideshow playback is illustrated in a broken-line area illustrated in FIG. 17 in this case. A display of a date is combined at a time at which the date changes, i.e., at a time at which the image data item PCT41 is displayed.

With the above-described image effect, a fact that the date changes in a series of playback target images while the slideshow playback is being performed, i.e., a fact that the image data item PCT 41 and the image data items subsequent thereto were captured on the next day, is shown to the user. This causes the user to recall having used his/her senses at a time of image capture.

Figure 18:
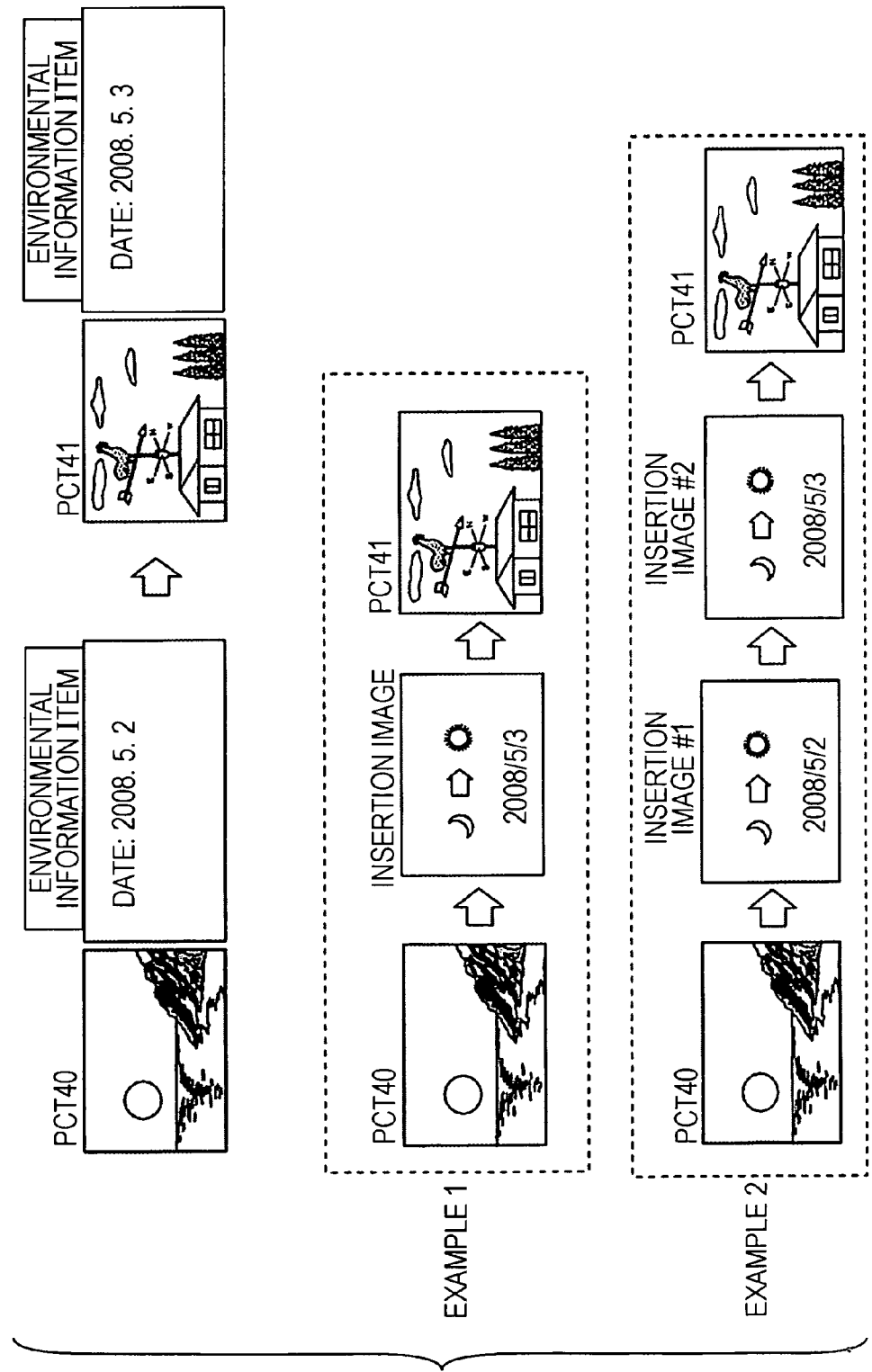
FIG. 18 is a diagram for explaining an example of a dynamic image effect in the embodiment.

An image effect illustrated in FIG. 18 can also be considered as an example of using a date as an environmental information item.

In FIG. 18, an image effect is not applied to a captured image data item. FIG. 18 illustrates an example of display of an insertion image in the course of the slideshow playback.

For example, as illustrated in a broken-line area as Example 1, when switching from a display of the image data item PCT40 to a display of the image data item PCT41 is performed, an image indicating a date "2008. 5. 3" on which the image data item PCT41 was captured is inserted as an insertion image.

Furthermore, as in Example 2, when switching from the display of the image data item PCT40 to the display of the image data item PCT41 is performed, an insertion image #1 indicating a date on which the image data item PCT40 was captured and an insertion image #2 indicating the date on which the image data item PCT41 was captured are sequentially displayed. After that, the image data item PCT41 is displayed.

Also with the above-described image effect, a fact that the date changes in a series of playback target images while the slideshow playback is being performed can be shown to the user. This causes the user to recall having used his/her senses at a time of image capture.

Figure 19:
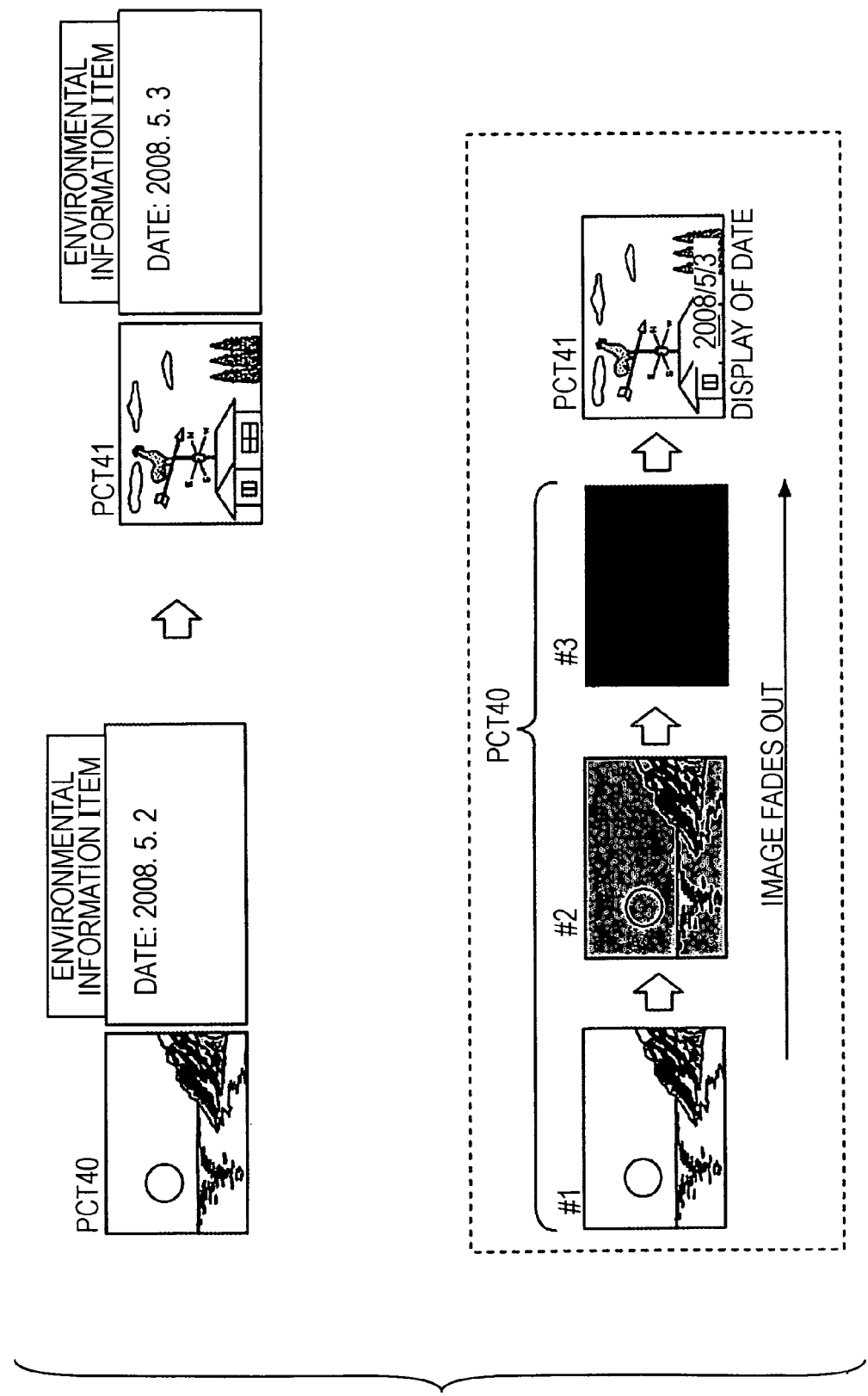
FIG. 19 is a diagram for explaining an example of a dynamic image effect and a static image effect in the embodiment.

FIG. 19 illustrates an example of a combination of a dynamic image effect and a static image effect.

As in the above-described cases illustrated in FIGS. 17 and 18, dates are used as environmental information items corresponding to the image data items PCT40 and PCT41.

As illustrated in a broken-line area of FIG. 19, when switching from a display of the image data item PCT40 to a display of the image data item PCT41 is performed, the image data item PCT40 fades out (#1→#2→#3).

Furthermore, after the image data item PCT40 has faded out, the display is switched to the display of the image data item PCT41. In this case, a display of a date is combined.

The above-described dynamic image effect in which an image fades out causes the user to recognize that the end of one day is indicated by the image (the image data item PCT40), and that the next image (the image data item PCT41) and images subsequent thereto were captured on the next day. This can remind the user of an ambience at a time of image capture.

Figure 20:
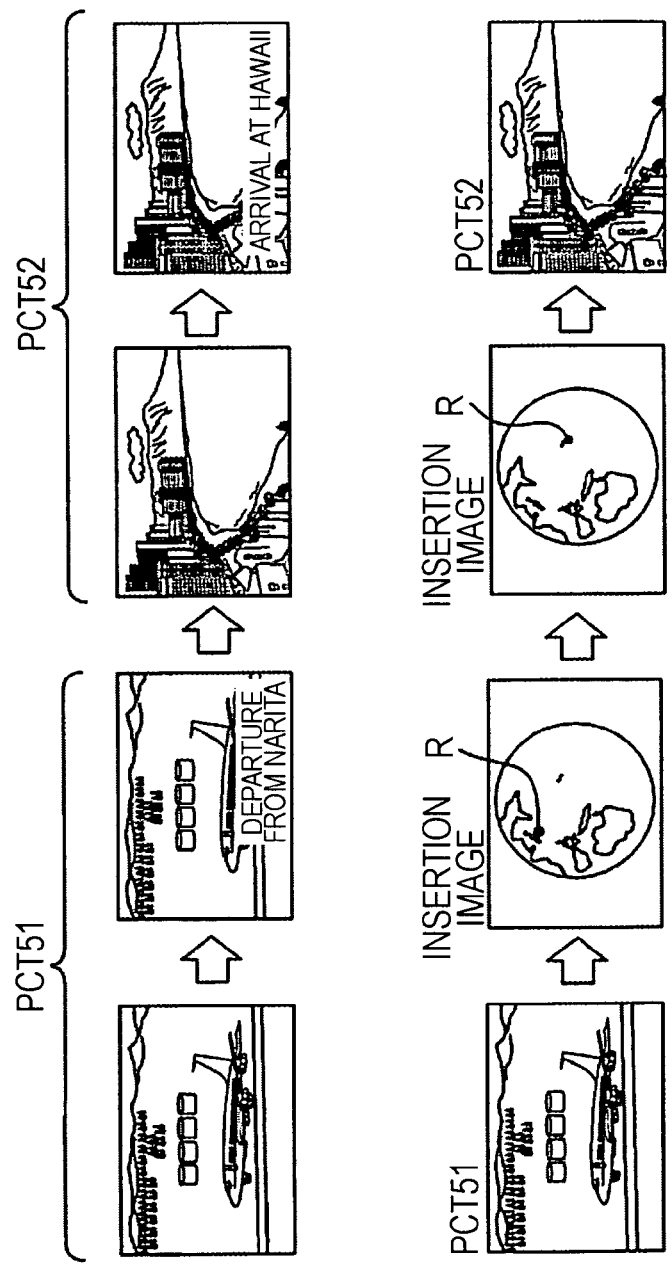
FIGS. 20A and 20B are diagrams for explaining examples of image effects in the embodiment.

FIG. 20A illustrates an example of adding a static image effect in accordance with a "position" as an environmental information item. An image data item PCT51 is considered as an image that was captured at Narita airport. An image data item PCT52 is considered as an image that was captured after the user arrived at Hawaii.

In a case in which position information items corresponding to the two continuous image data items are "Narita Airport" and "Hawaii", which are different from each other, when the image data item PCT51 is played back, an image of characters "Narita Airport" is combined. Then, after the display is switched to a display of the image data item PCT52, an image of characters "Arrival at Hawaii" is combined. Accordingly, a fact that the place at which image capture was performed was switched from one place to another place can be shown to the user, and this causes the user to recall having used his/her senses at a time of travel.

FIG. 20B illustrates an example of displaying an insertion image in accordance with the different position information items when display of the image data items PCT51 and PCT52 is performed.

In this case, an image of the earth is displayed as an insertion image. A pointer such as a red circle R is moved from Narita to Hawaii on the image of the earth. The above-described display can cause the user to realize movement to Hawaii.

Examples of various types of image effects are described above. As a matter of course, the variety of image effects (dynamic image effects, static image effects, and combinations thereof) can be considered. The variety of image effects can also be considered in accordance with the type of environmental information item.

Shaking of the display screen, addition of an image of flying leaves, or the like in accordance with an environmental condition such as an air-flow amount or an air-flow velocity can be considered.

Furthermore, when the position is "being out of the water", an image effect in which an image of a spray of water is randomly added can be considered.

Additionally, an image effect can also be considered, in which the tone (including the brightness, the color temperature, and so forth) of a basic displayed image is changed as a time frame changes in the order of the predawn hours, the morning hours, the afternoon hours, the evening hours, the night hours, and so forth.

Furthermore, an image effect can also be considered, in which an image of characters indicating a sound effect is added in accordance with the volume of a sound such as cheering or crowd noise.

6. Slideshow Selection Playback

Next, an operation of slideshow selection playback will be described.

In the above-described slideshow playback, the user specifies a folder or the like, image data items that are determined as playback target images in accordance with the specification are sequentially played back. Slideshow selection playback includes setting of conditions for selection of image data items PCT to be determined as playback target images. An image effect for reminding the user of an ambience at a time of image capture is provided in the course of the slideshow selection playback.

Furthermore, as in the above-described example, the effect template is used to determine an image effect. However, here, an example will be described, in which a process of modifying the contents of settings in the effect template in consideration of environmental information items corresponding to two continuous image data items is also added.

Figure 21:
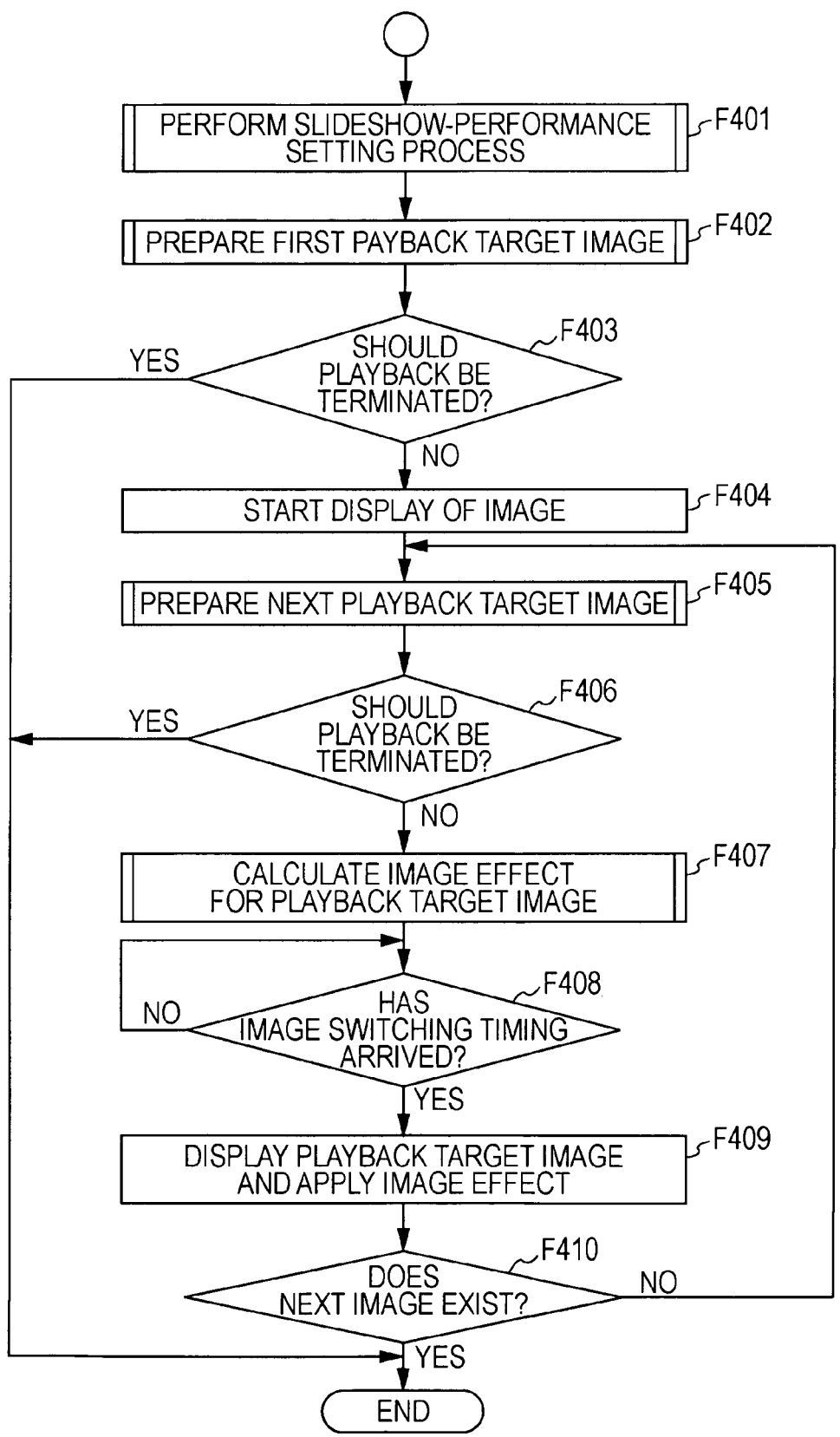
FIG. 21 is a flowchart of a slideshow selection playback process in the embodiment.

A process performed by the CPU 31 in the slideshow selection playback is illustrated in FIG. 21.

First, in step F401, the CPU 31 performs a slideshow-performance setting process. The slideshow-performance setting process is illustrated in FIG. 22A.

Figure 22B:
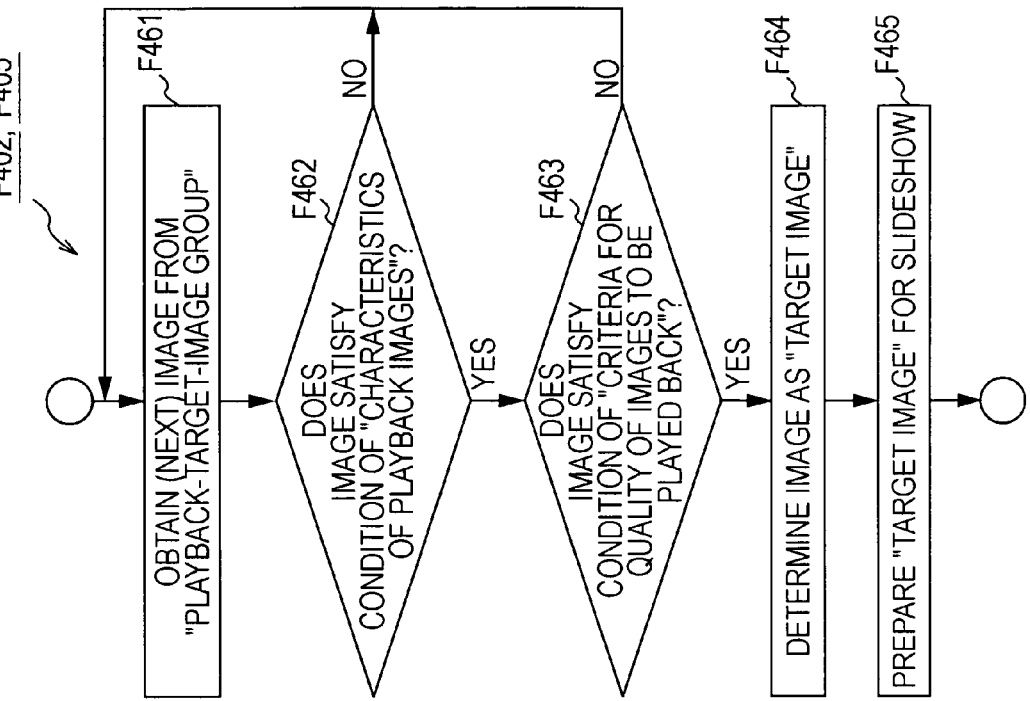
FIGS. 22A and 22B are a flowchart of a slideshow-performance setting process and a flowchart of a playback-target-image preparation process in the embodiment.
Figure 22A:
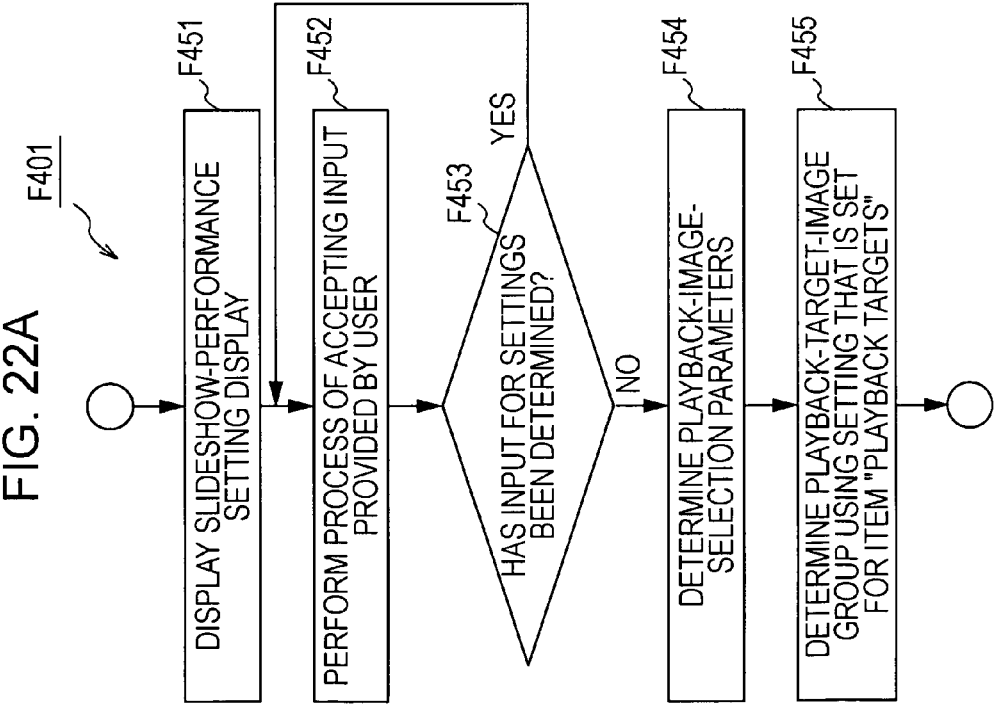

In step F451 illustrated in FIG. 22A, the CPU 31 instructs the display controller 7 to cause the display panel (or the monitor apparatus 100) to display a slideshow-performance setting screen.

The slideshow-performance setting screen is a screen with which the user sets conditions for selecting images to be played backed as a slideshow. For example, a screen illustrated in FIG. 25A is used. Here, the contents of each of items "Playback Targets", "Characteristics of Playback Images", and "Criteria for Quality of Images to Be Played Back" can be selected using a pull-down menu. Moreover, a slideshow start button, a cancel button, and so forth are displayed.

In step F452, the CPU 31 performs a process of accepting an input that is provided by the user on the slideshow-performance setting screen.

An example of the contents of settings that can be set on the slideshow-performance setting screen is illustrated in FIG. 25B.

For example, regarding the item "Playback Targets", the user can select "All", "Same Folder", or "Same Date" as an option.

"All" is a setting in which all image data items PCT are determined as playback target images.

"Same Folder" is a setting in which images (image data items PCT) that are included in the same folder in which the currently displayed image is included are determined as a playback-target-image group.

"Same Date" is a setting in which images (image data items PCT) having the same date of the currently displayed image are determined as a playback-target-image group.

Regarding the item "Characteristics of Playback Images", the user can select "All", "Baby", or "Person" as an option.

"All" is a setting in which no limitation is imposed on the characteristics of image contents.

"Baby" is a setting in which only images including a baby are played back.

"Person" is a setting in which only images including a person are played back.

As a matter of course, examples of other settings other than the above-described settings, such as "Only Landscape", "Image in Which Main Subject Is Landscape", "Image in Which Main Subject Is Natural Object", and "Image in Which Main Subject Is Artificial Object", can also be considered.

Regarding the item "Criteria for Quality of Images to Be Played Back", the user can select "No Image Shake Caused by Hand Motion", "All", "Appropriate Composition", or "Auto" as an option.

"No Image Shake Caused by Hand Motion" is a setting in which images in which the amounts of image shake caused by hand motion are equal to or higher than a predetermined amount are not played back.

"All" is a setting in which no limitation is imposed on the quality of images.

"Appropriate Composition" is a setting in which images having inappropriate compositions are not played back. Examples of images having inappropriate compositions include an image in which a portion of a face is cut at a corner of a frame and so forth.

"Auto" is a setting in which automatic determination is performed using a predetermined condition.

Examples of other settings other than the above-described settings, such as "Not Out-of-Focus" and "Not against Light", can also be considered.

The user performs an operation for providing an input for settings using the pull-down menus or the like on the slideshow-performance setting screen, thereby selecting settings. When the user inputs conditions by selecting settings, the user performs an operation for providing an input for starting slideshow.

In step F452, the CPU 31 accepts the input for settings. When the user provides the input for starting slideshow, the CPU 31 determines that the input for settings has been determined, and proceeds from step F453 to step F454. In step F454, the CPU 31 determines playback-image-selection parameters. In other words, the CPU 31 determines conditions indicated by the settings, which have been input by the user, for the individual items "Playback Targets", "Characteristics of Playback Images", and "Criteria for Quality of Images to Be Played Back".

Then, in step F455, the CPU 31 determines a playback-target-image group using the condition indicated by the setting in the item "Playback Targets". For example, when "Same Folder" is selected, all image data items PCT that are included in the same folder in which the currently displayed image is included are determined as a playback-target-image group.

Note that, regarding FIG. 21 and FIGS. 22A and 22B, none of the criterion-value setting processes that are described with reference to FIGS. 6A to 6C is described. However, in a case in which the criterion-value setting process illustrated in FIG. 6A is employed, the criterion-value setting process can be performed in advance. Furthermore, in a case in which the criterion-value setting process illustrated in FIG. 6B is employed, at a point in time when a playback-target-image group is determined in step F455, the criterion-value setting process can be performed for all image data items in the playback-target-image group.

Additionally, also in a case of performance of the criterion-value setting process illustrated in FIG. 6C, performance of the criterion-value setting process at a time at which the slideshow-performance setting process is performed can be considered.

When the CPU 31 finishes the slideshow-performance setting process in this manner, in step F402 illustrated in FIG. 21, the CPU 31 performs preparation of the first playback target image.

A playback-target-image preparation process is illustrated in FIG. 22B.

In step F461, the CPU 31 obtains the first image data item from the playback-target-image group that has been determined in the slideshow-performance setting process (in step F455 illustrated in FIG. 22A). In other words, the CPU 31 reads, from the recording medium 90, an image data item PCT that is to be first displayed and an environmental information item CI corresponding to the image data item PCT, and loads the image data item PCT and the environmental information item CI into the RAM 32.

Then, the CPU 31 determines whether or not the obtained image data item PCT satisfies the conditions for the individual items "Characteristics of Playback Images" and "Criteria for Quality of Images to Be Played Back".

In this case, unless the settings in the individual items are "All", the CPU 31 transfers the image data item PCT to the image analysis unit 35, and determines whether or not the image data item PCT satisfies the conditions using a result of an image analysis process.

When "Baby" or "Person" is selected in the item "Characteristics of Playback Images", the CPU 31 determines, using image analysis, whether or not a baby or a person is included in the image data item PCT.

Regarding the item "Criteria for Quality of Images to Be Played Back", the CPU 31 performs, using image analysis, determination associated with "image shake caused by hand motion", "composition", and so forth. Note that, regarding "image shake caused by hand motion", if the amount of image shake caused by hand motion at a time of image capture, which has been obtained by the image-shake detection unit 13, has been added to the environmental information item CI or the image data item PCT, the value of the amount of image shake caused by hand motion may be referred to.

The CPU 31 checks the result of image analysis. When the CPU 31 determines that the obtained image data item PCT satisfies the conditions indicated by the settings in both of the items "Characteristics of Playback Images" and "Criteria for Quality of Images to Be Played Back", the CPU 31 proceeds to steps F462, F463, and F464 in this order. Then, the CPU 31 determines the image data item PCT as a target image. Next, in step F465, the CPU 31 prepares the image data item PCT for slideshow.

In contrast, when the image data item PCT does not satisfy either one of the conditions indicated by the settings in the items "Characteristics of Playback Images" and "Criteria for Quality of Images to Be Played Back", the CPU 31 returns to step F461. The CPU 31 selects the next image data item PCT from the playback-target-image group, and reads the image data item PCT from the recording medium 90. Then, the CPU 31 performs, on the image data item PCT, determination in a manner similar to that described above.

When CPU 31 finishes the playback-target-image preparation process given above, the CPU 31 proceeds to steps F403 and F404, which are illustrated in FIG. 21, in this order. The CPU 31 starts display of images as a slideshow.

In other words, the CPU 31 transfers, to the display controller 7, the image data item PCT that has been determined in step F465 illustrated in FIG. 22B as a "target image" which is to be first played back. The CPU 31 causes the display controller 7 to display the image data item PCT on the display panel 6.

Note that a case in which it is determined in step F403 that playback should be terminated is a case in which all of the image data items PCT included in the playback-target-image group do not satisfy the conditions indicated by the settings in the items "Characteristics of Playback Images" and "Criteria for Quality of Images to Be Played Back" in step F402 (illustrated in FIG. 22B). In other words, it is determined that no image data item which satisfies the conditions desired by the user exists, and the slideshow selection playback is terminated.

When the slideshow playback starts in step F404 and the first image data item PCT is played back and displayed, in step F405, the CPU 31 performs a process of preparing an image data item PCT that is to be next played back and displayed.

As in the process in step F402, a process in step F405 is also performed as the playback-target-image preparation process illustrated in FIG. 22B. Accordingly, the next playback target that satisfies the conditions desired by the user is determined.

In step F406, whether playback should be terminated is determined. In step F406, when the user has performed the operation for terminating playback while playback of a series of images as the slideshow playback is being performed, the CPU 31 determines that playback should be terminated.

When the operation for terminating playback has not been detected, the CPU 31 proceeds to step F407, and performs an image-effect calculation process for the next playback target image.

In calculation of an image effect in step F407, for the image data item PCT that is determined as the next playback target image, the CPU 31 determines whether or not a dynamic image effect is to be provided when the image data item PCT is displayed. Furthermore, when a dynamic image effect is to be provided, the CPU 31 determines the type of image effect, the amount of the image effect, and how to apply the image effect. The determination is performed on the basis of comparison between an environmental information item CI corresponding to the image data item PCT and the environmental information item CI for the previous image (the image data item being currently displayed as a still image). Additionally, the settings in the effect template are also modified using a result of comparison between the environmental information item CI corresponding to the image data item PCT and the environmental information item CI for the previous image.

Figure 23:
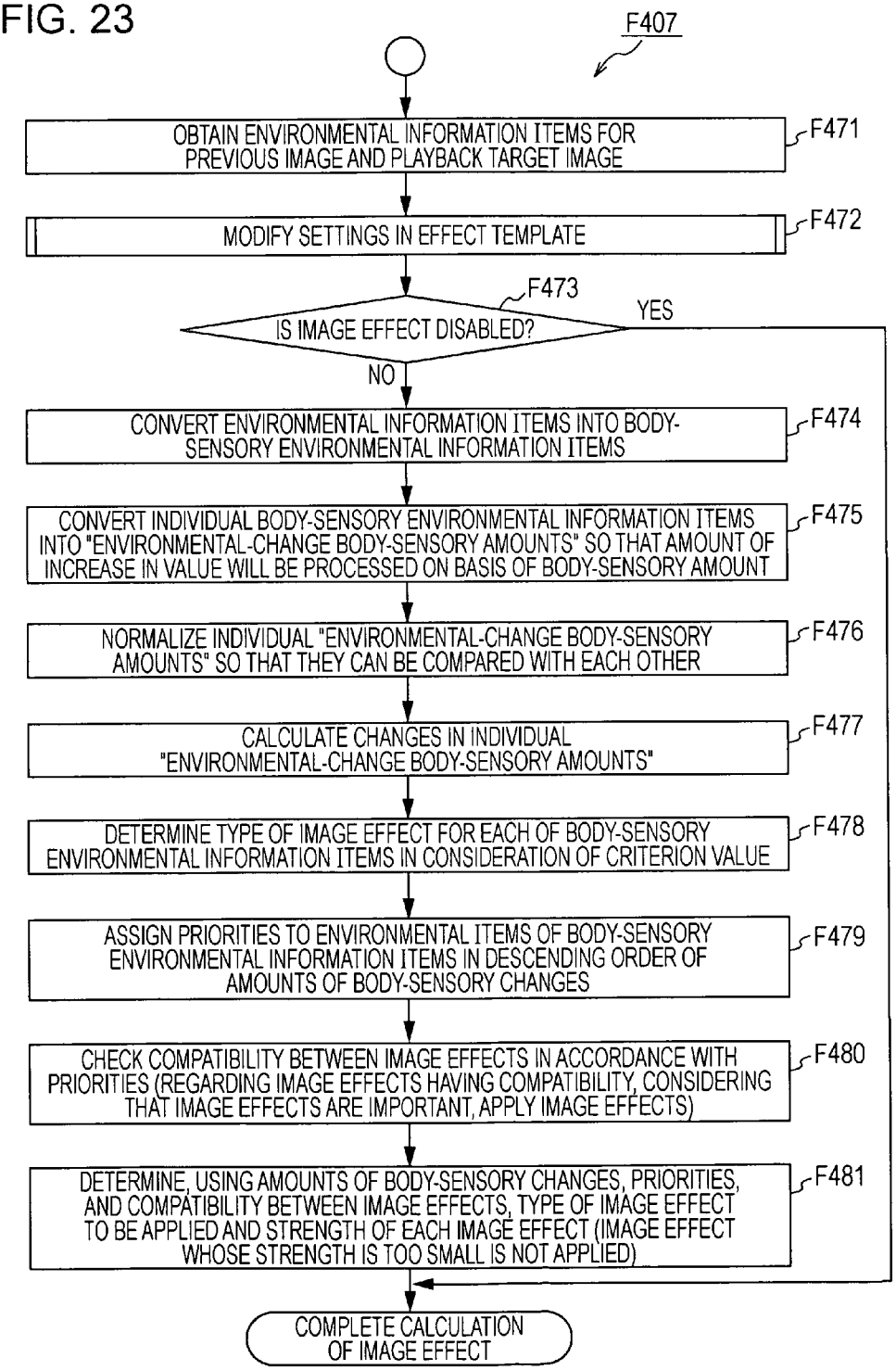
FIG. 23 is a flowchart of an image-effect calculation process for a playback target image in the embodiment.

The image-effect calculation process in step F407 is illustrated in FIG. 23.

First, in step F471, the CPU 31 obtains the environmental information item CI for the previous image and the environmental information item CI for the playback target image. For example, the CPU 31 obtains the environmental information item CI for the previous image and the environmental information item CI for the playback target image that have been read from the recording medium 90 and that have been loaded into the RAM 32 in step F405 (or F402) illustrated in FIG. 21.

Next, in step F472, the CPU 31 modifies the settings in the effect template (see FIG. 10). Modification of the settings in the effect template will be described below.

Then, in steps F474 to F481, the CPU 31 determines a type of image effect, an amount of the image effect, and a time-series expression of the image effect. Processes in steps F474 to F481 are similar to the processes in steps F302 to F309 illustrated in part (a) of FIG. 8 that is described above. A redundant description is prevented.

Regarding steps F474 to F481, an example is described, in which an image effect is determined on the basis of body-sensory light amounts and body-sensory temperatures. However, in this example, because an image effect is determined in consideration of a change in the brightness and a change in the temperature, a case in which no image effect is to be applied may occur depending on modification of the settings in the effect template that is described below. For this reason, when it is determined that an image effect is disabled, the CPU 31 proceeds from step F473 to the end of the flowchart to terminate the image-effect calculation process illustrated in FIG. 23 (step F407 illustrated in FIG. 21).

Then, in step 408 illustrated in FIG. 21, the CPU waists for the image switching timing of the slideshow playback. For example, when the playback display time for one image in the slideshow playback is six seconds, the CPU 31 waists until six seconds elapse after display of the currently displayed image starts.

When the image switching timing arrives, the CPU 31 proceeds to step F409. The CPU 31 transfers the image data item that is determined as the next playback target image to the display controller 7, and causes the display controller 7 to display the next playback target image on the display panel 6. In this case, the CPU 31 provides an instruction for the type of image effect, the amount of the image effect, and how to apply the image effect that have been determined in step F407. When the next playback target image is displayed, the CPU 31 causes the display controller 7 to apply the dynamic image effect.

In accordance with the instruction provided by the CPU 31, the display controller 7 displays the transferred image data item PCT as a still image on the display panel 6. In addition, the display controller 7 provides the dynamic image effect in which the image is visually and dynamically changed. For example, the display controller 7 changes the display parameters while the still image is being displayed, or performs the image synthesis process on the sill image, thereby applying the dynamic image effect on the display screen.

In step F410, the CPU 31 determines whether or not the next playback target image exists. In a case in which playback of all of the image data items PCT that are considered as a series of images is completed as the slideshow playback and in which the next playback target image does not exist, the CPU 31 proceeds from step F410 to the end of the flowchart to terminate the process. In a case in which the slideshow playback has not been completed and in which the next playback target image exists, the CPU 31 returns to step F405. When the operation for terminating playback has not been performed, in step F407, the CPU 31 performs the process of preparing the next playback target image.

Note that, in a case in which the slideshow playback is repeatedly performed, in order to play back the first image data item PCT after playback of all of the image data items PCT has been completed, the CPU 31 returns from step F410 to step F405 even while display of the last image data item PCT is being performed.

In the above-described course of the slideshow selection playback, in step F407, the CPU 31 determines a dynamic image effect, and, in step F409, the CPU 31 controls the display controller 7 to perform display of an image for which the dynamic image effect is provided.

In relation to step F407 illustrated in FIG. 21, modification of the settings in the effect template that is performed in step F472 illustrated in FIG. 23 will be described with reference to FIGS. 24, 26, and 27.

In FIG. 26, cases are illustrated. The cases should be considered as conditions for modifying the settings in order to apply an appropriate image effect in view of the contents of the environmental information item CI for the previous image and the environmental information item CI for the playback target image to recreate an ambience.

The cases illustrated as examples are as follows: a "case in which selection across different folders is performed"; a "case in which the image capture interval is equal to or longer than twelve hours"; a "case in which the image capture interval is equal to or longer than seven days"; a "case in which a change from being indoors/outdoors to being outdoors/indoors occurred; and a "case in which a change from being in the water/out of the water to being out of the water/in the water occurred".

Furthermore, regarding the environmental items of the environmental information items CI, only the brightness and the temperature are provided as examples for simplicity of description.

The "case in which selection across different folders is performed" is a case in which an image data item PCT determined as the previous image that is currently displayed and an image data item PCT determined as the playback target image that is currently considered as an effect-calculation target are included in different folders FLD.

Typically, the user distributes captured images into folders, thereby arranging the captured images. For example, in most cases, the user distributes captured images for each event such as a travel or a sport event. Accordingly, even in a case in which images are two continuous images that are to be continuously played back as a slideshow, when the images are selected across different folders, the images have no significant relationship therebetween in most cases. For this reason, when selection across different folders is performed, a case in which it is preferable that no image effect be provided is considered. Thus, in such a case, a change in the brightness, a change in the temperature, and so forth that are obtained from environmental information items CI for the two continuous images are not reflected.

In the "case in which the image capture interval is equal to or longer than twelve hours", it is considered that the relationship between two continuous images is comparatively insignificant in terms of change in ambience that the user perceived at a time of image capture. For this reason, in this case, the value of the "minimum point pt for application" in the effect template illustrated in FIG. 10 is increased by ten points. As described above, the "minimum point pt for application" is used as a threshold with which whether or not an image effect is provided is determined. Accordingly, the probability that an image effect is to be provided is decreased by increasing the value of the "minimum point pt for application".

In the "case in which the image capture interval is equal to or longer than seven days", it is considered that the relationships between two continuous images are further insignificant, and that the images are not very related to each other in terms of change in ambience that the user perceived. For this reason, in this case, a change in the brightness and a change in the temperature that are obtained from the contents of environmental information items CI for the two continuous images are not reflected.

In the "case in which a change from being indoors/outdoors to being outdoors/indoors occurred" between two continuous images, the light amount and the temperature change by a comparatively large degree in most cases. Furthermore, because the user made a move from being indoors to being outdoors (and vice versa), the user takes an environmental change between being indoors and being outdoors for granted as being normal to some degree. Unless the light amount or the temperature markedly changes, the user does not perceive a change in the light amount or a temperature with a high sensibility. For this reason, the value of the "minimum point pt for application" in the effect template is increased by ten points. An image effect is provided only in a case in which the temperature or the light amount changes by a large degree.

In the "case in which a change from being in the water/out of the water to being out of the water/in the water occurred" between two continuous images, a change in the brightness and a change in the temperature are considerable. Furthermore, an image captured in the water and an image captured out of the water are totally different from each other. Accordingly, a case in which an image effect for recreating an ambience is intentionally not provided can also be considered. For this reason, in this case, it may be determined that the change in the brightness and the change in the temperature between the two continuous images are not reflected.

For example, the above-described cases are supposed as cases in which the settings in the effect template should be modified. As a matter of course, the above-described cases are only examples. Other cases other than the above-described cases can also be considered.

In step F472 illustrated in FIG. 23, the CPU 31 modifies the settings in the effect template for the above-described cases. For example, the CPU 31 performs a process illustrated in FIG. 24.

Figure 24:
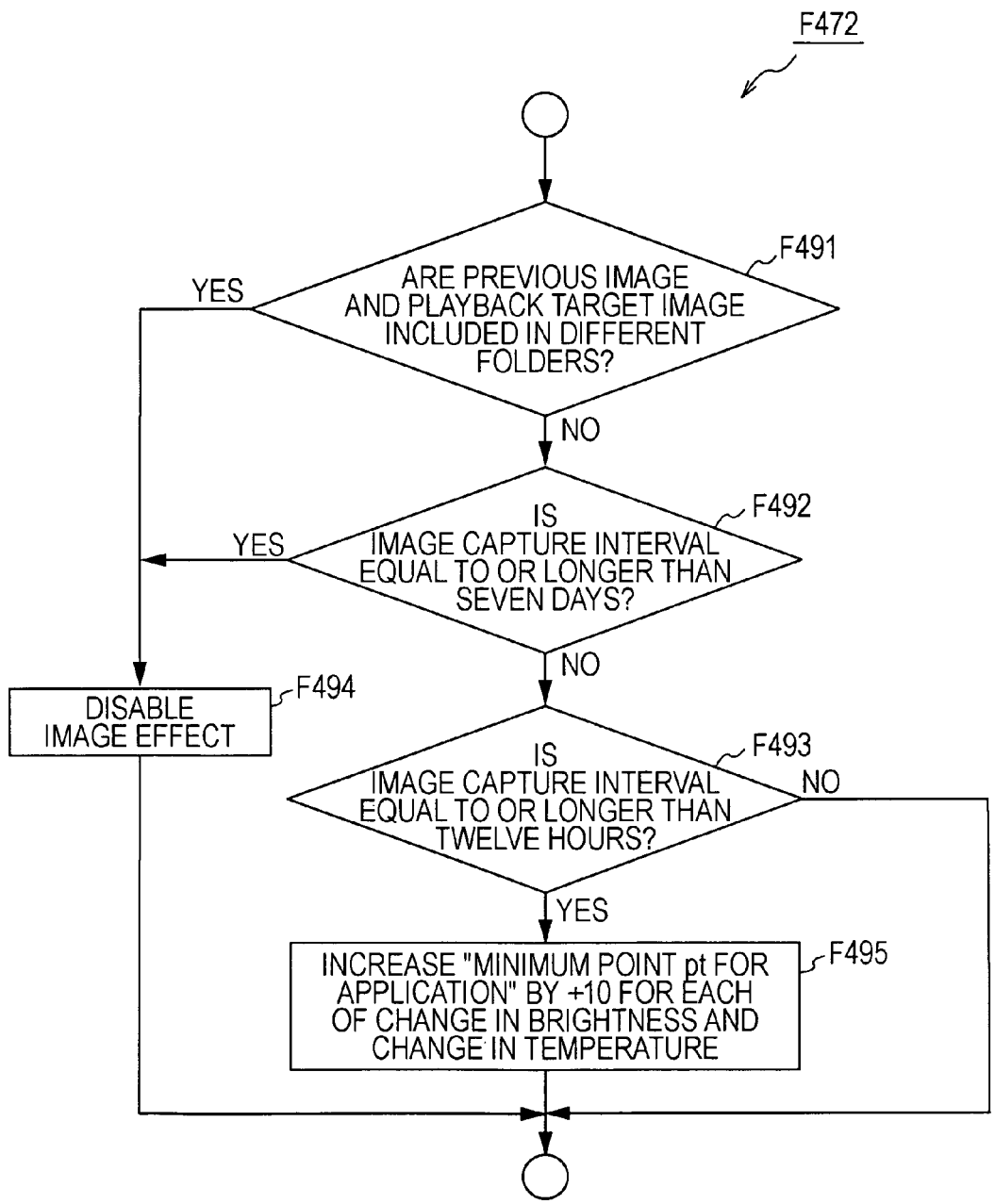
FIG. 24 is a flowchart of a process of modifying settings in the effect template in the embodiment.

An example illustrated in FIG. 24 is an example in which the three cases illustrated FIG. 26, namely, the "case in which selection across different folders is performed", the "case in which the image capture interval is equal to or longer than twelve hours", and the "case in which the image capture interval is equal to or longer than seven days", are considered.

In step F491 illustrated in FIG. 24, the CPU 31 determines whether or not the image data item PCT for the previous image and the image data item PCT for the playback target image are image data items that are included in different folders FLD. When the image data items PCT are included in different folders FLD, in step F494, the CPU 31 sets a setting for disabling an image effect.

Note that, in this example, as described above, in steps F474 to F481 illustrated in FIG. 23, an image effect is determined in consideration of a change in the brightness and a change in the temperature. Regarding the determination of an image effect, as illustrated in FIG. 26, in the case in which selection across different folders is performed, the change in the brightness and the change in the temperature are not reflected. This means that no image effect is to be applied. Accordingly, in order not to apply an image effect in step F494, the CPU 31 sets the setting for disabling an image effect.

When an image effect is disabled in step F494, without determining an image effect, the CPU 31 proceeds from step F473 to the end of the flowchart to terminate the image-effect calculation process illustrated in FIG. 23.

However, when other elements other than the temperature and the brightness, such as the place, the date and time, the air-flow amount, and the weather, are reflected in determination of an image effect, in step F494, the CPU 31 can set a setting in which only the temperature and the brightness are not reflected, instead of the setting for disabling an image effect. In other words, an image effect can also be applied on the basis of environmental information items concerning other elements other than the temperature and the brightness.

In step F491 illustrated in FIG. 24, when the CPU 31 determines that the two continuous images are included in the same folder, in step F492, the CPU 31 checks information items concerning the date and time included in environmental information items CI for the two continuous images, and determines the image capture interval. Then, when the image capture interval is equal to or longer than seven days, in step F494, the CPU 31 sets the setting for disabling an image effect.

In contrast, when the image capture interval is shorter than seven days, in step F493, the CPU 31 proceeds to one of branches depending on whether or not the image capture interval is equal to or longer than twelve hours.

When the image capture interval is shorter than twelve hours, the CPU 31 terminates the process illustrated in FIG. 24 without particularly modifying the settings in the effect template.

In contrast, when the image capture interval is equal to or longer than twelve hours, the CPU 31 proceeds step F495. The CPU 31 modifies the settings so that the value of the "minimum point pt for application" in the effect template is increased by ten points for each of a change in the brightness and a change in the temperature. Then, the 31 terminates the process illustrated in FIG. 24.

In other words, in the process of modifying the settings in the effect template, which is illustrated in FIG. 24, when the playback target image is an image that is included in the same folder in which the previous image is included and the image capture interval is shorter than twelve hours, in steps F474 to F481 illustrated in FIG. 23, the CPU 31 determines an image effect in accordance with the typical settings in the effect template.

Furthermore, when the playback target image is an image that is included in the same folder in which the previous image is included and the image capture interval is equal to or longer than twelve hours and shorter than seven days, the settings (the "minimum point pt for application") in the effect template are modified. Then, in steps F474 to F481 illustrated in FIG. 23, the CPU 31 determines an image effect in accordance with the modified settings in the effect template.

Moreover, when the playback target image is an image that is included in a folder different from a folder in which the previous image is included, or when the image capture interval is equal to longer than seven days, the CPU sets the setting for disabling an image effect, and determination of an image effect in steps F474 to F481 illustrated in FIG. 23 is not performed. In other words, no image effect is applied when the playback target image is displayed.

The above-described process is an example of a process into which modification of the setting in the effect template is added.

In the process illustrated in FIG. 24, as a matter of cause, addition of the case in which a change from being indoors/outdoors to being outdoors/indoors occurred and the case in which a change from being in the water/out of the water to being out of the water/in the water occurred, which are illustrated in FIG. 26, to conditions for modifying the settings in the effect template may be considered. Other conditions for modifying the settings can be considered.

The process may be designed so that the user can select a case that should be reflected in modification of the settings.

Furthermore, regarding the details of modification of the settings in the effect template, not only the "minimum point pt for application" is increased/decreased, but also, for example, the criterion value may be increase/decreased or a coefficient in the item "Details of Image Effect" may be increase/decreased.

Additionally, modification of the settings in the effect template on the basis of image contents can also be considered.

An example is illustrated in FIG. 27. Cases regarding image contents that are set are as follows: a case of an image in which "the main subject is a face"; a case of an image in which "the main subject is a person"; a case of an image captured as a "group photograph"; a case of an image in which "the main subject is a landscape"; a case of an image in which "image shake caused by hand motion occurred"; and a case of an image having an "inappropriate composition".

Whether the contents of the playback target image are the image contents that are indicated in the above-described cases can be simultaneously determined in image analysis that is performed in step F405 illustrated in FIG. 21 (FIG. 22B).

For example, when the playback target image is an image in which "the main subject is a face", the "minimum point pt for application" for each of a change in the brightness and a change in the temperature is increased by ten points.

When the playback target image is an image in which "the main subject a person", the "minimum point pt for application" for each of a change in the brightness and a change in the temperature is increased by five points.

When the playback target image is an image captured as a "group photograph", a change in the brightness and a change in the temperature are not reflected.

When the playback target image is an image in which "the main subject is a landscape", the typical settings in the effect template are used. In other words, the settings are not modified.

When the playback target image is an image in which "image shake caused by hand motion occurred", a change in the brightness and a change in the temperature are not reflected.

When the playback target image is an image having an "inappropriate composition", a change in the brightness and a change in the temperature are not reflected.

As a matter of course, the cases and the details of modification of the settings are only examples. In reality, the cases and the details of modification of the settings can be determined so that an image effect for recreating an ambience at a time of image capture can appropriately be applied.

For example, cases that can be considered as other cases other than the above-described cases are as follows: a case of an "image including a particular person"; a case of an "image including the number of persons that is equal to or larger than a particular number"; a case of an "image including a particular scene"; a case of an "image that was captured in the vicinity of a particular place"; and a case of an "out-of-focus" image.

Furthermore, regarding a group of image data items that were obtained by capturing a large number of images at very short intervals using so-called continuous shooting, there is also a case in which it is not desired that all of the image data items be sequentially played back when slideshow is performed.

Accordingly, regarding images captured using continuous shooting, a process of extracting, in consideration of environmental information items, image contents, image quality, and so forth, a small number of mages that are to be played back can also be considered.

As described above, in the slideshow selection playback, first, the user can select conditions using the settings for images that are to be played back as a slideshow. With the settings, slideshow in which images desired by the user are collected can be performed.

Furthermore, the settings in the effect template are modified on the basis of the relationship between two continuous images, the image contents of the playback target images, or the like, whereby an appropriate image effect for recreating an ambience at a time of image capture can be applied.

Note that, modification of the settings in the effect template can be applied not only to the process performed in the slideshow playback, but also to a case in which individual image data items included in a folder are sequentially played back in accordance with an operation of advancing the page on the display screen which is typically performed by the user.

7. Setting of Image Effect Using One Image

In the above-described examples of the slideshow playback and the slideshow selection playback, an image effect is determined on the basis of comparison between an environmental information item CI for the playback target image and an environmental information item CI for the previous image. Accordingly, an ambience at a time of image capture can appropriately be expressed. However, an ambience can also be recreated by considering only one image.

In other words, an example of a process of determining an image effect using only the environmental information item CI for the playback target image without considering the environmental information item CI for the previous image can be considered.

Figure 28:
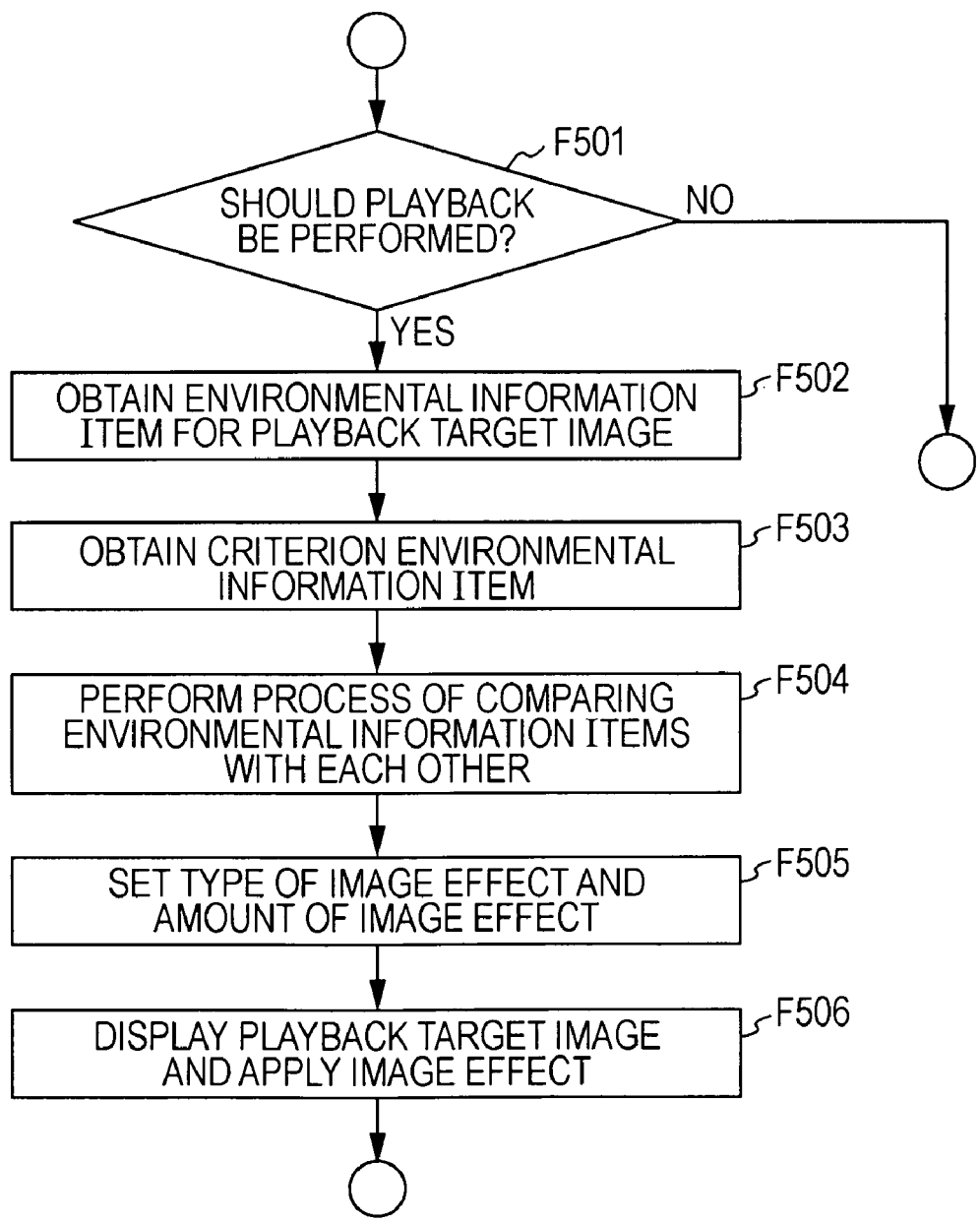
FIG. 28 is a flowchart of a process of setting an image effect using one image data item in the embodiment.

The example of the process performed by the CPU 31 is illustrated in FIG. 28.

In a case in which playback of a certain image data item is performed, the CPU 31 proceeds from step F501 to step F502. The case is, for example, a case in which the user specifies a certain image from images that are displayed as a list of thumbnails and in which the user provides an instruction for display of the certain image. Furthermore, the case may be a case in which a process of playing back the next image in the slideshow playback is performed.

In step F502, the CPU 31 obtains an environmental information item CI for the playback target image. In other words, the CPU 31 reads, from the recording medium 90, an image data item PCT determined as the playback target image and an environmental information item CI corresponding to the image data item PCT. The CPU 31 loads the image data item PCT and the environmental information item CI into, for example, the RAM 32. Then, the CPU 31 checks the environmental information item CI.

Next, in step F603, the CPU 31 obtains a criterion environmental information item. The criterion environmental information item is an environmental information item that is to be compared with the environmental information item CI in order to determine an image effect.

It can be considered that the criterion environmental information item is the same as an environmental information item including the criterion values that are described with reference to FIGS. 6A to 6C. Accordingly, an information item including average values for the environmental items such as the temperature and the brightness that are calculated for all of image data items as illustrated in FIG. 6A may be used as the criterion environmental information item. An information item including average values that are calculated for image data items included in the currently selected folder may be used as the criterion environmental information item. Alternatively, the criterion environmental information item may be obtained, using a process similar to that illustrated in FIG. 6C, as an information item concerning the current temperature, the current light amount, and so forth.

Furthermore, the criterion environmental information item may be an information item including fixed values. For example, an information item concerning the average temperature and so forth of a shipping destination (Japan, North America, South America, Europe, Southeast Asia, or the like) may be used.

Moreover, the criterion environmental information item can be obtained from a predetermined server via a network in accordance with a place and a date and time at which playback is performed. Alternatively, setting of any information item that is input by the user as the criterion environmental information item can also be considered.

Next, in step F504, the CPU 31 performs a process of comparing the environmental information item CI for the playback target image with the criterion environmental information item. For example, a temperature difference, a light-amount difference, and so forth are calculated.

Then, in step F505, the CPU 31 determines a type of image effect, an amount of the image effect, and a time-series expression of the image effect on the basis of a result of comparison. For example, a type of image effect, an amount of the image effect, and a time-series expression of the image effect can be determined using, for example, the effect template described above.

When the CPU 31 determines an image effect, in step F506, the CPU 31 transfers the image data item PCT that is determined as the playback target image to the display controller 7, and causes the display controller 7 to perform display of the image data item PCT on the display panel 6. In this case, the CPU 31 provides an instruction for the type of image effect, the amount of the image effect, and how to apply the image effect, which have been determined in step F505. When the image data item PCT is displayed, the CPU 31 causes the display controller 7 to apply the image effect.

In accordance with the instruction provided by the CPU 31, the display controller 7 displays the transferred image data item PCT as a still image on the display panel 6. In addition, the display controller 7 performs a process of controlling display so that the image effect specified in the instruction is provided. For example, the display controller changes the display parameters while the still image is being displayed, or performs the image synthesis process on the still image, thereby applying the image effect on the display screen.

With the above-described process, on the basis of an environmental information item CI corresponding to one image data item, playback and display of the image data item in which an ambience at a time of capture of the image data item is recreated can be realized.

Also in this case, a person who is looking at playback and display of the image data item can perceive a change in ambience at a time of image capture. Therefore, an original effect of a photograph or a video can be made to be more effective, and playback of an image such as a photograph can be made more pleasurable.

8. Various Types of Modification Examples and Application Examples

The present invention is not limited to the above-described embodiment, and various modification examples and application examples other than the above-described embodiment can be supposed. Hereinafter, various modification examples and application examples will be described.

Regarding setting of a dynamic image effect using environmental information items, in the above-described image-effect determination process, an example is described, in which the strength of an image effect is determined using a degree of value of a temperature change and a degree of value of a light-amount change and the combination thereof. Various examples of calculation of the strength of an image effect using degrees of environmental values included in environmental information items or using combinations of the environmental items of environmental information items can be considered.

For example, when a slightly high temperature is obtained, an image is changed to a slightly red image. When a slightly low temperature is obtained, an image is changed to a very read image. With such a setting of the strength of an image effect, an ambience can more accurately be recreated.

Considering the environmental items of environmental information items (the position, the date and time, the air-flow amount, the air pressure, the weather, and so forth) to be used to determine an image effect, it is preferable that the strength of an image effect be determined using environmental values for the environmental items of environmental information items and combinations thereof.

When a large number of environmental items of environmental information items are considered, it is preferable that priorities be assigned to the environmental items as described above. However, the priorities may be fixed. A scheme can be used, in which all of the environmental items are equally reflected in an image effect without assigning priorities to the environmental items.

In addition to the time-series expression in which the strength of an image effect is gradually changed as in each of the examples illustrated in FIG. 12 and so forth, for example, time-series expressions that can also be considered as a time-series expression of an image effect are as follows: a time-series expression in which an image is gradually changed to an image to which an image effect is applied; and a time-series expression in which the speed at which the strength of an image effect is changed is changed in accordance with degrees of environmental values included in environmental information items and combinations thereof.

For example, when dates at which two continuous images were captured are close to each other and a large temperature change is obtained, the speed at which the amount of an image effect is changed is increased. In contrast, when a large temperature change is obtained and the image capture interval is long, the amount of an image effect is changed at a low speed.

Furthermore, a time period in which an image effect is dynamically changed is at least one portion of a time period in which a still image is displayed.

For example, in the above-described slideshow playback, in a case in which a time period from start of display of one image to end of the display is determined, an image effect that is dynamically changed over the entire time period in which the image is displayed may be provided. Alternatively, an image effect that is dynamically changed only for a time period which is one portion of the entire time period in which the one image is displayed may be provided. As a matter of course, a fixed image effect can also be considered.

Additionally, the entire time period in which the one image is displayed is divided into a plurality of time periods, and the same image effect or different image effects may be provided for the plurality of individual time periods.

Moreover, in playback of an image data item in a normal manner in accordance with a selection operation performed by the user, in a case in which a time period in which one image is displayed is undefined, an image effect is provided, for example, for several seconds or the like after display of the image data item starts. Then, no provision of the image effect can be considered. However, repeated provision of the image effect can also be considered. As a matter of course, repeated provision of the same image effect at intervals of several seconds or provision of different image effects can be supposed.

A type of image effect, a strength of the image effect, a time-series expression of the image effect, and a combination thereof may be determined using an environmental information item for a captured image that is displayed and an environmental information item for a captured image that was displayed before the displayed captures image or that is to be displayed after the displayed captured image. Various examples of a type of image effect, a strength of the image effect, a time-series expression of the image effect, and a combination thereof can be considered.

In the above-described example, an image effect is determined using comparison between an environmental information item for the previous image and an environmental information item for the playback target image. However, an image effect may be determined using comparison between the environmental information item for the playback target image and an environmental information item for the next playback target image.

For example, a case is supposed, in which a certain image is an image of a landscape including a certain place, and in which the next image was captured by the user that had approached to a certain building included in the landscape. In this case, a dynamic image effect that can be considered is as follows: while the current playback image is being displayed, display in which an image of the building is zoomed in is performed in accordance with position information items or information items concerning a direction along which image capture was performed for the current and next playback target images; and the display is switched to a display of the next playback target image. For example, a dynamic image effect can be considered, in which the image of the building corresponding to one portion of the image data item that is determined as the current playback target image is gradually enlarged.

Furthermore, when determination of an image effect for the playback target image is performed, the environmental information item for the playback target image is compared with the environmental information item for the previous image. However, the previous image is not limited to the immediately previous playback target image.

For example, in the above-described slideshow selection playback, playback target images are thinned out in accordance with a condition. Accordingly, the immediately previous target image is not necessarily an image that was captured immediately before the current playback target. For this reason, in the slideshow selection playback, use of, as the previous image, the immediately previous image data item (an image data item that was captured immediately before the current playback target image) that may be an image data item which is not to be played back is considered. Then, an image effect for the playback target image is determined using an environmental information item CI for the previous image.

Furthermore, in determination of an image effect, the number of previous images that are considered is not limited to one. A plurality of previous images may be considered. For example, individual environmental information items CI for the previous image, the second previous image, and the third previous image as images to be played back are referred to, thereby determining changes in ambience that occurred in a period which is longer than a certain value. Then, an image effect for the playback target image is determined on the basis of the changes in ambience.

As a matter of course, environmental information items CI corresponding to a plurality of image data items including image data items that are to be played back and also including image data items that are not to be played back may be referred.

Additionally, an image effect may be determined using both an environmental information item CI for the previous image and an environmental information item CI for the next image.

Moreover, the user may select an image data item that is to be used as a basic image, and an image effect may be determined using an environmental information item CI corresponding to the image data item as a comparative target.

Furthermore, in order to determine an image effect, use of environmental information items for two continuous images is not necessarily necessary. Use of environmental information items CI corresponding to image data items to be displayed and environmental information items CI corresponding to other image data items that are saved on the recording medium 90 or the like can also be considered.

Moreover, in order to determine an image effect, an interval between a date on which an image data item to be displayed was captured and dates on which other image data items saved on the recording medium 90 or the like were captured can also be considered.

Additionally, determination of an image effect in accordance with a theme that is selected by the user can also be performed as the image-effect determination process.

In addition, the user may select environmental items for environmental information items that are to be used. The user may also assign priorities to a plurality of environmental items.

Furthermore, in order to select environmental information items that is to be used to determine an image effect, an average or variance of environmental information items for all of or a fixed set of captured images that are saved on the recording medium 90 or the like can also be used.

Moreover, in the slideshow playback, the playback display time for one image may be changed in accordance with the type of image effect to be applied or the like.

Regarding image effects at a time of playback, the number of types of image effects to be applied is decreased to some degree, whereby playback can be optimized to an apparatus whose processing performance is low. On the other hand, in order to strongly remind the user of an environment, the number of types of image effects can also be increased.

Furthermore, although a person simply can say "it is hot" or "it is cold", how the person perceives differs depending on the degree of hotness. Accordingly, an image effect can be changed for each user.

When there are a plurality of environmental conditions that markedly change, image effects may be narrowed down, thereby determining one image effect. Alternatively, a combination of image effects may be used, or another image effect can be prepared for combination.

In the above-described embodiment, image data items are stored in each folder on the recording medium 90 or the like. However, various management forms can be considered as the management form (grouping) for managing the image data items.

For example, management forms that can be supposed are as follows: a management form in which grouping is performed in units of folders in accordance with a chronological sequence in which images were captured; a management form in which grouping is performed in units of dates; a management form in which grouping is performed in units of events in consideration of date intervals, time intervals, or the like; and a management form in which grouping is performed at least in consideration of positions and dates on which image capture was performed.

Furthermore, a management form having a function in which the user can select a grouping scheme can also be considered.

Additionally, playback schemes that can be used as playback schemes for groups of image data items which have been subjected to groping in the image capture apparatus 1 or the like are as follows: a playback scheme having a function of determining, as a playback-target-image group, one group from among divided groups; and a playback scheme having a function of determining, as a playback-target-image group, a plurality of groups from among divided groups.

Furthermore, for an image that is first selected from a group, a process having a function in which an environmental information item for the previous image is not used or in which the environmental information item for the previous image is used in a manner different from a normal manner can be considered as a process at a time of playback.

Moreover, when a playback-target-image group includes groups, for an image that is last selected from a group, a process having a function in which an environmental information item for the next image is not used or in which the environmental information item for the next image is used in a manner different from a normal manner can also be considered.

In addition, when a playback-target-image group includes groups, a process having a function in which the user can select whether or not the boundaries between the gropes are considered is can also be considered.

Furthermore, the display controller 7 realizes an image effect, for example, by changing the display parameters or by performing image synthesis. However, the display controller 7 can also realize an image effect using other processes other than the processes using an image data item (a display image signal).

For example, when the display unit such as the display panel 6 is a liquid crystal display using a backlight scheme, change in brightness on the display screen can also be expressed by chaining the brightness of a backlight source.

9. Information Processing Apparatus/Program

In the above-described embodiment, playback using an image effect is performed in the image capture apparatus 1.

However, a playback process can also be performed in a manner similar to that described above in other apparatuses such as the personal computer 102 as explained with reference to FIGS. 1A to 1D.

Figure 29:
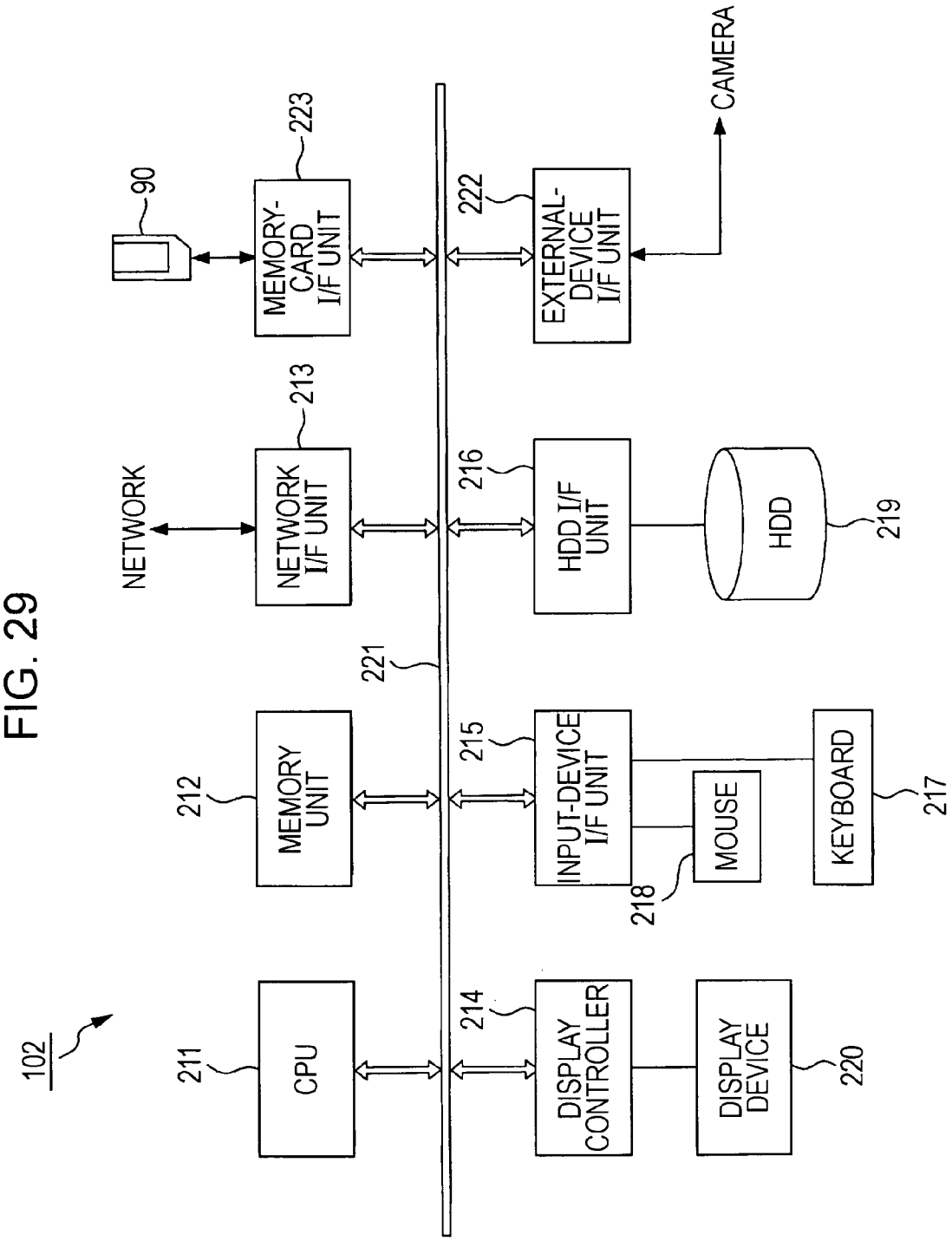
FIG. 29 is a block diagram of an information processing apparatus according to an embodiment.

FIG. 29 illustrates a configuration of the personal computer (hereinafter, referred to as a "PC") 102.

As illustrated in FIG. 29, the PC 102 includes a CPU 211, a memory unit 212, a network interface unit 213, a display controller 214, an input-device interface unit 215, and an HDD interface unit 216. Furthermore, the PC 102 includes a keyboard 217, a mouse 218, an HDD 219, a display device 220, a bus 221, an external-device interface unit 222, a memory-card interface unit 223, and so forth.

The CPU 211, which is a main controller of the PC 102, performs various types of control processes in accordance with a program stored in the memory unit 212. The CPU 211 is connected to the other individual units via the bus 221.

Each of the devices on the bus 221 has a unique memory address or an input/output (I/O) address, and the CPU 211 can use the address to access the device. An example of the bus 221 may be a peripheral component interconnect (PCI) bus.

The memory unit 212 is configured to include both a volatile memory and a non-volatile memory. For example, the memory unit 212 includes a ROM for storing a program, a RAM that is used as a computation work area or used to temporarily store various types of data items, and a non-volatile memory such as an electrically erasable and programmable read only memory (EEPROM).

The memory unit 212 is used to store a program code executed by the CPU 211, an identification information item unique to the PC 102, and other information items, and used as a buffer area for communication data items or as a work area for work data items while the program code is being executed.

The network interface unit 213 connects the PC 102 to a network such as the Internet or a local area network (LAN) using a predetermined communication protocol such as Ethernet (registered trademark). The CPU 211 can communicate with individual apparatuses connected to the network via the network interface unit 213.

The display controller 214 is a dedicated controller for practically processing a rendering command issued by the CPU 211. For example, the display controller 214 supports a bitmap rendering function corresponding to the Super Video Graphic Array (SVGA) or extended Graphic Array (XGA) standard. A rendering data item processed by the display controller 214 is temporarily written into, for example, a frame buffer (not illustrated), and then output to the display device 220. The display device 220 may be configured as, for example, an organic electro-luminescence (EL) display, a cathode ray tube (CRT) display, or a liquid crystal display.

The input-device interface unit 215 is a device for connecting a user input device including the keyboard 217 and the mouse 218 to a computer system implemented as the PC 102.

In other words, a user operation of providing an input to the PC 102 is performed using the keyboard 217 and the mouse 218, and an information item concerning the operation of providing an input is supplied to the CPU 211 via the input-device interface unit 215.

The HDD interface unit 216 performs an interface process for writing/reading a data item into/from the HDD 219.

The HDD 219 is an external storage device in which a magnetic disk serving as a storage medium is fixedly mounted, as is common in the art. The HDD 219 supersedes other external storage devices in terms of storage capacity, data transfer speed, and so forth. On the HDD 219, various types of software programs that have been installed into the PC 102 are stored in an executable state. Typically, on the HDD 219, a program code of an operating system (OS) that the CPU 211 should be executed, application programs, device drivers, and so forth are stored in a non-volatile state.

The various types of programs stored on the HDD 219 are loaded into the memory unit 212, for example, when the PC 102 is activated or when an application program in a user layer is activated. The CPU 211 performs processes based on the programs that are loaded into the memory unit 212.

The external-device interface unit 222 is an interface with an external device that is connected to the external-device interface unit 222 using a standard such as the USB standard.

In this example, for example, the image capture apparatus 1 is supposed as an external device.

The PC 102 can, for example, obtain an image data item from the image capture apparatus 1 using communication via the external-device interface unit 222.

For example, connection between the external interface 8 of the image capture apparatus 1 and the external-device interface unit 222 of the PC 102 is provided, and an image data item PCT captured by the image capture apparatus 1 and an environmental information item CI can be obtained.

Note that the standard supported by the external-device interface unit 222 is not limited to the USB standard but may be any other interface standard such as the IEEE 1394.

The memory-card interface unit 223 writes/reads a data item into/from a recording medium 90 such as a memory card.

For example, the recording medium 90, which was used for a digital still camera such as the image capture apparatus 1 described above, is attached. Then, an image data item PCT and an environmental information item CI can also be read from the recording medium 90.

In the PC 102, computation processes/control operations based on a software structure, i.e., based on software such as the application programs, the OS, and the device drivers, of the CPU 211 are performed, whereby various types of operations are performed.

In this case, for example, the HDD 219 or the recording medium 90 functions as the image storage unit 200 illustrated in FIG. 2. The CPU 211 functions as the control unit 201 (and the image analysis unit 206) illustrated in FIG. 2. The display controller 214 functions as the image processing/display control unit 202 illustrated in FIG. 2.

A program for performing the processes illustrated in FIGS. 6A to 6C and FIGS. 7 and 8, a program for performing the processes illustrated in FIG. 21, FIGS. 22A and 22B, and FIGS. 23 and 24, or a program for performing the process illustrated in FIG. 28 is installed onto, for example, the HDD 219. The program is loaded into the memory unit 212 in a case of activation. The CPU 211 performs a necessary computation process or control process in accordance with the program loaded into the memory unit 212.

Accordingly, the process of performing slideshow using the processes illustrated in FIGS. 6A to 6C and FIGS. 7 and 8, the process of performing slideshow using the processes illustrated in FIG. 21, FIGS. 22A and 22B, and FIGS. 23 and 24, or the process illustrated in FIG. 28 is performed by the CPU 211.

Accordingly, the playback operation using the various types of image effects described above is realized in the PC 102.

Note that the programs for causing the CPU 211 to perform the processes described above can be recorded in advance on an HDD serving as a recording medium mounted in an apparatus such as the PC 102, a ROM or flash memory in a microcomputer having a CPU, or the like.

Alternatively, the programs can be temporarily or permanently stored (recorded) on a removable recording medium such as a flexible disk, a compact disc read-only memory (CD-ROM), a magnet-optical (MO) disc, a digital versatile disc (DVD), a Blu-ray (registered trademark) disc, a magnetic disk, a semiconductor memory, or a memory card. Such a removable recording medium can be provided as so-called packaged software.

Furthermore, the programs may be downloaded from a download site via a network such as a LAN or the Internet as well as installed into a personal computer or the like from the removable recording medium.

In the present embodiment, the personal computer 102 is used as an information processing apparatus by way of example. Playback of images can be performed in a manner similar to that described above also in, for example, a mobile phone, a personal digital assistant (PDA), a game unit, and a video editor, and other various information processing apparatuses using image data items.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   an image-effect determination unit configured to determine, on the basis of an environmental information item at a time of capture of an image data item, the environmental information item being associated with the image data item, a dynamic image effect in which, when the image data item is displayed, a visual change is generated for the displayed image data item; and
   a display control unit configured to control, for display of the image data item, a display operation so that the dynamic image effect which has been determined by the image-effect determination unit is applied,
   wherein the image-effect determination unit determines a dynamic image effect for a playback-target image data item on the basis of an environmental-information difference that is obtained by comparing an environmental information item associated with the playback-target image data item which is to be played back and displayed with a predetermined environmental information item which is a comparative target, and
   wherein the predetermined environmental information item that is a comparative target is an environmental information item associated with an image data item that was a playback target at a point in time before the playback-target image data item is a playback target.

2. An image processing apparatus comprising:
   an image-effect determination unit configured to determine, on the basis of an environmental information item at a time of capture of an image data item, the environmental information item being associated with the image data item, a dynamic image effect in which, when the image data item is displayed, a visual change is generated for the displayed image data item; and
   a display control unit configured to control, for display of the image data item, a display operation so that the dynamic image effect which has been determined by the image-effect determination unit is applied,
   wherein the image-effect determination unit determines a dynamic image effect for a playback-target image data item on the basis of an environmental-information difference that is obtained by comparing an environmental information item associated with the playback-target image data item which is to be played back and displayed with a predetermined environmental information item which is a comparative target, and
   wherein, when a plurality of image data items are sequentially played back and displayed, the predetermined environmental information item that is a comparative target is an environmental information item associated with an image data item that was a playback target immediately before the playback-target image data item is a playback target.

3. The image processing apparatus according to claim 2, further comprising a sequential-playback control unit configured to select, in accordance with a selection parameter, the plurality of image data items that are to be sequentially played back and displayed.

4. An image processing apparatus comprising:
   an image-effect determination unit configured to determine, on the basis of an environmental information item at a time of capture of an image data item, the environmental information item being associated with the image data item, a dynamic image effect in which, when the image data item is displayed, a visual change is generated for the displayed image data item; and
   a display control unit configured to control, for display of the image data item, a display operation so that the dynamic image effect which has been determined by the image-effect determination unit is applied,
   wherein the image-effect determination unit determines a dynamic image effect for a playback-target image data item on the basis of an environmental-information difference that is obtained by comparing an environmental information item associated with the playback-target image data item which is to be played back and displayed with a predetermined environmental information item which is a comparative target, and
   wherein the predetermined environmental information item that is a comparative target is an environmental information item associated with an image data item corresponding to a time information item indicating a time that is a time before a time indicated by a time information item corresponding to the playback-target image data item and that is closest to the time indicated by the time information item corresponding to the playback-target image data item.

5. An image processing apparatus comprising:
   an image-effect determination unit configured to determine, on the basis of an environmental information item at a time of capture of an image data item, the environmental information item being associated with the image data item, a dynamic image effect in which, when the image data item is displayed, a visual change is generated for the displayed image data item; and
   a display control unit configured to control, for display of the image data item, a display operation so that the dynamic image effect which has been determined by the image-effect determination unit is applied,
   wherein the image-effect determination unit determines a dynamic image effect for a playback-target image data item on the basis of an environmental-information difference that is obtained by comparing an environmental information item associated with the playback-target image data item which is to be played back and displayed with a predetermined environmental information item which is a comparative target, and
   wherein the predetermined environmental information item that is a comparative target is an environmental information item that is set as a fixed value.

6. An image processing apparatus comprising:
- an image-effect determination unit configured to determine, on the basis of an environmental information item at a time of capture of an image data item, the environmental information item being associated with the image data item, a dynamic image effect in which, when the image data item is displayed, a visual change is generated for the displayed image data item; and
- a display control unit configured to control, for display of the image data item, a display operation so that the dynamic image effect which has been determined by the image-effect determination unit is applied,
- wherein the image-effect determination unit converts an environmental information item associated with a playback-target image data item that is to be played back and displayed into a body-sensory environmental information item, and determines, using the body-sensory environmental information item, a dynamic image effect for the playback-target image data item, and
- wherein the image-effect determination unit converts the environmental information item associated with the playback-target image data item to be played back and displayed and a predetermined environmental information item that is a comparative target into body-sensory environmental information items, and determines, on the basis of a body-sensory-environmental-information difference that is obtained by comparing the body-sensory environmental information items with each other, a dynamic image effect for the playback-target image data item.

7. The image processing apparatus according to claim 1, wherein at least one of an information item concerning an ambient temperature at the time of capture of the image data item, an information item concerning an external-light amount at the time of capture of the image data item, an information item concerning the time of capture of the image data item, and an information item concerning a place at which the image data item was captured is included in the environmental information item.

8. An image processing method comprising the steps of:
- determining, on the basis of an environmental information item at a time of capture of an image data item, the environmental information item being associated with the image data item, a dynamic image effect in which, when the image data item is displayed, a visual change is generated for the displayed image data item; and
- controlling, for display of the image data item, a display operation so that the determined dynamic image effect is applied,
- wherein the determining step determines a dynamic image effect for a playback-target image data item on the basis of an environmental-information difference that is obtained by comparing an environmental information item associated with the playback-target image data item which is to be played back and displayed with a predetermined environmental information item which is a comparative target, and
- wherein the predetermined environmental information item that is a comparative target is an environmental information item associated with an image data item that was a playback target at a point in time before the playback-target image data item is a playback target.

9. A non-transitory computer-readable medium having stored thereon a program causing an information processing apparatus to perform an image processing method, the image processing method comprising the steps of:
- determining, on the basis of an environmental information item at a time of capture of an image data item, the environmental information item being associated with the image data item, a dynamic image effect in which, when the image data item is displayed, a visual change is generated for the displayed image data item; and
- controlling, for display of the image data item, a display operation so that the determined dynamic image effect is applied,
- wherein the determining step determines a dynamic image effect for a playback-target image data item on the basis of an environmental-information difference that is obtained by comparing an environmental information item associated with the playback-target image data item which is to be played back and displayed with a predetermined environmental information item which is a comparative target, and
- wherein the predetermined environmental information item that is a comparative target is an environmental information item associated with an image data item that was a playback target at a point in time before the playback-target image data item is a playback target.

* * * * *